United States Patent
Mangoubi et al.

(10) Patent No.: US 8,515,150 B2
(45) Date of Patent: Aug. 20, 2013

(54) MATHEMATICAL IMAGE ANALYSIS BASED CELL REPROGRAMMING WITH APPLICATIONS FOR EPIGENETIC AND NON-EPIGENETIC BASE INDUCED PLURIPOTENT STEM CELL DERIVATION

(75) Inventors: Rami Mangoubi, Newton, MA (US);
Paul J. Sammak, Pittsburgh, PA (US);
Mukund Desai, Needham, MA (US);
Nathan Lowry, Lexington, MA (US)

(73) Assignees: The Charles Stark Draper Laboratory, Inc., Cambridge, MA (US); University of Pittsburgh of the Commonwealth System of Higher Education, Pittsburgh, PA (US)

( * ) Notice: Subject to any disclaimer, the term of this patent is extended or adjusted under 35 U.S.C. 154(b) by 284 days.

(21) Appl. No.: 12/904,158

(22) Filed: Oct. 13, 2010

(65) Prior Publication Data
US 2011/0110577 A1  May 12, 2011

Related U.S. Application Data

(60) Provisional application No. 61/278,992, filed on Oct. 13, 2009.

(51) Int. Cl.
*G06K 9/00* (2006.01)

(52) U.S. Cl.
USPC .......................................................... 382/133

(58) Field of Classification Search
None
See application file for complete search history.

(56) References Cited

U.S. PATENT DOCUMENTS

| 7,095,878 B1 * | 8/2006 | Taylor et al. ............... 382/118 |
| 2006/0039593 A1 * | 2/2006 | Sammak et al. ........... 382/133 |
| 2011/0256526 A1 * | 10/2011 | Daley et al. .................... 435/5 |
| 2012/0021519 A1 * | 1/2012 | Ichida et al. ................. 435/377 |

* cited by examiner

*Primary Examiner* — Nirav G Patel
(74) *Attorney, Agent, or Firm* — Foley & Lardner LLP

(57) ABSTRACT

Mathematical and statistical image analysis methods and systems are applied to enhance and refine the process of reprogramming cells, for example, to modify cells from patients into custom-matched stem cells.

19 Claims, 29 Drawing Sheets
(26 of 29 Drawing Sheet(s) Filed in Color)

MATHEMATICAL IMAGE ANALYSIS BASED CELL REPROGRAMMING WITH APPLICATIONS FOR EPIGENETIC AND NON-EPIGENETIC BASE INDUCED PLURIPOTENT STEM CELL DERIVATION

CROSS REFERENCE TO RELATED APPLICATIONS

This application claims the benefit of U.S. Provisional Application No. 61/278,992, filed on Oct. 13, 2009, the disclosure of which is incorporated herein by reference in its entirety.

STATEMENT REGARDING FEDERAL FUNDING

This invention was made with government support under Grant No. NIH 1 RO1 EB006161-01A2, awarded by the National Institutes of Health and National Institute of Biomedical Imaging and Bioengineering (NIBIB), and under Grant No. FAMRI 26-3401-2150 awarded by the Flight Attendant Medical Research Institute Foundation. The government has certain rights in the invention.

BACKGROUND

Induced pluripotent stem cells (iPSCs) hold enormous promise for cell therapy in tissue engineering and for the study of disease. This promise is due to the ability to create pluripotent, embryonic stem-like cells from any genetic source. Patient-specific immuno-matched cells can be chosen as the parent cell line for reprogramming into iPSCs. The iPSCs are then used to create cells and tissues that a patient tolerates without rejection. The iPSCs can also be derived from patients with genetic diseases for use in the discovery of disease mechanisms and treatments. Like other pluripotent stem cells, iPSCs can be used to create heart, brain, retina, liver and cells of other tissues for testing drug candidates, assessing efficacy of drugs, and/or uncovering toxic effects of drug candidates at an earlier state in the drug development process.

It is possible to derive iPSCs from differentiated cells, for example, by using transcription factors to turn on genes that were expressed in stem cells but later silenced in the differentiated cells. Gene silencing represents one type of epigenetic change, or change to phenotype or gene expression caused by mechanisms beyond the underlying DNA sequence. If epigenetic changes associated with cell differentiation could be reversed, then the frequency and rate of pluripotent cell induction could be increased, and the safety and efficiency of producing iPSC colonies would be improved. For example, safety can be improved by reducing the probability of producing cancerous cells (Okita et al., 2007).

In addition, there remains a need for determining whether and when iPSCs have been successfully derived from differentiated cells. Because there are distinct intermediate stages between the differentiated and pluripotent states which differ in morphology, it is possible to image the cell population and use mathematical image analysis to determine which state the cells in the image have reached. In combination with epigenetic manipulations of cells, the image analysis offers a powerful method for deriving and evaluating a useful population of iPSCs with increased speed and efficacy.

A scalable, verifiable method for identifying pluripotency in a non-destructive and non-invasive manner would be ideal for deriving rare iPSCs from somatic cells or for quality control of large numbers of hESC colonies intended for cell therapy. At present, methods for human hESC classification are limited to visual inspection of live cells by a trained microscopist or biochemical or immunochemical staining. While visual observation using brightfield or phase contrast microscopy is non-invasive, it is time consuming, non-quantitative, and cannot be scaled up for the large quantity of cells expected in a therapeutic or commercial setting. Likewise, while biochemical staining of hESCs is consistent, quantitative, and automatable, it is destructive and renders the sample unfit for therapeutic use (Sammak et al., 2008). Live cell fluorescent markers can be used to recognize nascent iPSC colonies (Chan et al., 2009) but are invasive, requiring addition of extracellular or membrane permanent dyes that have limited application in kinetic assays because of dye loss over time. Furthermore, fluorescent dyes and methods for detecting such dyes may damage photosensitive cells. Further, accurate quality control requires a measure of the homogeneity of cell morphology, which is nearly impossible to perform visually for a very large numbers of cell culture plates. In contrast, morphological measurements could serve as endpoint indicators of cell pluripotency or differentiation and provide real-time measurement of the experimental agents on cells.

SUMMARY OF THE INVENTION

The present invention provides improved methods for identifying induced pluripotent stem cells. These improved methods of identifying iPSCs can be used, for example, to distinguish iPSCs from terminally and/or partially differentiated cells; to assess and optimize methods of deriving iPSCs from somatic cells; to facilitate compound screening; and to facilitate the understanding of methods and techniques for modulating the differentiation state of cells. The various features and embodiments of the imaging and other identification methods described herein can be combined. Moreover, these methods, including any combination of features, may be combined with any one or more methods for deriving pluripotent cells and/or for modulating the differentiation state of pluripotent cells.

One aspect of the present invention provides a method for identifying induced pluripotent stem cells, comprising (a) obtaining an image of one or more cells, (b) representing the image as a multiplicity of pixels, (c) using a processor to extract one or more image features from said multiplicity of pixels, and (d) comparing the one or more image features with image features derived from one or more pluripotent stem cells, wherein the processor applies one or more statistical comparison methods to compare the image features; whereby induced pluripotent stem cells are identified.

In one embodiment of the method, the one or more cells is a colony of cells. The method may also feature an image that contains the nucleus of one cell, or one or more cells. In some embodiments, an image feature extracted from the multiplicity of pixels is texture, and the texture corresponds to a morphological structure of the cell. In some embodiments, the texture is heterogeneous.

In another embodiment, the method further comprises (e) performing simultaneous smoothing and segmentation of said image; (f) determining one or more boundaries of said cell; (g) identifying a region or subregion near to said one or more boundaries; (h) deriving one or more attributes of region or subregion; (i) analyzing variation in said one or more attributes; wherein said one or more image features comprise components of said one or more attributes. In some embodiments, the one or more image features are extracted using a wavelet decomposition algorithm. In further embodiments, the wavelet algorithm is an n-level decomposition that yields three detail subbands per level. In still further embodiments, one of each of the three detail subbands per level are orientated horizontally, vertically, and diagonally.

In yet another embodiment of the method, the one or more statistical methods is a comparison of probability density functions. In a further embodiment, the one or more areas of the one or more images are classified using a clustering algorithm, and an exemplary clustering algorithm is selected from the k-Nearest Neighbor (kNN) algorithm and the Support Vector Machine (SVM). In some embodiments, dissimilarity between the one or more image features is calculated using a pdf estimator and quantified using information divergence. In other embodiments, dissimilarity is calculated using a Kullback-Leibler divergence (KLD). Notably, some embodiments use a method to estimate the pdf and KLD elected from: a generalized Gaussian density model (GGD); a symmetric alpha-stable (SαS) Density Model; an Ahmad-Lin (A-L) KLD Estimation; and a Loftsgaarden-Quesenberry (L-Q) KLD Estimation.

In still another embodiment of the method, the induced pluripotent stem cells are contained in a heterogeneous mixture of cells. Some embodiments further comprises subdividing the image of one or more cells into one or more windows. In further embodiments, the one or more windows are classified, subdivided, and re-classified. In additional embodiments, pluripotent cells are differentiated from feeder cells.

Another aspect of the invention provides a method for producing induced pluripotent stem cells (iPSCs), comprising: (a) culturing fibroblasts (or other somatic cells); (b) transfecting the fibroblasts (or other somatic cells) with one or more transcription factors; and (c) reducing activity of one or more epigenetic regulators; wherein the fibroblasts (or other somatic cells) are induced to become pluripotent stem cells. Note that this aspect of the invention may be combined with any of the imaging, detection and quantification methods described herein.

In some embodiments of the method, the one or more transcription factors turn on silenced genes that are only expressed in stem cells. In other embodiments, the one or more transcription factors are Oct4, Sox2 (MKOS), KLF4, and cMyc. In further embodiments, the one or more epigenetic regulators is associated with histone modification or chromatin compaction. In still other embodiments, the one or more epigenetic regulators are methyl-CpG binding domain proteins, histone deacytlases and DNA methyltransferases. In some embodiments, the histone deacetylases are HDAC1 and/or HDAC2 and/or the DNA methyltransferases are DNMT1, DNMT3a, and/or DNMT 3b.

In other embodiments of the method, activity of the one or more epigenetic regulators is reduced by RNAi. In some embodiments, the RNAi is shRNA. In other embodiments, the shRNA is expressed on a lentivirus. In further embodiments, the lentivirus is induced by doxycycline.

In additional embodiments of the method, addition of a drug reduces activity of the one or more epigenetic regulators. In some embodiments, the drugs are valproic acid, butyrate, or trichostatin A (TSA). In further embodiments, the fibroblasts are cultured in feeder free culture media.

The disclosure contemplates all combinations of any of the foregoing aspects and embodiments, as well as combinations with any of the embodiments set forth in the detailed description and examples.

BRIEF DESCRIPTION OF DRAWINGS

The patent or application file contains at least one drawing executed in color. Copies of this patent or patent application publication with color drawing(s) will be provided by the Office upon request and payment of the necessary fee.

Figure 1:
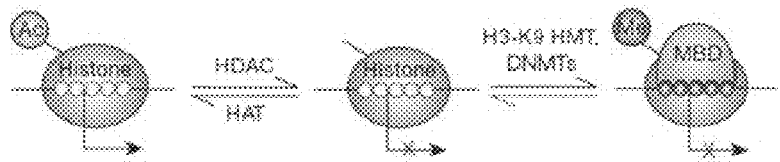
FIG. 1 illustrates how epigenetic modification of histones and DNA convert open euchromatin to condensed heterochromatin. The multistep process requires coordination of several enzymatic post translational modifications of chromatin including deacetylation of histones (by multiple HDACs), and methylation of histones (methyltransferases, HMT notably target H3 lysine 9 and 27) and DNA on Cytosine (by DNA methyltransferases). Figure from (Egger et al., 2004).

Before continuing to describe the present invention in further detail, it is to be understood that this invention is not limited to specific compositions or process steps, as such may vary. It must be noted that, as used in this specification and the appended claims, the singular form "a", "an" and "the" include plural referents unless the context clearly dictates otherwise.

Unless defined otherwise, all technical and scientific terms used herein have the same meaning as commonly understood by one of ordinary skill in the art to which this invention is related.

DETAILED DESCRIPTION

The methods of the present application may be applied to identification of induced pluripotent stem cells, based on morphological features and other molecular characteristics that distinguish these cells from differentiated cells. The methods use statistical classification methods, such as those disclosed in U.S. Pat. No. 7,711,174 and U.S. patent application Ser. No. 12/321,360, both of which are incorporated by reference herein in their entirety.

The methods of the present application have broad applicability to the field of regenerative medicine by, for example, providing automated methods for the high-throughput analysis and identification of iPSCs. The methods disclosed herein may also be applied to automated classification of high throughput production of stem cell colonies and embryoid bodies. For example, assessing differentiation states of stem cell aggregates (Ungrin et al., 2008) has application to teratomas in vivo (Bhagavatula et al., 2010). By way of further example, zebrafish and other embryos may be used for drug screening (Vogt et al., 2009). Automated, non-invasive stem cell classification according to the disclosed methods can be used to advance screening for small molecules that affect development of specific lineages (Bushway et al., 2006; Huang et al., 2008; Ichida et al., 2009; Zong-Yun et al., 2010; Huangfu et al., 2008; Fazzio et al., 2008), as well as a tool in toxicology studies of compounds and drugs which inhibit or promote stem cell development (Seiler et al., 2004; Sinha, 2005; Chang et al., 2004) or affect specific lineages such as hepatocytes (Gareth et al., 2009), cardiomyocytes, or neurons (Schrattenholz et al., 2007) derived from iPSCs or hESCs (Cezar, 2007).

Image based methodology serves as a statistical and quantitative support aid for biologists and clinicians engaged in growing, maintaining, and analyzing hESCs or iPSCs, with the potential for automated image acquisition and analysis to autonomously assess and monitor the degree of pluripotency in a non-destructive manner. Quantitative texture based statistics are a suitable non-invasive, non-destructive biomarker. The methods described herein have broad applicability to the field of regenerative medicine, and can be used, for example, to identify and optimize the production and identification of iPSCs from any somatic cell type from any species, including humans.

Deriving Induced Pluripotent Stem Cells

Deriving a reliable population of iPSCs is the first step to unlocking the potential of iPSCs for cell therapy and treatment of disease. One approach detailed herein makes use of the different epigenetic regulation of differentiated cells versus pluripotent cells. In some embodiments, deriving iPSCs according to the described methods leads to more efficient iPSC derivation, meaning higher quantities of iPSCs obtained at a faster rate, with an increased probability of obtaining and identifying healthy cells.

iPSCs are currently made by transforming somatic cells with four transcription factors (cMyc, KLF4, Oct4, Sox2/MKOS) which induce pluripotency by dedifferentiating or reprogramming differentiated cells to return to primitive lineages. The reprogramming of cell phenotype does not require a change in genetic identity of the cells, because the requirement for ectopic gene expression is transient. Moreover, once iPSCs are produced, the cells rely only on expression of endogenous genes. Thus, the change in differentiation state produced during reprogramming using current methods is mediated by a change in gene expression rather than gene structure.

In some embodiments, the method of re-expressing the long silenced genes required for pluripotency is achieved by epigenetic mechanisms that affect expression by reversing the persistent silencing of genes in heterochromatin. In one embodiment, enzymes that affect methylation-dependent gene silencing in heterochromatin are manipulated. In other embodiments, key molecules associated with gene silencing are manipulated in order to identify other targets that will help to improve the process of reprogramming. Any one or more of the foregoing may be used to produce pluripotent cells, such as to generate iPSCs from somatic cells. Moreover, the imaging and analytical methods described herein may be used to identify cells that have dedifferentiated to a pluripotent state, as well as to follow the progress of dedifferentiation in real-time. In certain embodiments of any of the foregoing, such imaging and analytical methods are non-destructive and non-invasive.

In some embodiments, reprogramming of fibroblasts or other somatic cells is accomplished by evaluating genes found in pluripotent cells and transforming cells with ectopic genes. Previously, a minimal set of four ( ) transcription factors was found necessary for inducing pluripotency in differentiated cells (Okita et al., 2007; Takahashi et al., 2006). One method of introducing the genes is through viral introduction of cMyc, Klf4, Oct4, and Sox2 (MKOS) (Takahashi et al., 2006; Park et al., 2009; Park et al., 2008) or introduction of OCT4, SOX2, NANOG, and LIN28 (Yu et al., 2007). While ectopic genes have been introduced by viral transformation (Zeng et al., 2009) and by non-viral methods including plasmid transfection (Okita et al., 2008), the reversible PiggyBac vector PB-MKOS system (Zeng et al., 2009; Okita et al., 2008) and recombinant proteins may be added directly to induce pluripotency without introducing ectopic genes (Zhou et al., 2009). Small molecules that have signaling activity (Marson et al., 2008) or that alter epigenetics have been used to increase efficiency or to reduce the number of ectopic genes that are needed for reprogramming (Feng et al., 2009;

Shi et al., 2008). Environmental changes alone are sufficient to increase expression of endogenous pluripotency markers in fibroblasts (Page et al., 2009) showing that media composition is important and may be optimized for reprogramming. Any one or more of the foregoing may be used to produce pluripotent cells, such as to generate iPSCs from somatic cells. Additionally, combinations of any of these methods (such as introduction of transcription factors using viruses and a method based on modification of epigenetic feature(s)) may be used to produce pluripotent cells, such as to generate iPSCs from somatic cells. Moreover, the imaging and analytical methods described herein may be used to identify cells that have dedifferentiated to a pluripotent state, as well as to follow the progress of dedifferentiation in real-time. In certain embodiments of any of the foregoing, such imaging and analytical methods are non-destructive and non-invasive.

In some embodiments, the inhibition of histone deacetylases (HDACs) by valproic acid (Zhou et al., 2009) may improve reprogramming efficiency. Further, drug inhibition of HDACs by butrate or trichostatin A (TSA) activates a self-renewal program in hESC that is independent of feeders or recombinant growth factors (Ware et al., 2009). Inhibition of histone deacetylation and subsequent methylation (FIG. 1) by more selective methods reveals the interconnection between reprogramming and heterochromatin stability.

One aspect of the present application describes a method for producing iPSCs, comprising culturing fibroblasts or other somatic cells, transfecting the fibroblasts (or other cells) with one or more transcription factors, and reducing the activity of one or more epigenetic factors, wherein the fibroblasts (or other somatic cells) are induced to become pluripotent stem cells. In some embodiments, the epigenetic factors are associated with histone modification, chromatin compaction and access to activators or repressors. The imaging and analytical methods described herein may be used to identify cells that have dedifferentiated to a pluripotent state, as well as to follow the progress of dedifferentiation in real-time. In certain embodiments of any of the foregoing, such imaging and analytical methods are non-destructive and non-invasive.

Figure 2:
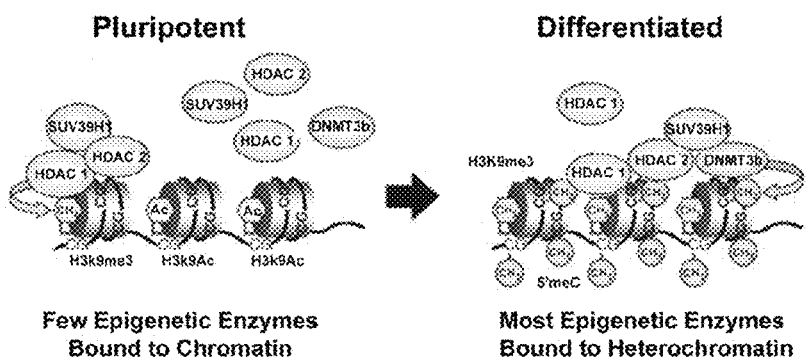
FIG. 2 shows that epigenetic enzymes are found in complexes bound to heterochromatin in differentiated cells. Studies indicate that HDAC 1, HDAC 2, SUV39H1 and DNMT 3b associate in complexes in somatic cells (right) that bind to heterochromatin and methylate H3k9 and 5'MeC (right). Binding constants are not equal among enzymes. In pluripotent cells, our preliminary immunofluorescence data (below) suggests that enzymes are not bound tightly (left).

Gene expression is regulated by a hierarchy of genetic, epigenetic and nuclear mechanisms (O'Brien et al., 2003; van Driel et al., 2003). Gene silencing is regulated by nuclear architecture, which controls histone modification, chromatin compaction and access to activators or repressors (Feuerbach et al., 2002; Cai et al., 2003; Teixeira et al., 2002). Silencing within heterochromatin by histone H3 lysine 9 (H3-K9) methylation (Grewal et al., 2003) and substitution of histone variants (Mizuguchi et al., 2004) is an important mechanism for gene inactivation (FIG. 2). H3K9 methylation recruits heterochromatin proteins 1 (HP1α and β) to large scale neighborhoods of inactive chromatin (Pal-Bhadra et al., 2004; Cheutin et al., 2003) that are condensed and maintained dynamically (Cheutin et al., 2003). Methylation of H3K27 is associated with facilitative heterochromatin. H3K27 trimethylation discriminates genes that are expressed, poised for expression, or stably repressed, and therefore reflect cell state and lineage potential. Lysine 36 trimethylation marks primary coding and non-coding transcripts, facilitating gene annotation. Lysine 4 and lysine 9 trimethylation mark imprinting control regions (Mikkelsen et al., 2007). Another hypothesis has been developed that H3K27 and H3K4 methylation act in a bivalent manner at conserved noncoding sequences to control expression of coding sequences within pluripotent cells (Bernstein et al., 2006). Chromatin remodeling is controlled not just by histone post translational modification but by chromatin remodeling proteins including Chd1 which regulates open chromatin structures and maintains pluripotency (Gaspar-Maia et al., 2009).

DNA methylation of cytosine residues, essential for mammalian development, is another well studied epigenetic mechanism associated with gene silencing (Bird, 2002). DNA methylation represses genes partly by recruitment of methyl-CpG binding domain proteins (MBDs), which assemble multi-protein repressor complexes that affect chromatin architecture thereby rendering genes inactive. MeCP2 is one such protein which complexes with a transcriptional repression domain, Sin3A, to silence transcription by recruiting HDAC 1 or 2, which removes acetyl groups from histones resulting in gene silencing (Jones et al., 1998; Nan et al., 1998). HDACs act in concert with HMTs to replace acetyl groups with methyl groups on histone H3k9. In pericentric regions of (Egger et al., 2004) mammalian cells, the HMT responsible for H3k9 trimethylation is SUV39H1 and loss of this enzyme produces mitotic chromosome loss (Rea et al., 2000). This specific complex and resulting H3k9me3 is responsible for induction of DNA satellite repeat methylation by DNMT3 (Lehnertz et al., 2003). Further, immunoprecipitation and pull down experiments demonstrate that DNMT3b not only interacts with the chromatin remodeling enzyme hSNF2H, HDAC1 & 2, HP1 proteins and SUV39H1 but also co-localizes with these components of the epigenetic machinery at heterochromatin in HeLa cells (Geiman et al., 2004; Silverstein et al., 2005). Any one or more of the foregoing epigenetic methods may be used to produce pluripotent cells, such as to generate iPSCs from somatic cells. Such epigenetic methods may optionally be combined with methods of upregulating transcription factor gene expression, such as Oct4, Sox2, etc. Moreover, the imaging and analytical methods described herein may be used to identify cells that have dedifferentiated to a pluripotent state, as well as to follow the progress of dedifferentiation in real-time. In certain embodiments of any of the foregoing, such imaging and analytical methods are non-destructive and non-invasive.

In other embodiments, the culture medium of the differentiated cells may facilitate the reprogramming process. For example, standard MKOS transformation may be used, but culture media may be varied. Environmental conditions have been demonstrated to affect endogenous pluripotency markers in fibroblasts (Page et al., 2009) and optimized media that enhances iPSC colony formation can be determined. The invention contemplates the use of this feature in combination with any of the foregoing. The imaging and analytical methods described herein may be used to identify cells that have dedifferentiated to a pluripotent state, as well as to follow the progress of dedifferentiation in real-time. In certain embodiments of any of the foregoing, such imaging and analytical methods are non-destructive and non-invasive.

Molecular Methods for Distinguishing Pluripotent Stem Cells

Induced pluripotent stem cells must be distinguished from differentiated cells. In some embodiments, specific markers of differentiation may be used to identify differentiated cells. Methods that distinguish between cells in varying differentiation states may take advantage of the different gene expression profiles or epigenetic traits present in the cells. Molecular markers of differentiation may be obtained from any somatic cells. Similarly, molecular markers of pluripotent cells may be obtained from embryonic stem cells such as human embryonic stem cells (hESCs) or induced pluripotent stem cells (iPSCs).

In somatic cells, tissue identity is retained by cellular memory of tissue-specific gene expression programs. Cellular memory is accomplished through the differential formation of heterochromatin, which produces enduring silencing of gene loci (Lunyak et al.; 2002; Misteli, 2005; O'Brien et al., 2003; van Driel et al., 2003). Tissue phenotype is established by silencing tissue-inappropriate gene loci in terminally differentiated cells (de Wit and van Steensel, 2009). Developmentally, cellular identity should remain plastic, to a degree, until terminal differentiation.

In some embodiments, the disappearance of heterochromatin signals that somatic cells are beginning to de-differentiate, in a process that mirrors differentiation, where heterochromatin first appears as embryonic stem cells (ESCs) begin to specialize. Heterochromatin aggregates are largely absent from hESCs by several criteria, which has implications for cellular memory and mitotic chromosome stability in pluripotent cells.

Chromatin is organized hierarchically, from post-translational modifications of histones and nucleosome structure (Annunziato et al., 1981; Kimura and Cook, 2001), to dynamic formation of heterochromatin encompassing multi-gene loci (Cheutin et al., 2003) and finally higher-order positioning of entire chromosomes within nuclei (Misteli, 2005; O'Brien et al., 2003; van Driel et al., 2003). Localized, gene-specific, epigenetic modifications are complemented by higher-order chromatin reorganization of multi-gene loci into microscopically detectable heterochromatin aggregates, which restrict promoter access to transcriptional activators or repressors by physical hindrance (Grewal and Moazed, 2003; Hattori et al., 2004).

Turning to the example of human embryonic stem cells (hESCs), these cells are epigenetically unique among developmental stages. They are derived from the inner cell mass where relevant promoters are hypomethylated during preimplantation development, and are followed by a hypermethylation stage immediately post implantation (Li, 2002). Epigenetic modifications include H3 acetylation and methylation at key lysine residues including H3K4, H3K9 and H3K27 (Azuara et al., 2006b; Jorgensen et al., 2006; Lee et al., 2006; Pan et al., 2007). Bivalent domains, generally methylated on the inhibitory domain, H3K27 with inset domains of stimulatory H3K4 di- and tri-methylation, are present at promoters for developmentally relevant transcription factors (Azuara et al., 2006a; Bernstein et al., 2006; Golebiewska et al., 2009; Ku et al., 2008; Pan et al., 2007). Genome-wide H3K9ac is reduced during differentiation (Krejci et al., 2009). Histone arginine methylation R17 and R26 transcriptional activity and are also required for pluripotency in mouse ESC (Wu et al., 2009). Epigenetic modifications are regulated by deacetylases and methyltransferases. Histone deacetylase 1 and 2 (HDAC1 and 2) in nucleosome remodeling (NuRD) complexes act upon pericentromeric heterochromatin in a stage-specific manner, and initiate deacetylation followed by methylation of pericentromeric histone H3 (Kantor et al., 2003). DNA methyltransferases (DNMT 3a, 3b) also have selective effects on the initiation of DNA methylation at centromeric 5'methyl Cytosine (5meC) (Bachman et al., 2001; Gopalakrishnan et al., 2009) versus DNA maintenance methylation (DNMT1) (Ding and Chaillet, 2002; Goyal et al., 2006). Both are required for proper chromatin separation during mitosis (Gopalakrishnan et al., 2009; Kantor et al., 2003). In general pluripotent cells have high levels of open chromatin including extra-genomic regions, which are transcriptionally active (Efroni et al., 2008; Gaspar-Maia et al., 2009). Thus transcriptional activity and gene regulation in developmentally plastic pluripotent ESCs is fundamentally different from somatic cells and this difference is reflected in chromatin structure. In some embodiments, the difference in chromatin structure may be used to differentiate between iPSCs and differentiated cells.

Hypomethylation of DNA and histone during preimplantation development could be expected to influence heterochromatin compaction. Compaction is usually tightly coupled to DNA methylation but can occur independently (Gilbert et al., 2007) since condensation is influenced by other epigenetic regulators, including H3K9me2 and H3K9me3 (Wu et al., 2005), hypo-acetylation (Gorisch et al., 2005; Popova et al., 2009), and linker histone activity (Cheutin et al., 2003; Karymov et al., 2001). Facultative heterochromatin develops on coding regions of the genome while constitutive heterochromatin develops at non-coding and highly repetitive regions such as pericentromeric domains (Allis et al., 2007). Constitutive heterochromatin is more persistent but is still dynamic (Lam et al., 2006), enriched in H3K9me3 (Peters et al., 2002) and is a foundation for higher-order chromatin structure (Grigoryev et al., 2004; Maison et al., 2002; Natarajan and Schmid, 1971). Silencing in somatic cells is regulated by the synergy of DNA methylation, histone modification, and chromatin remodeling (Lippman et al., 2003). For example, H3K9 trimethylation occurs within heterochromatin (Grewal and Moazed, 2003) and is a key histone modification associated with gene silencing (Kouzarides, 2002) during neural differentiation of hESC (Golebiewska et al., 2009). H3K9me3 increases the binding affinity of heterochromatin-binding proteins (HP1) to large-scale neighborhoods of inactive chromatin that are condensed, persistent, but dynamically active (Cheutin et al., 2003). Indeed, HP1 levels are reduced and distribution is delocalized in hESC, especially HP1β (Bartova et al., 2008b). Additionally, H3K9me3 regulates structural organization of pericentromeric heterochromatin (Henikoff et al., 2000; Lehnertz et al., 2003). Assembly of pericentric heterochromatin (Peters et al., 2001; Rea et al., 2000) and histone methylation at centromeres (Eot-Houllier et al., 2009; Kondo et al., 2008) are both essential for proper chromatid separation during mitosis and for genomic stability.

In somatic cells the nuclear periphery is enriched in silenced chromatin, while in hESC cells, the nuclear periphery is a mixture of permissive and repressive domains (Luo et al., 2009) with fewer centromeres. hESCs have radially organized active genes and histone H3 modification patterns with the most active genes in the center of the nucleus (Bartova et al., 2008a; Strasak et al., 2009a; Wiblin et al., 2005). Epigenetic mechanisms directly influence large scale genome regulation through nuclear organization since inhibition of histone deacetylases and methyltransferases can affect radial chromosome positioning and chromocenter integrity (Harnicarova Horakova et al.). In mESCs, hyperdynamic structural chromatin proteins, characteristic of pluripotent mESCs, become less dynamic upon differentiation as higher-order chromatin structure is assembled during early-differentiation (Meshorer et al., 2006).

One hindrance to measurement of nuclear organization and chromatin dynamics is the lack of measuring tools for quantifying the degree of chromatin condensation. The amorphous structure of chromatin does not lend itself to length or area measurements, but computer vision based texture analysis may be used to quantitatively and statistically demonstrate progressive structural changes in chromatin during stem cell differentiation that correspond to epigenetic changes. Taken together, pluripotent-specific features of nuclear organization may be used as markers for pluripotentcy. Accordingly, the expression of such markers in test cells may be compared to the expression in reference cells or images of reference cells.

By using statistical comparison methods to determine how closely the test cells match the reference cells, pluripotent stem cells are identified. The methods of the present application accomplish this goal.

Measuring Cell Differentiation, Growth and Death by Non-Invasive Video Microscopy In some embodiments, cells may be assayed for differentiation state without damaging cells and/or removing them from the growth media. Non-invasive techniques permit continuous monitoring of cells without contacting the cells, so that cells and/or colonies do not need to be mechanically separated from other cells or from the well where they are growing. Use of non-invasive methods also eliminates the need to remove a sample of cells for further processing, such as immunostaining or fixation for microscopy. Often, cells must be permeabilized and fixed before their features can be analyzed, or cells must be labeled with small molecule dyes and/or molecular probes. This means that select cells are sacrificed for analysis, and are assumed to be representative of the whole population with which they grew. Thus, it may not be possible to monitor the progress of differentiation of a specific cell or colony, and one would instead be forced to rely on an approximation, based on the cells assayed. Since cells within even a homogeneous population do not always differentiate at the same rate, the invasive sampling methods may not be suited for purposes where cells at a precise state of differentiation are needed.

Using non-invasive methods described herein, the growth, differentiation, and/or reprogramming of cell cultures may be monitored and the differentiation state of the cells may be determined by taking images of the cells and processing image information according to the methods described below. Cells may be sampled from the population for analysis, or specific cells and/or colonies may be monitored continuously over a period of time. In one exemplary embodiment, images may be obtained by phase contrast microscopy of live cells or cell colonies.

Figure 21:
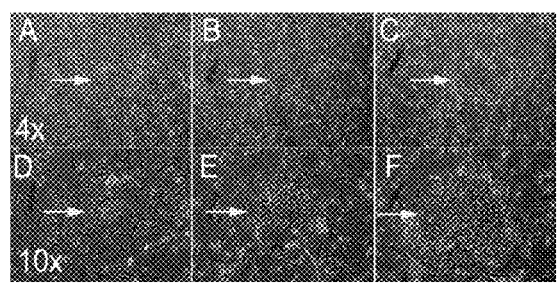
FIG. 21 illustrates small hESC colonies after passaging appear similar to nascent iPSCs. Colonies are easily detectable on day 3 (C, F) at 4× and 10×, respectively. However, on day 1 colonies are distinct only at 10× (D) not 4× (A). Therefore, 2 variables for detection of nascent iPSCs are the time after formation and the scale and resolution of the image detection. The 4× field of view is 2 mm×3 mm.
Figure 22:
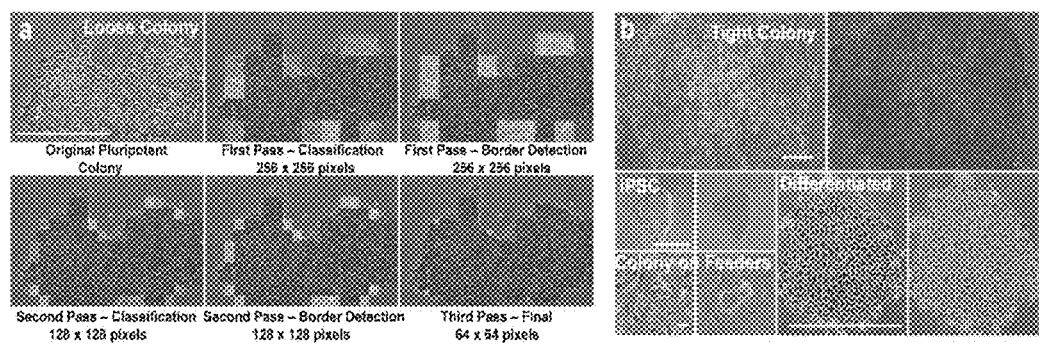
FIG. 22 demonstrates identification of existing iPSC and hESC colonies (A) Established, mature iPSC colony containing over 300 cells on exterior extracellular matrix proteins. (B) Computer image analysis of colony where the image exterior is marked red and the pluripotent colony marked blue. The multiresolution texture algorithm was applied to obtain results. (C) A similar algorithm is also able to distinguish between a very small colony of 30 hESCs grown on feeders 24 hours after passaging, a situation similar to nascent iPSCs derived from feeders. (D) Discrimination of the colony from surrounding feeders.

In some embodiments, one criteria for identifying iPSCs during reprogramming is colony morphology (Ellis et al., 2009). Morphology may be determined non-invasively permitting measurement of cells that are not perturbed by fluorescent live-cell markers. Here, non-invasive methods are described for screening large numbers of cells for morphology to identify new pluripotent stem cell colonies. FIG. 21 shows vanishingly small colonies of hESC after passage onto feeder fibroblasts. Phase contrast images were taken at 4× and 10× magnification on 1, 2, and 3 days after passage. The arrow points to a single colony in each frame. The colony in FIG. 21a and FIG. 21d contains 15 cells and can be discriminated from fibroblasts by eye. Additional colonies are detected on days 2 (FIG. 21b, e) and 3 (FIG. 21c, f), but detection of these colonies under the 15 cell threshold cannot be identified with certainty by eye. In methods described herein, detection of pluripotent cell colonies uses texture analysis and matches the visual detection limit of experienced observers (FIG. 22). Further, there are intermediate states and different kinetics of reprogramming depending on the reprogramming panel of transcription factors that could result in partially reprogrammed cells with morphology that is similar to fully pluripotent iPSCs (Nakagawa et al., 2008). In some embodiments, morphological criteria alone may be sufficient for identifying intermediate or incompletely reprogrammed states.

Figure 23:
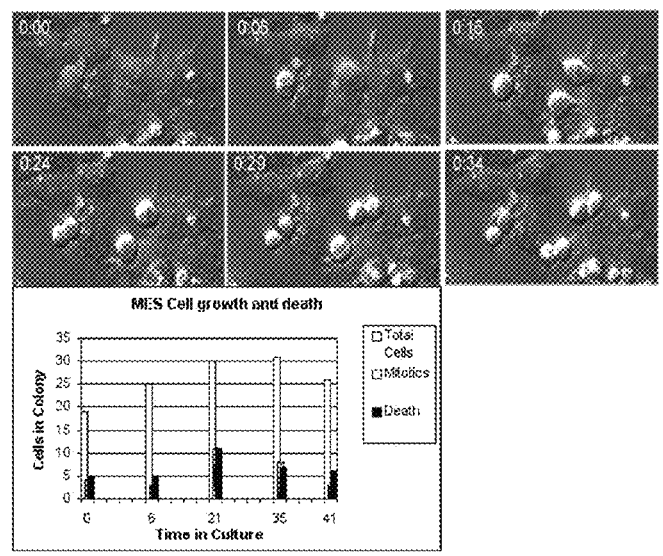
FIG. 23 shows a brightfield time-lapse series of mESC colony growth and death. At higher magnification, cell growth and death can be measured cell-by-cell, in addition to morphological changes characteristic of differentiation. Mouse embryonic stem cell (mESC) division and death occur at high frequency during colony expansion. A small colony of adherent mESC cells were observed by time-lapse Hoffman modulation contrast microscopy for 41 hrs. An excerpt from 34 min is shown above where division of rounded cells can be observed. Mitotic cells from chromosome condensation to midbody formation progressed rapidly (28±7 min n=29 among 5 time lapse series of 6 hr duration). Data for division and cell death are pooled at 6 hr intervals in the bar graphs, above. Total number of cells increased for 35 hours until the culture media is exhausted. Although mitotic indices were high, ranging from 11 to 36%, death rates were also high, limiting colony expansion. A majority of cell deaths occurred just after telophase.

In some embodiments, texture of pluripotent cells, both iPSCs (FIG. 22b) and hESCs (FIG. 22a, 22b) may be detected by wavelet analysis (Mangoubi et al., 2007; Sammak et al., 2008) and discriminated against either extracellular matrix in mTeSR media or against feeder fibroblasts in DSR media. Further, the pluripotent colony texture may be distinguished from the colony texture of differentiated cells with epithelial morphology as well as fibroblast morphology. Further, video microscopy can be used to measure the mitotic index and death rates of stem cell colonies (FIG. 23). Thus, in some exemplary embodiments, an algorithm design is used to measure one or more (1, 2, or 3) of growth, death and reprogramming morphology during the induction of pluripotency under various conditions. The process may be repeated so that cells are iteratively imaged and processed, and the methods may be automated.

Image Analysis Methods: The Matrix Edge

Both during and after the process of deriving iPSCs, it is important to determine when the cells have fully de-differentiated to the appropriate pluripotent state. In some embodiments, image analysis methods may be performed on images of cells. The image collection may be non-invasive or minimally invasive, such that images of the same one or more cells can be analyzed at different time points, without injuring the cell or disrupting its growth. Moreover, real-time imaging of differentiation state may be performed, in order to monitor the extent of differentiation in a given population and/or assess the effects of an environmental change on deprogramming of the cells. Without destruction of cells or addition of exogenous markers, colonies may be continuously evaluated either for kinetics of growth and differentiation and/or for quality control before therapeutic treatment.

In some embodiments, newly reprogrammed cells are distinguished from parent cells on the basis of their morphology. In addition, the nuclear organization and colony organization of each respective cell type may provide a basis for distinguishing between cells. In one exemplary embodiment, nuclear enzymes like the histone deacetylases (HDACs) and DNA methyltransferases (DNMTs) are manipulated to affect cellular reprogramming, as described above.

Figure 3:
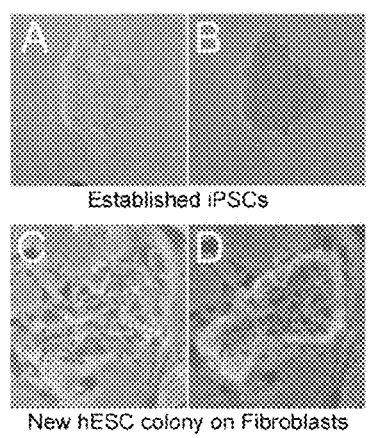
FIG. 3 shows the identification of existing iPSC and hESC colonies (A) Established, mature iPSC colony containing over 300 cells on exterior extracellular matrix proteins. (B) Computer image analysis of colony where the image exterior is marked red and the pluripotent colony marked blue. The multiresolution texture algorithm was applied to obtain results. (C) A similar algorithm is also able to distinguish between a very small colony of 30 hESCs grown on feeders 24 hours after passaging, a situation similar to nascent iPSCs derived from feeders. (D) Discrimination of the colony from surrounding feeders.

In some embodiments, pluripotent stem cells or stem cell colonies are identified in a non-invasive and non-destructive fashion using statistical multiresolution texture image analysis. Colonies may be imaged with microscopy techniques known in the art. In some embodiments, phase contrast microscopy is used. Using image based algorithms, pluripotent colonies can be identified and statistically distinguished from differentiated colonies and their exteriors (Mangoubi et al., 2007; Sammak et al., 2008; Desai et al., 2009; Mangoubi et al., 2008, FIG. 3).

Texture is a quantifiable method for measuring amorphous, non geometric properties of cell morphology, particularly nuclear and cytoplasm size and edges. Different cell biological functions are reflected in cell size and shape, and so cell morphology is an integrated measure of stem cells and differentiated cell products. Morphology alone may be insufficient to determine the activity of specific molecules, but is often sufficient to determine cellular phenotype based on molecular activity. Statistical multiresolution texture analysis is a non-destructive optical method for discriminating and classifying images of both hESC cells and colonies. In the case of colonies, no chemical is required.

The texture classification algorithms described herein may be used for various hESC and existing iPSC lines, under a diversity of culturing conditions. The results may be validated using molecular markers of pluripotency and differentiation. For example, the quality of iPSC derivation methods may be evaluated by non-invasive kinetic methods, and/or the quality of resulting iPSCs may be assessed by quantitative immunostaining of single cells with a pluripotency marker panel and epigenetic marker panel.

In some embodiments, unmarked images may be used to detect and identify nascent iPSC colonies in the primary passage when they are first derived from human fibroblasts. Nascent iPSC colonies start as single cells or small clusters of cells (FIG. 4, from (Woltjen et al., 2009)) and the detection threshold may be established for these cells. In addition, kinetic characteristics of living cells may be compared in order to determine reprogramming intermediates. Finally, iPSC quality may be verified at early stages with molecular panels of pluripotency and epigenetic markers. This approach may use, in certain embodiments, methods of texture analysis of static images and/or time-lapse images to enable the extraction of kinetic features and help reveal the appearance of new iPSCs. Notably, statistical methods may be used for simultaneous smoothing and segmentation (Park et al., 2009) of small size heterogeneous textures with subregions of irregular shapes. For example, distinct pluripotent morphologies may be identified in colonies that are very small, like the colonies produced just after passaging, and/or morphologies in cells that are dispersed as single cells.

Notably, image based algorithms may also be used for images of stained nuclei, and may be used to classify chromatin organization in single pluripotent cell nuclei (FIGS. 5 and 6) (Desai et al., 2009; Mangoubi et al., 2008). In certain embodiments, the algorithm is automated and incorporated into a method for i) identifying and separating desired iPSCs from background cells, and ii) providing quantitative colony features.

The Matrix Edge Onion Peel Algorithm

Algorithms for texture analysis usually require that regions to be analyzed be sufficiently large to contain rectangular subregions of relatively homogeneous subtextures. However, single cell and nascent iPSC colonies usually do not afford such luxuries; subregions are small, heterogeneous, and of irregular shapes. Analysis of such shapes requires an improved algorithm suited to these colonies. Described herein is a new Matrix Edge Onion Peel (MEOP) algorithm (Desai et al., 2009), which addresses three challenges regarding textures attributed to nascent iPSCs: 1) small size, 2) heterogeneity, and 3) irregularly shaped regions. This algorithm may be used to identify pluripotent stem cells and/or colonies on the basis of their texture. In some embodiments, where textural regions are sufficiently large, a texture wavelet analysis algorithm may be used, but combined with an MEOP algorithm for textural regions of small size.

The MEOP methodology overcomes the limitation of other texture analysis methods when dealing with heterogeneous textures that exhibit onion layer type textural variation. Here, the behavior within a layer is assumed to be homogeneous, although there may be variation between layers. The shape of the onion layers is data dependent; radial symmetry is not required. An energy functional approach may be used for simultaneous smoothing and segmentation. The approach relies on two features: a matrix edge field, and adaptive weighting of the measurements relative to the smoothing process model. The matrix edge function adaptively and implicitly modulates the shape, size, and orientation of smoothing neighborhoods over different regions of the texture. It thus provides directional information on the texture that is not available in the more conventional scalar edge field based approaches. The adaptive measurement weighting varies the weighting between the measurements at each pixel.

Matrix Edge Field and Adaptive Weighting: The variational formulation

Consider the variational optimization problem $$\min_{u,V} E(u, V \mid \alpha, \beta, \rho)$$

Where E is the integral of the region R, the image region $$E(u, V \mid \alpha, \beta, \rho) = \int_R \left[ \alpha u_x^T (I - V)(I - V)^T u_X + \beta \|u - g\|^2 + \frac{\rho}{2} F(V_X) + \frac{G(V)}{2\rho} \right] dX \quad (1)$$

and g is the input image to be smoothed, u and V are respectively the smoothed image and associated 2×2 symmetric edge matrix field, respectively, X represents the 2D space on which g, u, V are defined. In the above, subscript X represents the spatial gradient operator. The first term is a smoothness fidelity term that penalizes by (1−V) the gradient of u, so that smoothing occurs only on pixels not situated on edges. The second term is a data fidelity term penalizing deviations of smoothed data from input data. The scalar terms G (V) penalize edge strength, while $F(V_X)$ requires that edges be smooth, while still recognizing kinks.

In the formulation of (Okita et al., 2007), the matrix edge field is a generalization of previous formulations, such as those in Mumford et al., 1985 and Ambrosio et al., 1990, where a scalar edge field V(X) is used. A scalar edge field modulates the size of the circular neighborhood over which local smoothing takes place, whereas the more general matrix edge field modulates size, shape, and orientation with an elliptical local smoothing neighborhood. As such the smoothing is more effective.

The Neighborhood Shape, Orientation and Size.

Figure 7:
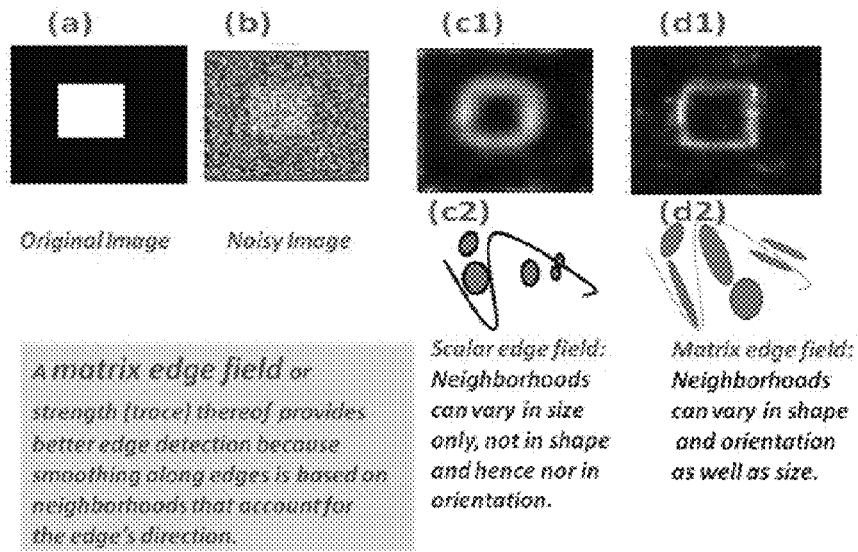
FIG. 7 illustrates the Matrix Edge concept. (a) Noise free image of a square, (b) image corrupted by spatially varying high intensity noise (noise in upper left corner of square much stronger than in other corners), processed (c1) with conventional segmentation, the edges are blurred as (c2) neighborhoods over which local smoothing takes place vary locally in size only, while with (d1) Matrix Edge segmentation, the edges are much improved thanks to (d2) the ability to vary, in addition to size, the shape and orientation of local neighborhoods.

In the process of simultaneously smoothing and segmenting a heterogeneous texture, two features of the algorithm are its ability to i) define local neighborhoods of different shapes and orientation, and not just of different size as is the current practice, thus providing finely segmented images, and ii) adapt to spatially varying noise. Because of these features, it is possible to segment images with narrow regions with a small number of pixels. FIG. 7 illustrates the effect of matrix edge segmentation, meaning the use of smoothing neighborhoods that vary in size, shape and orientation when compared to just size.

Figure 8:
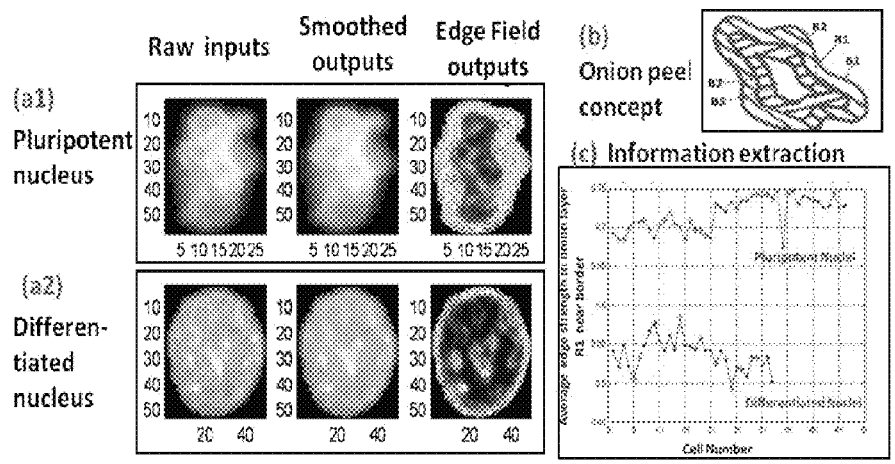
FIG. 8 shows the application of Matrix Edge and Onion Peeling to stem cell nuclei. (a) Raw input (left column), smoothed (middle), and edge field (right) output images of pluripotent (top) and differentiated (bottom) nuclei. Matrix edge field output (right column) is rich in spatially varying details. Layers of the edge field image are to be extracted as if (b) peeling an onion and quantitated to (c) extract numerical features whose values are different in pluripotent (top curve) and differentiated nuclei (bottom curve).

FIG. 8 illustrates the application of an early version of the algorithm to stem cell nuclei, and explains another element: onion peeling of a heterogeneous texture. This algorithm may be used to track a small size cell once detected, and to analyze its texture once it grows to a minimum size. Finally, the algorithms may provide features and statistics needed for comparing, evaluating, and improving iPSC derivation methods in a non-invasive, non-destructive fashion.

Image Analysis Methods: Nonparametric Methods

In some embodiments, nonparametric methods for segmenting and classifying stem cell nuclei may be used. This approach, which enables automatic monitoring of stem cell growth and development, is based on combining level set methods, multiresolution wavelet analysis, and non-parametric estimation of the density functions of the wavelet coefficients from the decomposition. Additionally, to deal with small size textures where the largest inscribed rectangular window may not contain a sufficient number of pixels for multiresolution analysis, we propose an adjustable windowing method that enables the multiresolution analysis of elongated and irregularly shaped nuclei. In some exemplary embodiments, the adjustable windowing approach combined with non-parametric density models yields better classification for cases where parametric density modeling of wavelet coefficients may not be applicable or may be applicable but less robust.

Multiresolution texture analysis can be an effective methodology for retrieving (Do and Vetterli, 2002) and classifying textures (Mangoubi et al., 2007) and is particularly successful in classifying stem cell colonies, where textural properties are a qualitative indication of the degree of pluripotency (Mangoubi et al., 2007). Albeit non-invasive, traditional colony analysis by a microscopist is expensive, subjective, and slow, requiring the attention of a trained specialist. Alternatively, while chemical staining is rapid, automatable, and consistent, it is destructive, rendering the stained elements unfit for use in tissue growth or drug testing.

By contrast, image based stem cell colony texture analysis is automatable, non-invasive, consistent, and preserves the colony for subsequent biomedical use. Furthermore, it allows for multiscale qualitative monitoring of stem cell growth at multiple spatiotemporal resolutions. At the nuclei resolution level, even though staining is required, the image based methodology is nevertheless of use in quantitatively classifying stem cell nuclei in an automated, consistent, and rapid manner (Mangoubi et al., 2008). As with colony analysis, such quantitation can be of use in understanding the effect various proteins have on the ability to maintain pluripotency and direct differentiation.

In the above references, statistical multiresolution wavelet texture analysis was shown to be effective when combined with a parametric statistical model, the generalized Gaussian density (GGD), used to represent the wavelet coefficients in the detail subbands. Parameteric statistical multiresolution wavelet analysis as previously implemented, however, has limitations: 1) it requires a user to manually select rectangular, texturally homogeneous regions of sufficient size to enable texture analysis, and 2) it assumes the distribution of coefficients is symmetric, unimodal, and unbiased, which may be untrue for some textures. As described above, the Matrix Edge Onion Peel algorithm may be used for small size irregularly shaped nuclei that exhibit "onion layer" textural variation, i.e. texture characteristics that change as a function of the nuclear radius.

In some embodiments, an algorithm may be used to automatically segment the nuclei, and an adjustable windowing method may be used in order to maximize the number of coefficients available from the multiresolution decomposition of a small, irregularly shaped (i.e. non rectangular) region. These steps enable the automatic analysis of images with multiple stem cell nuclei, eliminating the need for a human to manually select windows in order to perform texture analysis. Finally, a non parametric statistical analysis may be applied to cases where the parametric GGD model is inapplicable. This step yields superior performance over the parametric model in cases where the latter is not applicable.

Four non-Gaussian methods are exemplary of non-Gaussian methods that may be used for estimating the statistical dissimilarity and can be applied to classify one or both of time-series images of individual cells and phase contrast images of entire hESC colonies.

Texture Analysis: Wavelet-Based Texture Model

It was noted early on (Mallat, 1989) that the empirical probability density function (pdf) of the coefficients in each of the wavelet detail subbands often resembled the symmetric, unimodal generalized Gaussian distribution:

$$f(x; \alpha, \beta) = \frac{\beta}{2\alpha\Gamma(1/\beta)} e^{-(|x|/\alpha)^\beta} \qquad (2)$$

Here, x is the random variable (detail coefficient), and $\alpha$ and $\beta$ are the width and shape parameters which define the density.

This statistical correspondence suggests a texture model—the set of estimated GGDs characterizing the wavelet detail subbands of a texturally homogeneous region. While this model assumes both statistical independence across subbands and the absence of texturally relevant information in the approximation band, it has been validated for several textures, and techniques for calculating the $\alpha$ and $\beta$ parameters have been developed for use in content-based image retrieval by Van de Wouwer et al. (1999) and Do and Vetterli (2002). The method has been successfully applied to stem cell image classification (Mangoubi et al., 2008; Mangoubi et al., 2007).

Figure 9:
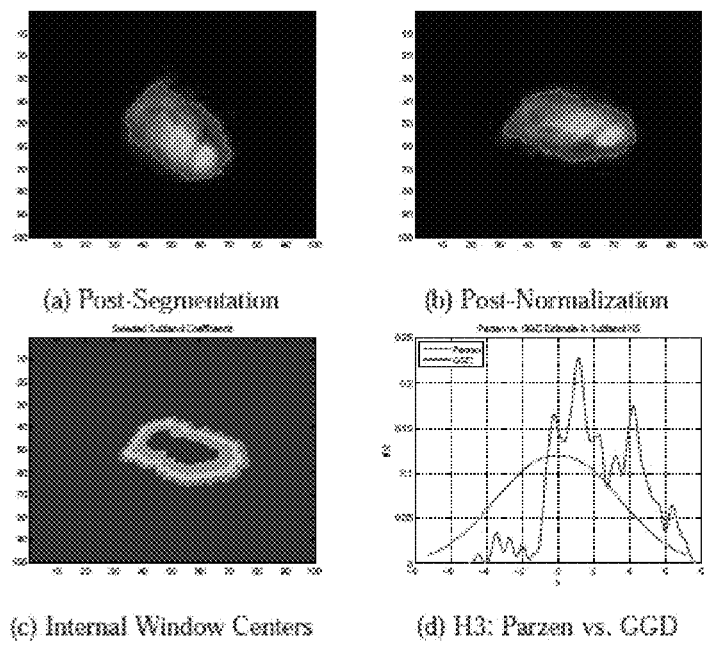
FIG. 9 shows a stem cell nucleus. (a) segmentation of the nucleus, blue contour indicates identified nuclear region; (b) the image normalized, note that the brightest region is to the bottom right; (c) locus of internal window centers at each decomposition level, red are the internal windows at level 3, orange at level 2, green at level 1; (d) Parzen vs. GGD estimate of the coefficient distribution in the third horizontal subband.

In some embodiments, the GGD model becomes inapplicable at wider scale subbands. Consider the image in FIG. 9, which displays a noticeable increase in mean intensity while moving from left to right. As may be seen in the pdf plot in FIG. 10, this gradient couples into the third horizontal subband, leading to a wavelet coefficient distribution that is noticeably biased and hence poorly modeled by the GGD, which is constrained to be symmetric about the origin. This is accounted for by modeling the coefficient pdf using a Parzen density estimator with Gaussian kernel (Thompson and Tapia, 1990), effectively transforming the coefficient histogram into a pdf via Gaussian smoothing:

$$f(x; \{xi\}, \sigma^2) = \frac{1}{N\sqrt{2\pi\sigma^2}} \sum_{i=1}^{n} \exp\left(\frac{(x - x_i)}{2\sigma^2}\right) \qquad (3)$$

Again, x is the random variable (detail coefficient), while $\{x_i\}$ is the set of N detail coefficients calculated for a particular subband. The width parameter $\sigma$ modulates the kernel's effective smoothing radius, set equal to a constant fraction of the histogram support in order to normalize across subbands.

As the texture model is the set of estimated pdfs for each subband, the dissimilarity measure between models is based on the Kullback-Leibler divergence (KLD), which is defined between two pdfs $f_1$ and $f_2$ as:

$$D_{KL}(1, 2) = \int f1(x) \log \frac{f_1(x)}{f_2(x)} dx. \qquad (4)$$

The KLD is asymmetric, but a symmetric version is obtained using $KLD_{sym}(1, 2) = D_{KL}(1, 2) + D_{KL}(2,1)$. This distance is then summed across the detail subbands. When using the Parzen model, the KLD may be determined via numerical integration.

Adaptive Windowing for Coefficient Extraction from Small, Irregularly Shaped Regions Wavelet pyramid analysis decomposes two-dimensional signals in square or rectangular regions. In many applications, this is acceptable; an image may be large enough to file or to crop in order to isolate texturally homogeneous rectangular regions for modeling.

In some embodiments involving small or irregularly shaped objects, such as stem cell nuclei, however, isolating a rectangular region of appropriate size may not be possible. A highly plastic or mobile nucleus might exhibit an irregular shape that deforms considerably over time, preventing the identification of any rectangular region for analysis with sufficient size to estimate accurate statistics. Too, various matrix extension techniques (e.g. periodization, symmetrization, etc.) may introduce statistical artifacts.

In order to extract as many coefficients as possible from each subband of the multiresolution wavelet decomposition of such regions, we introduce adjustable windowing (Lowry et al., 2010). To explain the procedure, assume the existence of a segmentation mask indicating a region of interest within the image, and consider some particular pixel within the mask. If the pixels to the left, above, and diagonally up and to the left are also within the mask, then a 2×2 window whose bottom right corner is that pixel is also within the mask. Now, consider that 2×2 window. If the pixels immediately to its left, above it, and diagonally up and to the left are also within the mask, then a 3×3 window terminating at the initial pixel is entirely within the mask. This process may be iteratively continued to determine the maximum window length that may begin at a particular pixel and remain entirely within the mask.

More precisely, assume the existence of some segmentation mask $M_1$, in which the region of interest is marked 1 and the exterior 0. If a filter of length k is applied to the image, mask $M_k$ indicates the filtered outputs derived from information located entirely within $M_1$ and may be computed recursively as:

$$M_{k+1} = M_k^{0,0} \cap M_k^{0,1} \cap M_k^{1,0} \cap M_k^{1,1} \quad (5)$$

Here, $M_k^{i,j}$ denotes mask $M_k$ right-shifted i pixels and down-shifted j pixels.

We then apply the stationary wavelet transform (SWT) (Pesquet et al., 1996), which up-samples the filter rather than down-sampling the output to the image, so that the detail subbands are identical to the original image in size. For base filter length $n_f$, the SWT decomposition window at level d has length:

$$k = 2^{d-1}(n_f - 1) + 1 \quad (5a)$$

Figure 11:
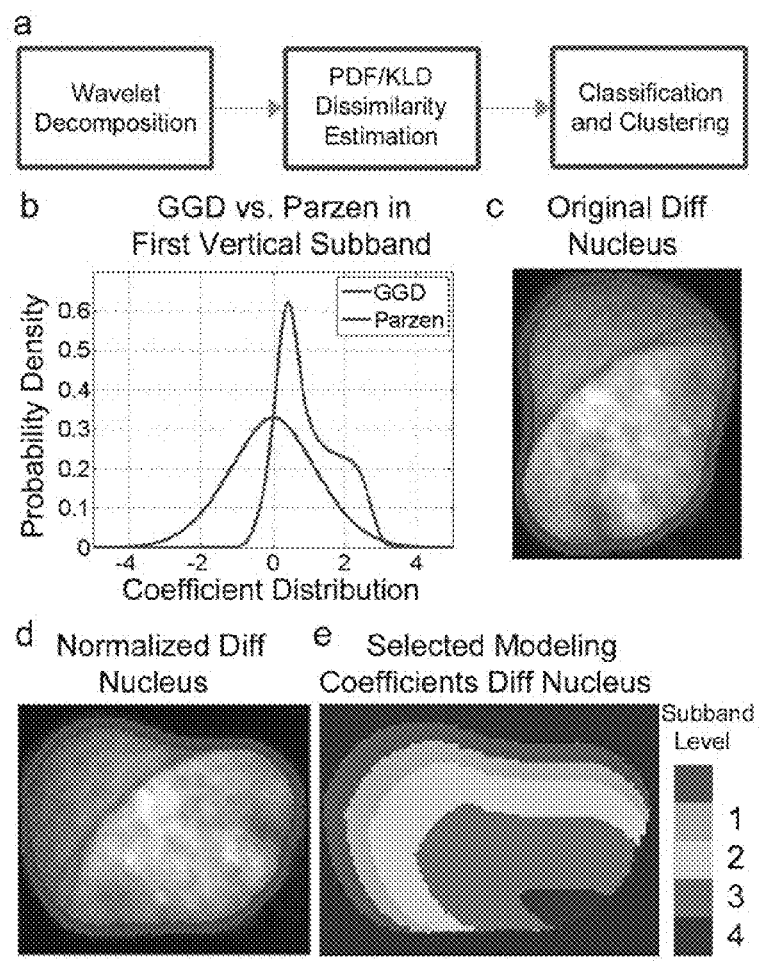
FIG. 11 shows adaptive windowing and texture analysis. (a) Conceptual flow diagram for three-state textural classification. (b)-(e). Textural analysis of early differentiated nucleus. (b) Parzen vs. GGD estimate of the coefficient distribution in the first vertical subband of d; (c) segmentation of the nucleus, blue contour, indicates the identified nuclear region; (d) the normalized image, note that the brightest region is to the bottom right; (e) modeling coefficients selected at each decomposition level, red are the coefficients for level 4, orange at level 3, and yellow at level 2, and cyan at level 1; light blue are interior to the cell but exterior to level 1; dark blue is exterior to the cell. (f)-(g) as (c)-(d) but for a pluripotent cell.

Via the recursive process above, it is then possible to determine which coefficients belong solely to the region of interest at each level. This process is illustrated in FIG. 11c-e. FIG. 11c shows the original image. In 11d, it is rotated to place the cell's lightest quadrant in the bottom right so that any asymmetry in the wavelet decomposition will be biased to the right of the origin. FIG. 11 shows the coefficients selected at each decomposition level; red indicates level 4, orange level 3, yellow level 2, and cyan level 1.

PDF and Textural Dissimilarity Estimation

In order to compute the dissimilarity between textural patches, a pdf estimator may be selected to apply to each of the 3n detail subbands, and then quantify dissimilarity using the information divergence (i.e. Kullback-Leibler divergence or KLD). While other divergence measures exist, such as the L1 divergence ($\int |f_1 - f_2|$) and Bhattacharyya distance, the information divergence is especially convenient as it admits tractable closed-form solutions for two of our pdf models. For two pdfs f and g, the information divergence is defined:

$$D_{KL}(f\|g) = \int_{-\infty}^{\infty} f(x) \log \frac{f(x)}{g(x)} dx \quad (6)$$

For textures with n decomposition levels, the total dissimilarity between two models is:

$$KLD(\{f\},\{g\}) = \Sigma_{i=1}^{3n} k_i (D_{KL}(f_i\|g_i) + D_{KL}(g_i\|f_i)) \quad (7)$$

Generally, $D_{KL}(f\|g) \neq D_{KL}(g\|f)$, so both are added in order to regularize. Likewise, $\{k\}$ are simply weights assigned to particular subbands i. In general, we set all $k_i = 1$, but they might be used to emphasize or penalize certain bands according to prior knowledge.

A variety of different methods may be used to estimate the pdf of the wavelet coefficients and their corresponding KLDs; four exemplary methods are provided below. In practice, model selection involves trade-offs between computational simplicity (parametric models such as the GGD and SαS) and accuracy (more detailed, non-parametric models such as A-L and L-Q).

1. Generalized Gaussian Density (GGD) Models

It was noted early on (Mallat, 1989) that the pdf of the detail coefficients often resembled the symmetric, unimodal generalized Gaussian distribution (GGD):

$$f(x; \alpha, \beta) = \frac{\beta}{2\alpha \Gamma(1/\beta)} e^{-(|x|/\alpha)^\beta} \quad (8)$$

Here, x is the random variable (detail coefficient) and $\alpha$ and $\beta$ are the width factor and shape parameter, respectively. $\Gamma$ indicates the gamma function. The location parameter (i.e. process mean) is assumed to be zero.

The GGD may be used to model a wide variety of symmetric, unimodal density functions. Indeed, special cases include the Gaussian ($\alpha = \sqrt{2}\sigma$, $\beta = 2$), Laplacian ($\alpha = \sigma/\sqrt{2}$, $\beta = 1$), and uniform ($\beta \to \infty$) densities for standard deviation $\sigma$. The standard deviation of a GGD process is:

$$\sigma = \alpha \left( \frac{\Gamma(3/\beta)}{\Gamma(1/\beta)} \right)^{\frac{1}{2}} \quad (9)$$

The utility of this density function in texture characterization was shown in (Van de Wouwer et al., 1999) and (Do et al., 2002), who respectively developed moment-matching and maximum likelihood procedures for calculating $\alpha$ and $\beta$. One of the key advantages of this method is that a closed-form solution exists for the KLD between two GGD processes (Do et al., 2002), simplifying computation:

$$D_{GGD}(f_1 \| f_2) = \log \left( \frac{\alpha_2 \beta_1 \Gamma(1/\beta_2)}{\alpha_1 \beta_2 \Gamma(1/\beta_1)} \right) + \left( \frac{\alpha_1}{\alpha_2} \right)^{\beta_2} \frac{\Gamma((\beta_2+1)/\beta_1)}{\Gamma(1/\beta_1)} - \frac{1}{\beta_1} \quad (10)$$

2. Symmetric Alpha-Stable (SαS) Density Models

Another density family used for texture classification is the symmetric a-stable densities (SαS), used to model distributions with heavier tail probability than allowed by the GGD. While multiple parameterizations exist for the characteristic function of the SαS, we follow type 2 from (Tzagkarakis et al, 2004):

$$\phi(\omega; \alpha, \gamma) = \exp(-\gamma^\alpha |\omega|^\alpha) \quad (11)$$

Here, ω is frequency, and α and γ are respectively the characteristic exponent (0<α≦2) and dispersion (γ>0). Like the GGD, we assume the location parameter is zero. Unlike the GGD, the pdf of the SαS only exists in closed form for a few special cases, including the Cauchy (α=1, scale γ) and Gaussian (α=2, γ=σ/√2) distributions.

We therefore follow the method of (Tzagkarakis et al., 2004), who applied this density to texture analysis by noting that the normalized characteristic function forms a valid pdf:

$$\hat{\phi}(\omega; \alpha, \gamma) = \frac{\alpha \gamma}{2\Gamma(1/\alpha)} \phi(\omega; \alpha, \gamma) \quad (12)$$

The closed-form KLD between two normalized SαS characteristic functions is:

$$D_{S\alpha S}(\hat{\phi}_1 \| \hat{\phi}_2) = \log\left(\frac{\alpha_1 \gamma_1 \Gamma(1/\alpha_2)}{\alpha_2 \gamma_2 \Gamma(1/\alpha_1)}\right) + \left(\frac{\gamma_2}{\gamma_1}\right)^{\alpha_2} \frac{\Gamma((\alpha_2 + 1)/\alpha_1)}{\Gamma(1/\alpha_1)} - \frac{1}{\alpha_1} \quad (13)$$

SαS parameters may be calculated using the maximum likelihood method detailed in (Nolan, 1997) and (Veillete, 2009).

3. Ahmad-Lin (A-L) KLD Estimation

The above pdf families both assume that the distribution is symmetric with process mean at the origin. These assumptions are generally reasonable, especially as we normalize the image according to mean in pre-processing and the detail coefficients are the output of high-pass filters. In some cases, such as the hESC nucleus shown in FIG. 11*e*, a pronounced increase in intensity may be seen as one traverses the cell. This gradient couples into the wider-scale detail subbands, leading to coefficient distributions which are noticeably asymmetric and biased (2b) and are thus poorly modeled via either GGD or SαS distributions.

In some embodiments, it may be desirable to use a KLD estimator which makes no assumptions as to the shape of the underlying distribution. One exemplary embodiment is based on the Ahmad-Lin (A-L) entropy estimator (Ahmad, et al., 1976):

$$D_{A-L}(X \| Y) = \log\frac{|Y|}{|X|} + \frac{1}{|X|} \sum_{z \in X} \left[\log \sum_{x \in X} K(z - x) - \log \sum_{y \in Y} K(z - y)\right] \quad (14)$$

Here, X and Y are the two sets of detail coefficients, and |X| denotes the number of elements in the set X. K(x) indicates some kernel function. By way of example, we have used a Parzen (Gaussian) kernel with bandwidth (Boltz et al., 2007):

$$\sigma = 0.9 \min(\hat{\sigma}, \hat{\rho}/1.34)|\Omega|^{-1/5} \quad (15)$$

Here, Ω is the set of data under estimation (either X or Y), $\hat{\sigma}$ is the empirical standard distribution, and $\hat{\rho}$ is the interquartile range.

In comparison to the GGD and SαS distribution, non-parametric methods have the significant advantage of generality; they make no assumption about the underlying shape of the distribution. However, such estimates are generally expensive to compute and require storing or recomputing the entire decomposition. Consequently, this estimator is most usefully applied in situations in which the empirical coefficient distribution exhibits significant asymmetry or multimodality.

4. Loftsgaarden-Quesenberry (L-Q) KLD Estimation

Kernel-based methods, like the Ahmad-Lin estimator, are famously sensitive to the bandwidth σ. In an attempt to circumvent this, (Boltz et al., 2007) have combined the Ahmad-Lin entropy estimator with the Loftsgaarden-Quesenberry (L-Q) pdf estimator (Loftsgaarden et al., 1965):

$$D_{L-Q}(X \| Y) = \log\frac{|Y|}{|X| - 1} = \frac{d}{|X|} \sum_{x \in X} \log\frac{\rho_k(Y, x)}{\rho_k(X, x)} \quad (16)$$

The dimension is d, which equals one in the univariate case, and $\rho_k(Y, x)$ is the distance from x to the $k^{th}$ nearest element in the set Y, excluding any elements located at x. The neighborhood size k must be chosen a priori; a common choice is k=√|X|. (Boltz et al., 2007) claim that, in general, the KLD estimate is less sensitive to the choice of k than to σ.

Classification

Using the KLD dissimilarity measure, hESC textural patches may then be classified using any convenient classification or clustering algorithm, according to methods known in the art. Exemplary classification methods are described in U.S. Pat. No. 7,711,174 and U.S. patent application Ser. No. 12/321,360, the contents of which are incorporated herein in their entirety. For example, the k-Nearest Neighbor (kNN) algorithm may be applied, or a Support Vector Machine (SVM) may be applied (Mangoubi et al., 2007).

Combination of Techniques

In some embodiments, a combination of techniques described herein may be used. For example, any method known in the art for inducing pluripotent stem cells may be used in combination with the Matrix Edge Onion Peel algorithm and/or the adaptive windowing, method for analyzing images of the cells. Likewise, pluripotent stem cells may be derived according to the epigenetic methods described, and other statistical methods for analyzing cell images may be used. According to the methods, any cells may be used as a starting point for deriving iPSCs, including, but not limited to, fibroblasts and other somatic cells. Moreover, iPSCs may be generated from cells of virtually any organism, such as mouse, rat, pig, non-human primate, and human.

Figure 40:
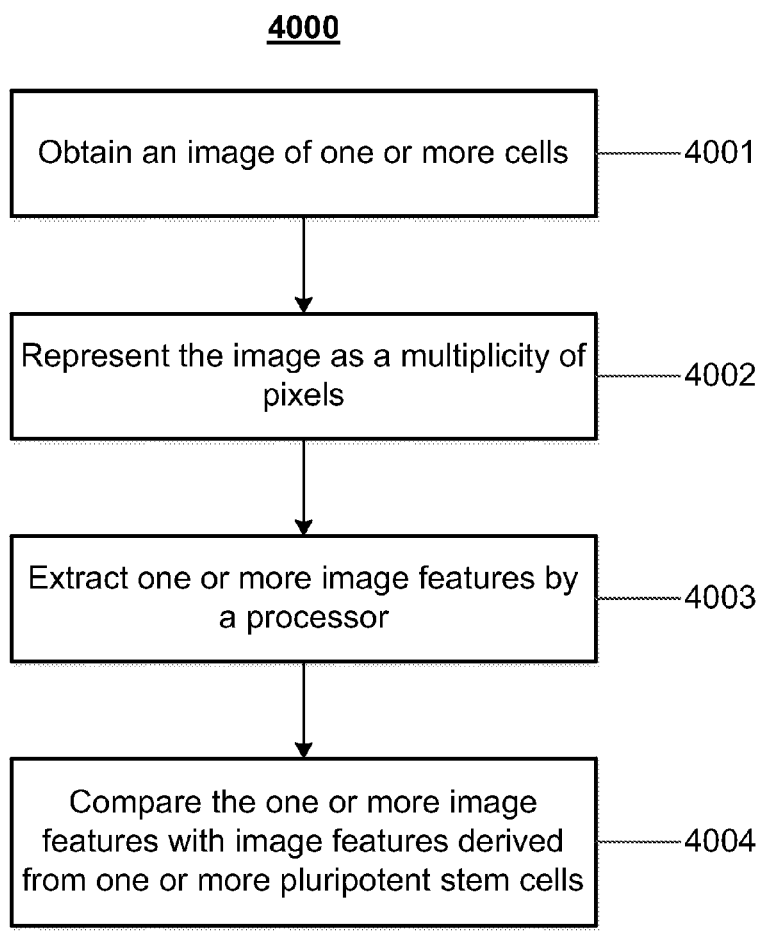
FIG. 40 is a flow chart of a method for identifying induced pluripotent stem cells, in accordance with an illustrative implementation of the present disclosure.

In addition, some embodiments provide a method for deriving induced pluripotent stem cells from somatic cells and identifying the iPSCs, comprising culturing fibroblasts, transfecting the fibroblasts with one or more transcription factors, and reducing activity of one or more epigenetic regulators, wherein the fibroblasts are induced to become pluripotent stem cells. FIG. 40 is a flow chart of a method 4000 for identifying induced pluripotent stem cells. The method 4000 includes obtaining an image of one or more cells (step 4001), representing the image as a multiplicity of pixels (step 4002), using a processor to extract one or more image features from the multiplicity of pixels (step 4003), comparing the one or more image features with image features derived from one or more pluripotent stem cells (step 4004), wherein the processor applies one or more statistical comparison methods to compare the image features, and whereby iPSCs are derived and identified. Having generally described the invention, Applicants refer to the following illustrative examples to help to understand the generally described invention. These specific examples are included merely to illustrate certain aspects and embodiments of the present invention, and they are not intended to limit the invention in any respect. Certain general principles described in the examples however may be generally applicable to other aspects or embodiments of the invention. The invention contemplates that any one or more of the aspects embodiments and other features described above and below can be combined

EXAMPLES

Example 1

Molecular Characterization and Validation of Reprogramming

To validate non-invasive measures of reprogramming, an immunostaining approach is used for a panel of nuclear and cytoplasmic factors characteristic of pluripotency including Oct4, Nanog, Sox2, FGF5R, HNF3b, Fox D,3 and Rex1. Markers of later differentiation stages also differ in pluripotent cells including Gata 6, Bracyury, and AFP (not shown). Additional markers useful for discriminating early pre and post implantation pluripotent lineages have been identified for mouse ESCs (Tesar et al., 2007). Preliminary studies have found these markers in pluripotent hESCs, but not in neuronally differentiated cells. However, the karyotypically normal hESC line H7 grown in different media all have positive immunostaining, but quantitation with automated microscopy reveals very different profiles. The pluripotency panel of H7s on mouse embryo fibroblast feeders in DSR DMEM with knockout Serum Replacer media are much lower than in H7's grown in the feeder free media, StemPro (Invitrogen). Preliminary evaluation of the markers Rex1 and FGF5R suggest that feeders may promote pluripotent epiblast-like cells or primitive endoderm like cells (Rathjen et al., 1999; Pelton et al., 2002) which have high FGF5R levels and low Rex1 levels (FIG. 13a, 13b) rather than inner cell mass like cells with high Rex1 levels and low FGF5R levels (Tesar et al., 2007; Pelton et al., 2002; Chambers et al., 2009). Rex1 in particular develops over time between day 1 and day 5 in StemPro culture (FIG. 13b). Optimized feeder free culture media may promote reprogramming. This example indicates, among other things, that analysis of stem cell structure and gene expression using quantitative and automated approaches reveals distinctions not otherwise observable or ascertainable.

Example 2

Epigenetic State of Pluripotent Stem Cells Compared to Somatic Cells

Figure 24:
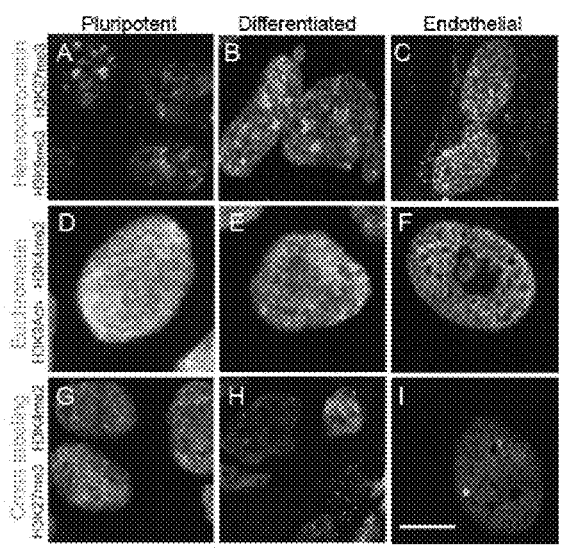
FIG. 24 illustrates how heterochromatin markers coincide, while euchromatin markers separate during differentiation. Chromatin markers (green or red) are co-localized if the overlay produces yellow. Confocal channels were adjusted for equal luminance in each channel. DNA is blue in all figures. (A-C) Heterochromatin markers (H3K9me3 and H3K27me3) do not overlap in pluripotent cells while overlap increases in neural stem cells and endothelial cells. (D-F) euchromatin markers H3K9Ach and H3K4me2 decrease overlap during differentiation. (G-I) Euchromatin and Heterochromatin markers do not overlap. Pluiripotent stem cells show different organization of histone pos-translational markers than differentiated cells. Different markers of heterochromatin (H3K9me3 green and H3K27me3 red, Figure C5, A-C) have different distributions in pluripotent cells but are more colocalized (yellow) in neurally differentiated cells and in somatic cells. Conversely, markers of euchromatin (H3K9ac, green, H3K4me2, red, Figure C5, D-E) are more colocalized in pluripotent cells. Euchromatin and heterochromatin markers are spatially distinct (Figure C5 G-I) at all stages.

Different markers of heterochromatin (H3K9me3 [in green] and H3K27me3 [in red], FIG. 24, A-C) have different distributions in pluripotent cells but are more colocalized (yellow) in neurally differentiated cells and in somatic cells. Conversely, markers of euchromatin (H3K9ac [in green], H3K4me2 [in red], FIG. 24d-24e) are more colocalized in pluripotent cells. Euchromatin and heterochromatin markers are spatially distinct (FIG. 24g-24i) at all stages.

Pluripotent stem cells show different organization of histone posttranslational markers than differentiated cells. Different markers of heterochromatin (H3K9me3 [in green] and H3K27me3 [in red], FIG. 24a-24c) have different distributions in pluripotent cells but are more colocalized (yellow) in neurally differentiated cells and in somatic cells. Conversely, markers of euchromatin (H3K9ac [in green], H3K4me2 [in red], FIG. 24d-24e) are more colocalized in pluripotent cells. Euchromatin and heterochromatin markers are spatially distinct (FIG. 24g-24i) at all stages.

Figure 25:
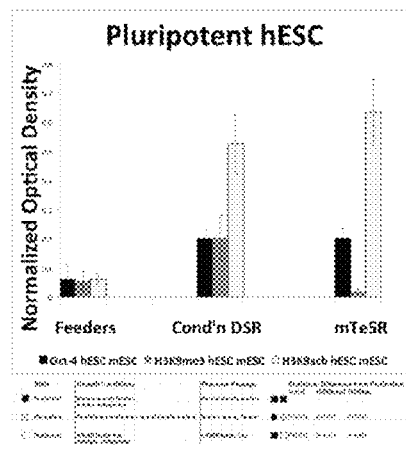
FIG. 25 shows Western Blot analysis of Oct4 and modification of H3K9. Cells on feeders have lower levels of Oct4 (black) and H3K9ac than in the feeder free conditions, conditioned DSR media and mTeSR. H3K9me levels are higher in hESC on feeders or feeder conditioned media in hESC in mTeSR on matrigel.
Figure 26:
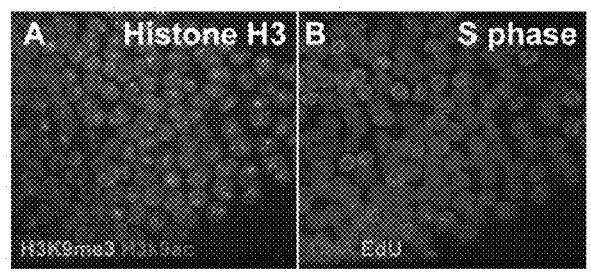
FIG. 26 shows that iPSC chromatin is similar to hESC chromatin. (A) The distribution of H3K9ac (red) is diffuse throughout the nucleus and H3K9me3 is localized in large chromocenters (green), similar to hESCs (FIG. 6). (B) 50% of iPSCs are in S phase (green, EdU, a deoxyuridine analog) similar to hESCs (not shown).
Figure 27:
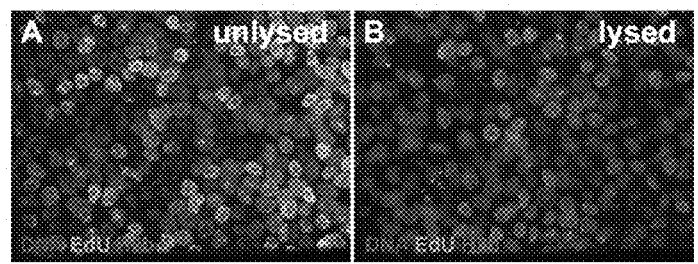
FIG. 27 illustrates how lysis of iPSCs removes histone H2B, similar to hESCs. Unlysed (A) and Lysed (B) iPSCs show a dramatic loss of H2B (red), with no discernable loss of DNA (Hoechst, blue) or recently incorporated EdU nucleotide in S phase cells (green). Cells were extracted for 5 min at 0 C in Ca2+ free buffer. Similar results were obtained in hESC (not shown). Extraction is a measure of histone exchange, complementary to FRAP.
Figure 28:
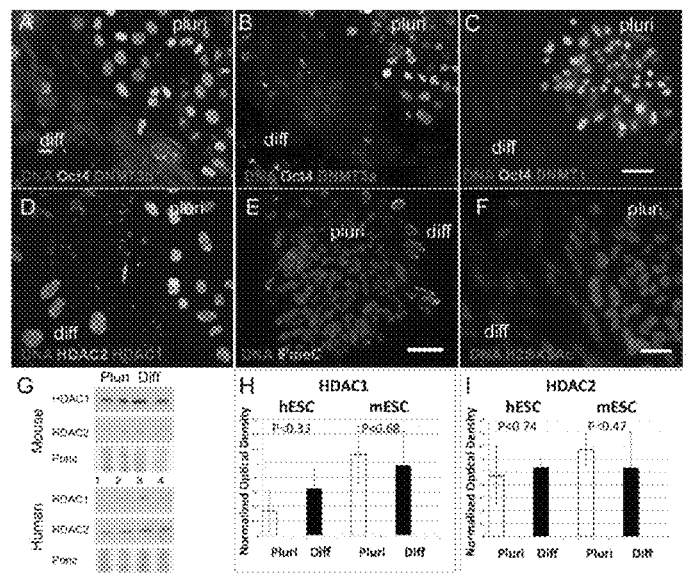
FIG. 28 shows how DNA methyltransferases and histone deacetylases change expression and location upon neural differentiation. DNMT3b (A) and DNMT 3a (B) (red nuclei, top right) are present in pluripotent hESC expressing Oct 4 (green, top right), but absent in differentiated hESC (Hoechst, blue nuclei, bottom left). HDAC1 (red) is present in widely varying levels in pluripotent hESC compared to DNA (blue) and Oct4 (green) levels (C). (D) The ratio of HDAC1, HDAC2 and DNA also varies from location to location in pluripotent cells (top right, D) but is constant throughout the nucleus except the nucleolus in differentiated cells (bottom left, D). Despite the presence of DNMTs in pluripotent cells, activity is low as shown by low levels of 5'me Cytosine (E) Also, the HDAC1 selective target, H2BK5, is still acetylated in pluripotent hESCs (F, top right), but not in neuronal lineages (F, bottom left), despite a constant level of HDAC expression in pluripotent and differentiated cultures of hESC and mESC (G-I). Bar in D, 10 µm.

The epigenetic state of pluripotent cells varies with environmental conditions and lineage stage. Histone methylation differs in ICM-like and epiblast like hESC states. Epiblast-like hESC on feeders and gelatin (DSR media) have lower levels of Oct4 and H3K9 acetylation and higher H3K9 methylation levels than ICM-like hESC in feeder free conditions, in mTeSR on matrigel (FIG. 25), while feeder-conditioned media shows highest levels of H3K9 methylation. IPSCs cultured in StemPro have similar epigenetic histone states compared to hESCs. Histone H3K9ac and H3K9me and the fraction of cells in S phase are similar in iPSCs (FIG. 26), while extraction of H2B after detergent lysis without added salt is similar to hESCs (not shown) but more extractable than differentiated cells, showing that histones binding is labile in both pluripotent cells. The epigenetic state of iPSCs during reprogramming will be characterized, thus adding to the criteria for distinguishing intermediate reprogramming states.

Example 3

Establishing Inducible HDAC1, 2 Knockdown Lines of hESCs & Inhibition of Differentiation Pluripotent cells express several epigenetic enzymes, including DNMT 1, 3a, 3b, and HDAC 1 and 2 (FIG. 28a-28d). In some cases, despite high enzyme levels, enzyme activity is low in pluripotent cells, which reflects by low methylation of DNA (FIG. 28e) or deacetylation of histone H2BK5 (FIG. 28f. The exception are those cells at the colony periphery that have initiated differentiation. Notably, HDAC levels do not change during differentiation on feeders.

Figure 29:
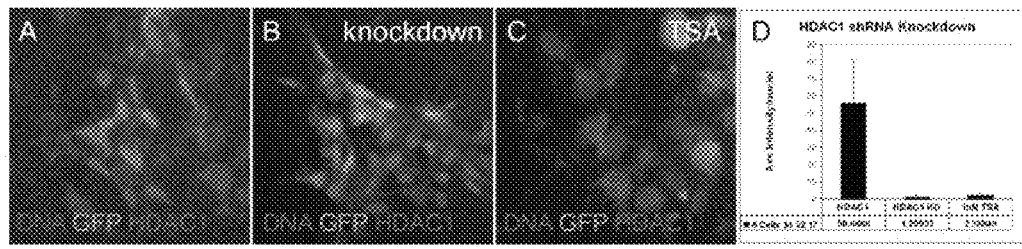
FIG. 29 demonstrates that shRNA HDAC1 knockdown in hESC is as effective as 1 nM TSA, the highest concentration without toxic effects. Cells in B were nucleofected with Open Biosystems HDAC1 shRNAmir in a retroviral pSM2 backbone. Cells were cotransfected with pMAXGFP and 70-80% of cells expressed GFP. Three days after nucleofection a control colony was identified by lack of cytoplasmic GFP (A) while pSM2 HDAC1b transfection was identified within small colonies containing cytoplasmic GFP (B). Quantitative measurement of the nuclear HDAC1 staining (red) is shown in the graph in (D), HDAC1 knockdown reduces HDAC1 staining 30 fold, to a level comparable to 1 nM TSA.
Figure 30:
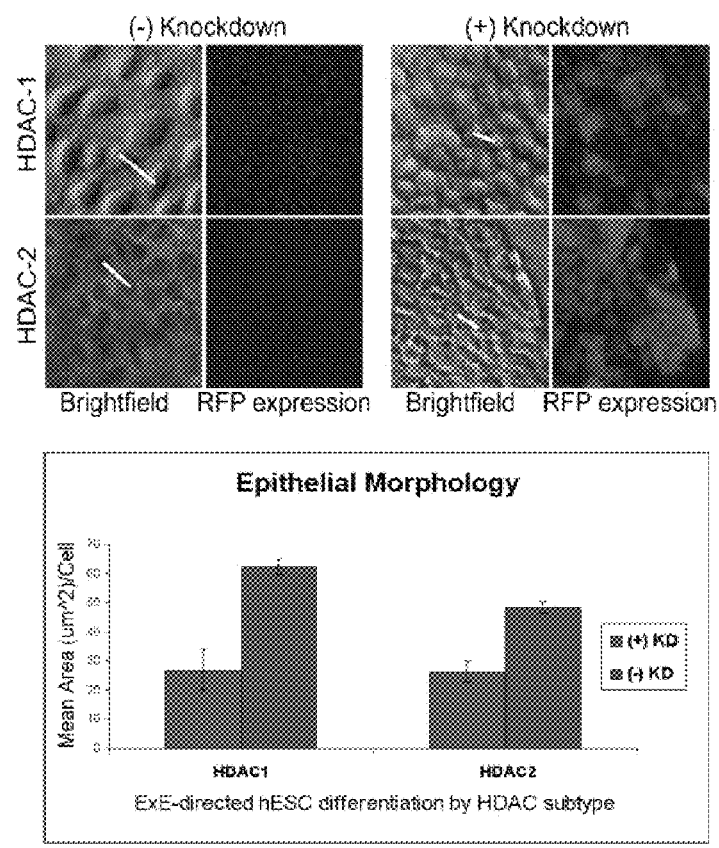
FIG. 30 illustrates how HDAC1 or HDAC2 knockdown delays TE differentiation in BMP4 for 48 hours. HDAC1 or HDAC2 knockdown prevents epithelialization, as shown in the panels (bars, smaller internuclear distance) as measured by epithelial morphology. Internuclear distance (bars, top panel) is significantly greater in controls (–knockdown) Significant at P<0.05.

HDAC 1 and 2 levels in hESCs were modified with tet-inducible lentivirus for HDAC1 & 2 knockdown and a non-silencing control (FIG. 29-30). Several lines of stably transformed hESC have been established and initial testing of the effects of knockdown show an inhibition in the rate of differentiation in doxycyclin-induced HDAC 1 & 2 knockdown lines when challenged to differentiate with BMP4 (FIG. 30). HDAC KD fibroblasts will also be established and the effects on reprogramming efficiency will be determined.

Example 4

Deriving iPSCs from Human Fibroblasts

Human fibroblasts, line IRM90 (ATCC CCL186) are used to derive iPSCs (Yu et al., 2007; Yu et al., 2008). Ectopic expression of the 4 transcription factors, c-Myc Klf4, Oct-4, and Sox2 (MKOS) is induced in these cells with the PiggyBac vector PB-MKOS system (Woltjen et al., 2009; Kaji et al., 2009). Advantages of this system include transposase excision of the inserted DNA after induction of pluripotency to prevent further activity by the ectopic genes. In addition, this non-viral system has high transformation efficiency and uses a single cassette for multicistronic expression of the 4 reprogramming transgenes, separated by 3 different 2A peptide sequences (Hasegawa et al., 2007). Optimized coexpression of MKOS transcription factors from a single insert minimizes the frequency of expression of an incomplete set of MKOS transcription factors, which produces incomplete reprogramming. This expression cassette is induced by coexpression of a constitutively active CAG-rtTA transactivator construct and addition of doxycyclin to the media (Woltjen et al., 2009; Kaji et al., 2009). Commercial lentivirus constructs for tet-inducible MKOS transgenes are also available (StemGent). Lentiviral transformation of hESCs and selection of stable transformed cell lines using puromycin is performed.

The transformation of human fibroblasts is performed in combination with shRNA-mediated knockdown of epigenetic regulators. Fibroblasts from line IRM90 are transformed with a doxycyclin-inducible lentivirus knockdown (KD) shRNA for HDAC1 or 2 and DNMT1, 3a, or 3b and a non-silencing sequence. After HDAC or DNMT KD IRM90 lines are established, the cells are transformed with MKOS transcription factors. Colony transformation is compared in the presence of doxycyclin, which initiates epigenetic changes, or under control conditions in the absence of doxycyclin. Transformation efficiency (fraction of morphologically transformed colonies/feeder cell number), reprogramming efficiency (fraction of colonies with pluripotency markers), and rate of efficiency (efficiency/time) are determined using two methods: i) by counts of colonies detected by morphology using nuclear density and ii) by cytoskeletal reorganization with Hoechst staining (nuclear density in morphologically transformed colonies) and Alexa 546-phalloidin staining (absence of fibroblasts stress fibers, appearance of peripheral actin bands in stem cells, data not shown) and SSEA4 (reprogramming). These validation counts are correlated with colony counts determined by the methods described above. Finally, statistically significant differences among conditions are determined in order to evaluate e the efficacy of epigenetic priming before reprogramming.

Figure 6:
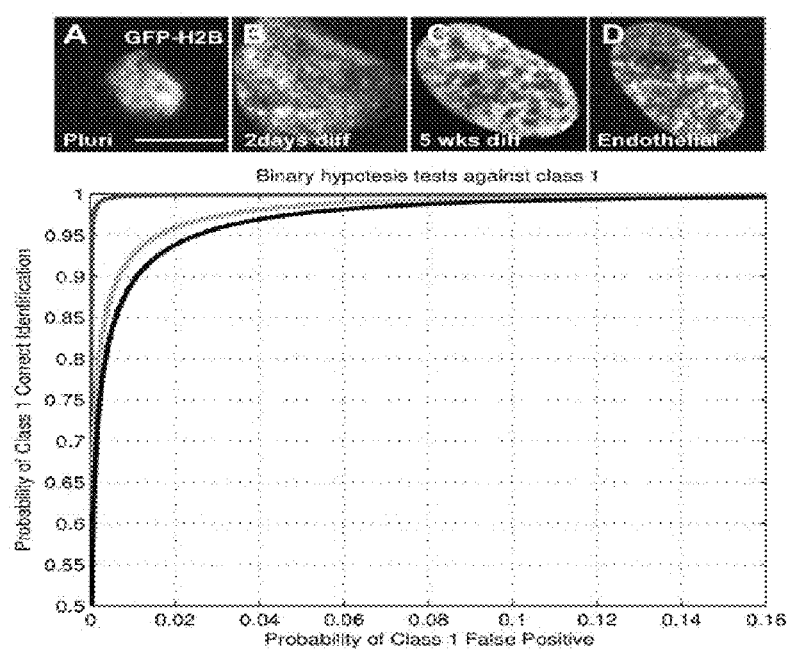
FIG. 6 demonstrates performance evaluation of classification scheme applied to stem cell chromatin. Curves represent probability of correctly identifying a pluripotent nucleus vs. prob. of a false positive from partially or totally differentiated nuclei. Red curve indicates one can correctly identify a pluripotent nucleus (A) from a somatic (D) with prob. 0.99 for a maximum false positive prob. of 0.003. When compared to a 2 day differentiated nucleus (B, blue curve), a tradeoff is 0.96 vs. 0.02. For a 5 week differentiated nucleus (C, black curve), it is 0.094 vs. 0.02.
Figure 12:
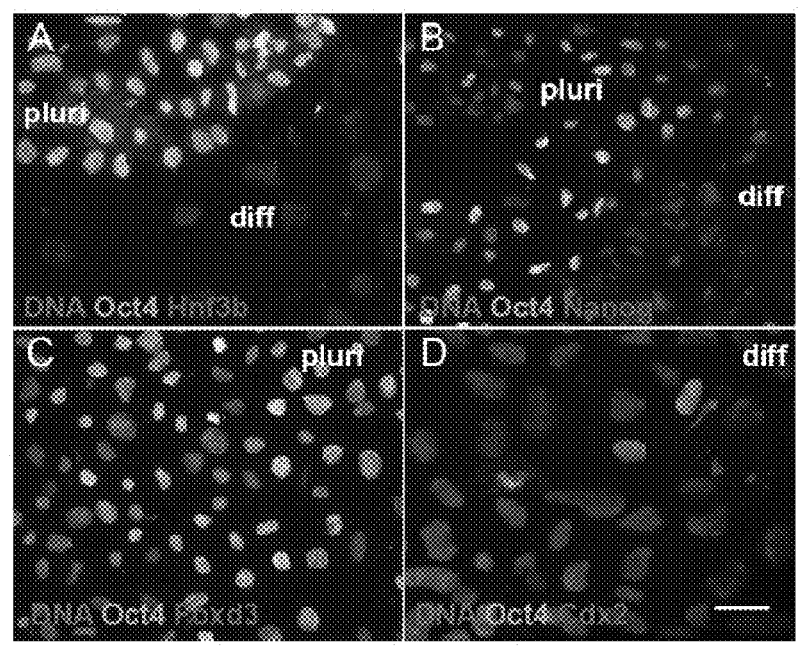
FIG. 12 illustrates markers for pluripotent and early-differentiated cells Oct4 colocalizes in nuclei with additional markers for pluripotency including the transcription factors, Hnf3b (A) Nanog (B) and Foxd3 (C) in colonies grown in normal density feeders (A-C). On low-density feeders (D) Oct4 is absent and the trophectoderm marker, Cdx2 is present in rare cells. Neurectodermal lineages are preferred when hESC are differentiated on low density feeders in our hands.

One lentivirus (Open Biosystems) includes the tet-inducible shRNA pTRIPZ construct with red fluorescent protein and puromycin selection markers. Tet-inducible expression systems have been established in HEK293 cells (not shown) and hESCs. Selection of stable hESCs is established by puromycin selection (FIG. 6). The efficacy of HDAC1 KD is demonstrated in FIG. 12. With nucleofection of a HDAC1 shRNA in a retroviral plasmid the transfection efficiency was 80% of cells and the KD efficacy was 30 fold, similar to the inhibition of HDAC1 by the inhibitor, trichostatin A (TSA).

Example 5

Modification of Environmental Factors for Reprogramming Fibroblasts

Fibroblasts are transformed with MKOS transcription factors in different media for supporting pluripotency. Four exemplary media iPSC reprogramming that support pluripotency include:
1. MEF feeder cells and DSR (DMEM w/knockout serum replacer) on gelatin matrix protein (standard protocol from providers)
2. StemPro media on Geltrex matrix proteins (Invitrogen)
3. mTeSR media on Matrigel matrix proteins (Stem Cell Technologies)
4. EMPM (DMEM, NEAA, Glutamine, 1% ITS, 2% BSA) a custom minimal pluripotency media on Geltrex matrix proteins with and without FGF2, Activin A, Neruegulin, and matrigel.

One standard protocol is to grow iPSCs on feeders and DSR, but StemPro and mTeSR are favorable for hESC and iPSC growth rates, high levels of pluripotency markers and low levels of histone methylation. All of these conditions should favor reprogramming. A basal media, EMPM, promotes survival of hESC for 1-2 weeks in the absence of growth factors, except insulin. This media is evaluated with and without single growth factors FGF2, Activin A, Neruegulin, and with matrigel instead of gelatin. When added to fibroblasts, FGF2 alone increased expression of endogenous pluripotency markers (Page et al., 2009).

Figure 4:
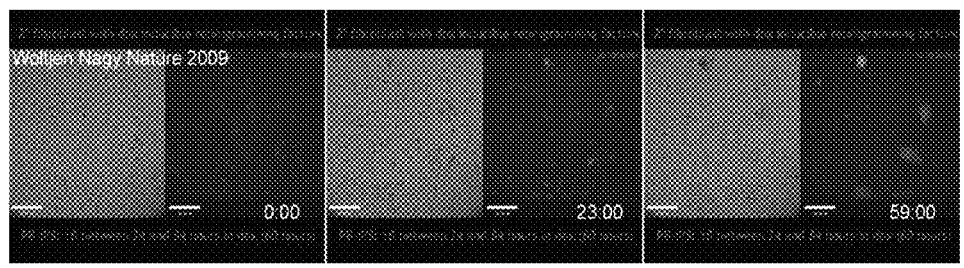
FIG. 4 illustrates nascent iPSCs. Left panels, brightfield images at 0, 23 and 59 hrs after transfection with MKOS transcription factors. Right panels, rtTA-IRES-GFP knocking reveals newly forming iPSCs at 59 hrs, but not with certainty at earlier times.

For live cell experiments, live cell time-lapse series are recorded in non-invasive phase contrast and at least initially with fluorescence to confirm rtTA-IRES-GFP expression for reprogramming factor activation. Various magnifications are evaluated, with 10× magnification likely the minimum for detecting colonies of 10 cells or less (FIG. 4). The time lapse interval is varied, depending on whether colony counting is desired once per day or whether single cell growth and death rates as a function of reprogramming is needed.

Criteria measured from the time lapse video of live cells include the following:
1. Textural criteria compared to control fibroblasts and control iPSCs
2. Presence of reversions to a differentiated morphology
3. Time after transfection for threshold detection
4. Rate of growth of nascent colony (area)
5. Size of colonies at threshold detection
6. Rate of death of cells in colony (cell lysis)
7. Presence or morphological intermediate states between fibroblast and iPSC morphology
8. Rate of cell division of cells in colony Example 6

Validation of Early iPSC Colonies

Figure 13:
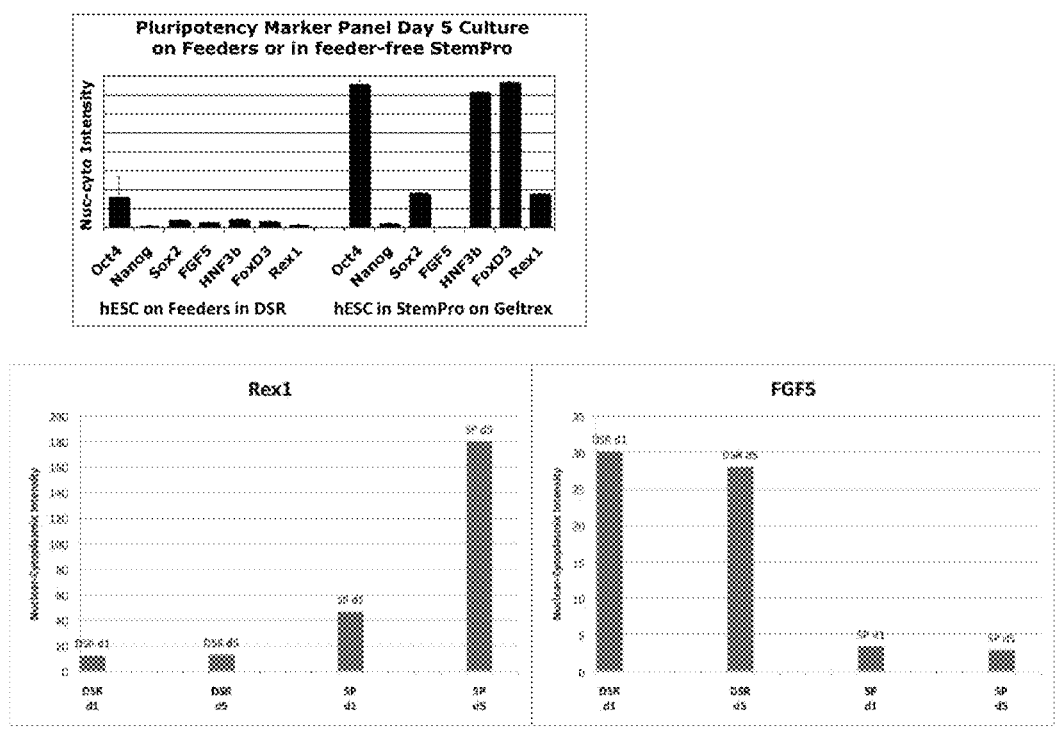
FIG. 13 illustrates a pluripotency panel for molecular confirmation of early developmental stages of pluripotent lineages. H7's grown in 2 standard conditions—on feeders (in DSR and on gelatin) and in feeder free conditions (in StemPro and on Geltrex (matrigel)) show different levels of markers of pluripotency especially Oct, Sox2, HNF3b FoxD3 and Rex1. Rex 1 in particular is a marker of ICM-like cells (StemPro, B) while FGF5R is characteristic of post-implantation epiblast (feeders+DSR, C). Both ICM and epiblast are pluripotent.

Incomplete reprogramming of fibroblasts after MKOS transformation is possible, producing "false" iPSCs. Therefore, morphological determination of iPSC formation (FIG. 4, gray screens) are confirmed by measuring molecular markers of pluripotency (FIG. 4, green screens). First, phase contrast images (grey screens) are analyzed by texture analysis and separate fluorescence images are acquired from the same colonies using extracellular markers of pluripotency, such as SSEA4. Staining with antibodies to SSEA4 is more uniform in H7's than TRA1-60, TRA 1-81, or SSEA3. To confirm that cells are pluripotent in nascent iPSC colonies, four color immunostaining is performed and automatically quantitated using the Thermo Fisher Arrayscan. Quantitative measurements of nascent iPSC and fibroblasts can be distinguished from fibroblasts by internuclear distance (Sammak et al., 2008). Validation of live cell experiments with fixed cell indicators is necessary because expression of single pluripotency transcription factors alone is not sufficient for characterizing the pluripotent state (FIG. 13). For each experimental condition, cells are fixed at various times after induction and immunostained with panels of antibodies to markers of pluripotency and epigenetic states. Markers of pluripotency are indicated in Table 1, and markers of global epigentic state are listed in Table 2.

TABLE 1

| Pluripotency markers (single-cell level immunostaining) | | |
| --- | --- | --- |
| Oct4 | FGF5r | FoxD3 |
| Nanog | HNF3b | Rex1 |
| Sox2 | | Low Cdx2 |
| Low Gata 6 | Low Bracyury | Low AFP |

TABLE 2

| Global Epigenetic Markers (single-cell level immunostaining) | | |
| --- | --- | --- |
| HDAC1 | HDAC2 | HDAC3 |
| DNMT1 | DNMT3a | DNMT3b |
| H3K9me3 | H3K9Ach | H3K4me2 |
| 5Me3Cytidine | | |

Examples 7-14

Additional Methods and Assays for Distinguishing Stem Cells from Differentiated Cells

Example 7

Figure 31:
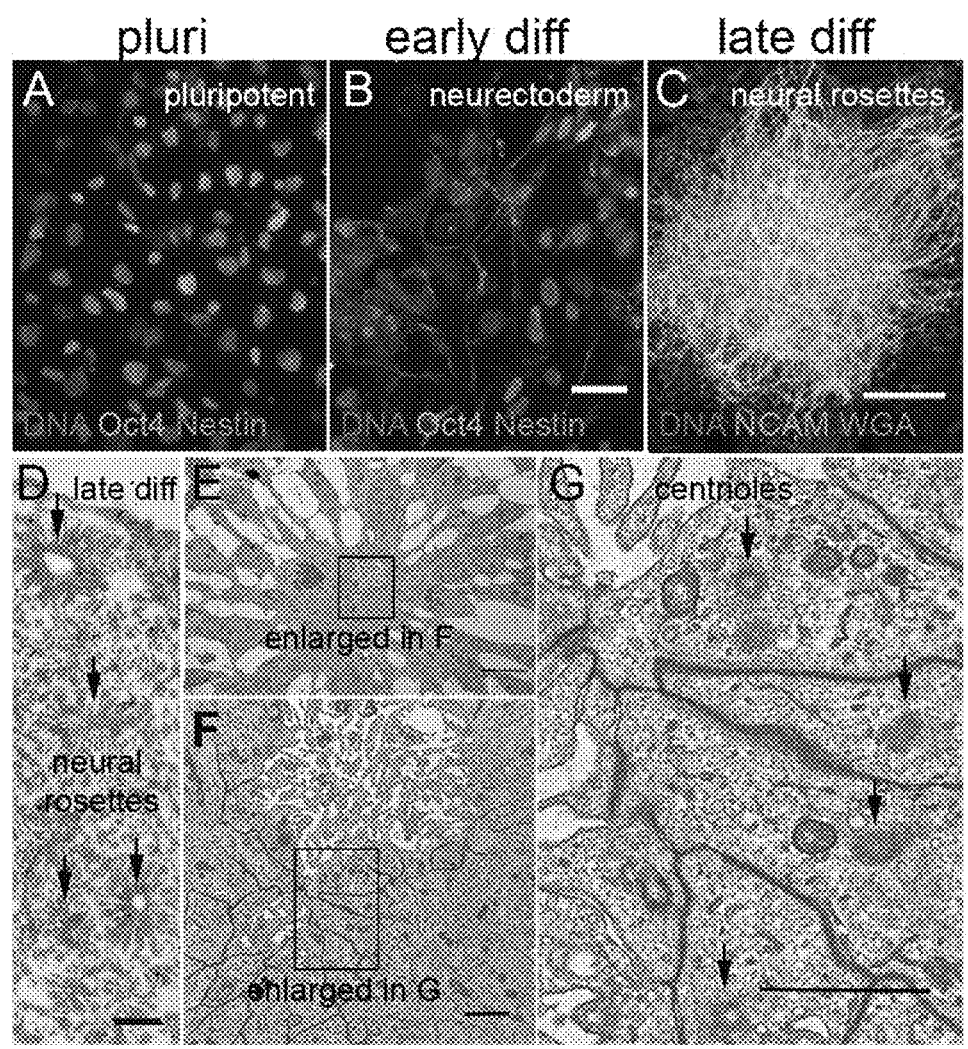
FIG. 31 presents a characterization of three stages of neural differentiation (1, pluri) pluripotent hESC (2, early diff) neurectoderm, and (3, late diff) neural rosette. hESC, lines H7 (a-b) and HSF6 (c-g) were prepared on MEF feeders in pluripotent conditions (pluri, a) and differentiation conditions on low-density feeders (b-g). Flattened, differentiated cells in monolayers were identified at colony edges after week on low-density fibroblasts (early diff, b), while the interior of large multilayer colonies formed rosettes after 2-4 weeks (late diff, c). Pluripotent cells were positive for Oct4 and negative for nestin (a) while early-differentiated cells were positive for nestin and had reduced levels of Oct4 (b), characteristic of neurectoderm. In late differentiated cultures, rosettes of neural stem cells were common between 2 and 4 weeks as shown by multiple astral arrays of NCAM staining (green), within the thicker portions at the center of the colony (cell surface labeled with WGA, red, and Hoechst, blue) (c). Brightfield image of toluidine blue-stained epon-embedded thick section of a differentiated colony show multiple rosettes containing clear central lumens and radial arrays of cells (arrows, d). Rosettes contain a radial array of mitotic and interphase nuclei (e). At the core of the rosette, a clear zone is found (box, enlarged in f) that contains villar projections. The apex of these cells surrounding the lumen shows tight plasma membrane apposition, with an osmophillic mordant in the intercellular space adjacent to the lumen (f). Bundles of intermediate filaments and microtubules radiate from the core and centrioles can be found (arrows) at the apex near the lumen, characteristic of a functionally polarized neuropithelium (g). Bar in b, 10 µm; bar in c and d, 100 µm; bar in f, 2 µm; Bar in g, 1 µm.

Characterization of Pluripotent hESCs and Neural Differentiation on Low-Density MEF Feeders Colonies of hESCs were characterized at three distinct developmental stages: pluripotent (pluri), multipotent neurectoderm (early diff) and neural rosettes (late diff) restricted to neural lineages (Ozolek et al., 2009; Ozolek et al., 2007). Neuronal differentiation was initiated on low density MEFs (5,000/cm$^2$) (Ozolek et al., 2009; Ozolek et al., 2007). Pluripotency was determined by immunostaining for transcription factors Oct4 (FIG. 31a, b), Hhf3b, FoxD3 and Nanog (FIG. 12) and absence of the differentiation markers Nestin (FIG. 31a), Cdx2, (FIG. 12d), Gata6, AFP and brachyury (not shown). Nestin, a neurectoderm marker, was present infrequently in pluripotent H7, (FIG. 31a), but was upregulated in early-differentiated neurectoderm (FIG. 31b) especially at colony edges. Early-differentiated cells grew in epitheliod monolayers, characterized by larger nuclear diameter and greater internuclear distance, (FIGS. 31b, 32b, 33b, e and 36a). Markers for committed neural lineages including GFAP, O4, NCAM or beta-3-tubulin were present only at background levels in neurectodermal cells (not shown). Neurectoderm was multipotent and could form oligodendrocytes, radial glia and to a lesser degree, astrocytes (Ozolek et al., 2009; Ozolek et al., 2007). Late-differentiated colonies were produced from higher density colonies after 2-4 weeks and were enriched in neural rosettes (FIG. 1c, d), characteristic of functionally polarized neural tube epithelium (Bacallao et al., 1989). In contrast to early-differentiated neurectoderm, late-differentiated neural rosettes were present within multilayer regions and were NCAM positive (FIG. 31c).

The in vitro rosettes had several characteristics of organized 3-dimensional tissue. Electron microscopy of the rosette core (FIG. 31e) revealed a fluid-filled clear zone containing villi, characteristic of secretory cells (FIG. 31f). The plasma membranes of apical cells were in tight apposition with an osmiophillic mordant in intercellular spaces (FIG. 31g, box in f). Bundles of intermediate filaments and microtubules radiate from the core and a polarized distribution of centrioles could be found at the apex of several cells (FIG. 31g) near the lumen, characteristic of a secretory epithelium. Thus, the in vitro cell culture system provided a functioning developmental model for evaluating heterochromatin assembly at three distinct developmental stages: (1) pluripotent (pluri), (2) multipotent (early diff) and (3) in committed neural lineages (late diff).

Example 8

Chromatin Condensation Increases by Accretion During Differentiation

Figure 32:
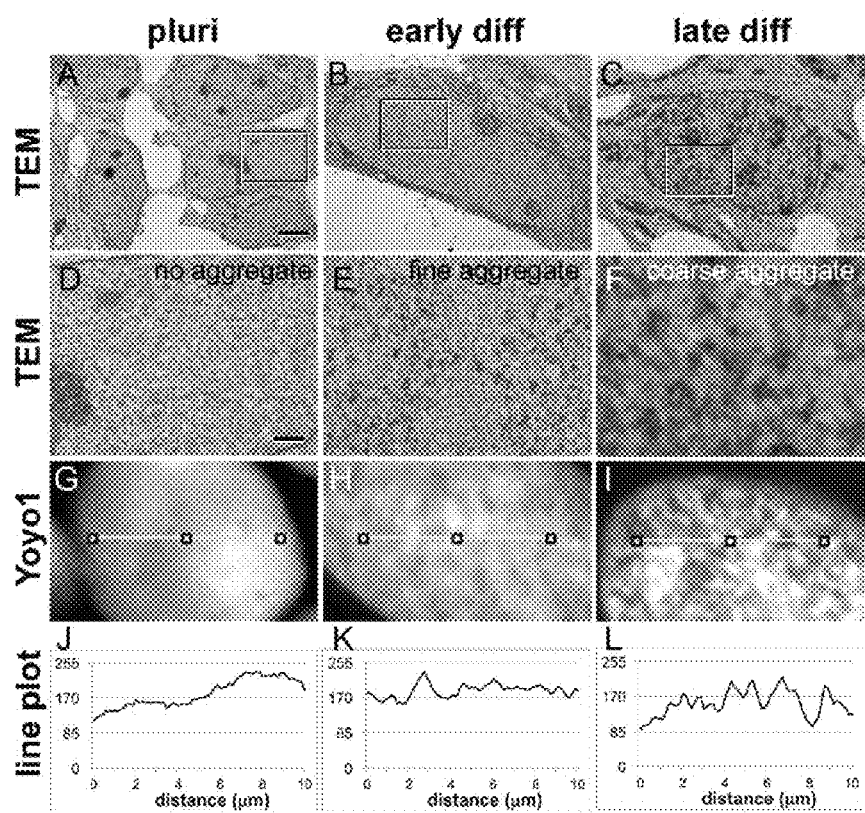
FIG. 32 shows that chromatin condensations increases by accretion during differentiation Pluripotent hESC, line HSF-6, have nuclei with uniform, smooth chromatin that becomes progressively more granular between early and late differentiated stages. Pluripotent (column a-j), early differentiated (column b-k), and late differentiated (column c-l) colonies show increasing granularity as detected by electron microscopy (d-f are enlargements of the box in a-c) and light microscopy with the dye Yoyo-1 (g-i). In pluripotent cells, uniform, fine grained chromatin has no aggregates larger than the limit of detection by light microscopy (g), in neurectoderm, fine aggregates of chromatin are formed by accretion of osmophillic aggregates that are separated by 0.2 □m, and are resolvable by light microscopy (h) and coarse aggregates of chromatin in neural rosettes (0, detectable as larger aggregates by light microscopy (i). Line plots of confocal sections of Yoyo-1 stained DNA show slowly varying intensities (low spatial frequencies) in pluripotent cells (j), high frequency, small amplitude variations in early-differentiated cells (k), and longer frequency, but large amplitude variations in late-differentiated cells (i) (graphs have uniform scaling for intensity and size). Bar in a, 0.5 µM Bar in d, 0.125 µm, Yellow bars in g-i, 10 µm.
Figure 33:
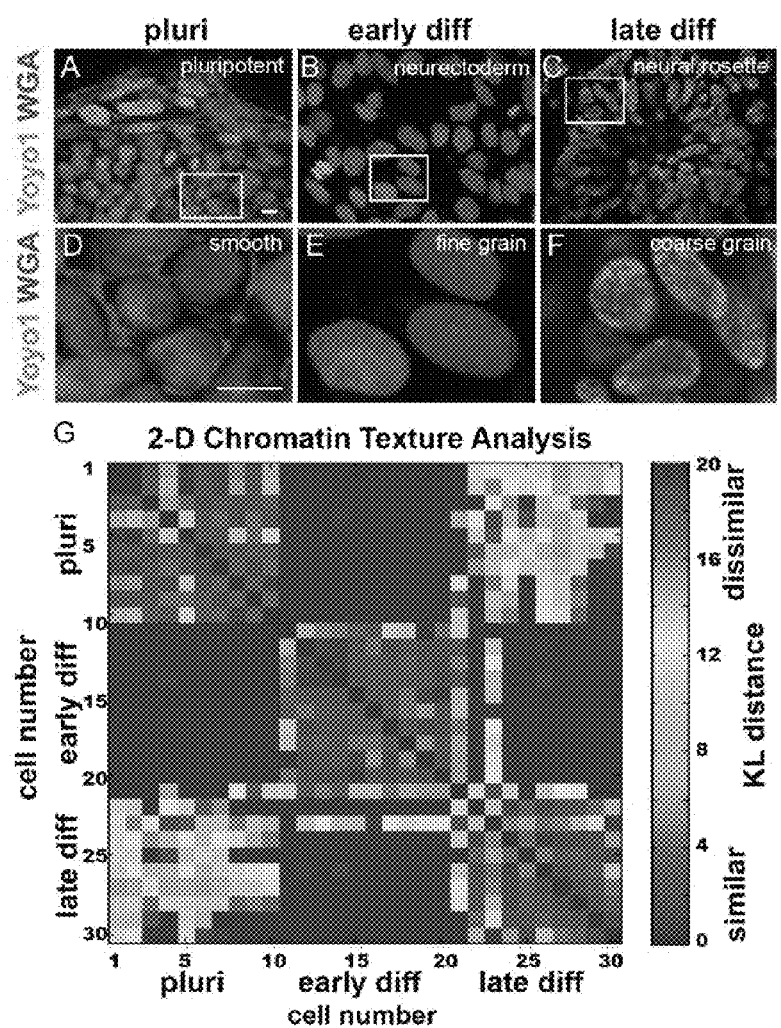
FIG. 33 indicates that texture analysis of heterochromatin condensation during neural differentiation. Chromatin texture is a 2 dimensional, multiscalar measure of object size in the image and is a generalization of linear spatial frequency represented in line plots. Pluripotent (a, d), early differentiated (b-e), and late differentiated (c-f) colonies were stained with the Yoyo1 (green) for DNA. Pluripotent cells were additionally stained with wheat germ agglutinin (a, d, red) to reveal cell and colony surfaces. Confocal images of nuclei (d, e, f are enlargements of the white rectangles in a, b, c, respectively) show that chromatin in pluripotent cells is relatively smooth with gradual variations in intensity across the nucleus, which progressively condenses into fine grain, low contrast patterns (e) and finally into larger grained high contrast domains that are distinctly bright or dark (f), characteristic of heterochromatin and euchromatin, respectively. Quantitative multiscalar wavelet analysis in 2 dimensions in (P) was performed on 10 cells in each category, excluding nuclear borders. The Kullback-Leibler—distance between texture coefficients for every pair of cells is reported. The diagonal KL distances, representing self-similarity, are set to 0 (dark blue). Cross comparison shows that each class of cells has high self-similarity (blue) and high cross-class dissimilarity (red). Fine grained early differentiated nuclei are most different from pluripotent and late differentiated cells (red, KL distance>20), while, pluripotent and late differentiated cells have a KL distance averaging 8.2, showing large texture differences between pluripotent and early differentiated cells. During development, higher order chromatin organization proceeds through accretion from uniform densities, to fine grained, low contrast variations to large grained, high contrast aggregates characteristic of heterochromatin and euchromatin. Bars in a, d; 10 µm.

The morphological transformation of heterochromatin was evaluated at these three distinct developmental stages by light and electron microscopy. Chromatin condensation during differentiation was validated by electron microscopy by an increase in osmiophillic staining (compare FIG. 32d-f, enlargements of the area outlined in white in FIG. 32 a-c). With transmission electron microscopy, osmiophillic staining progressed from extremely fine grain, uniform structure that was below the level of detection by light microscopy in pluripotent hESCs (FIG. 32a, d), to fine-grained aggregates in early-differentiated cells that were just separated by the limit of resolution by light microscopy (0.2 µm) (FIG. 32b, e), to coarse-grained aggregates in late-differentiated hESCs (FIG. 32c, f). DNA density can be measured with fluorescent dyes, which indicate heterochromatin and euchromatin domains (Grigoryev et al., 2006; Mateos-Langerak et al., 2007). Pluripotent cells did not have morphologically distinct euchromatin and heterochromatin, but instead, chromatin density varied slowly across the nucleus (low spatial frequencies) in pluripotent cells (FIG. 32j), exhibited high frequency, small amplitude variations in early-differentiated cells (FIG. 32k), and medium frequency, large amplitude variations in late-differentiated cells (FIG. 32l). Heterochromatin condenses via an intermediate stage characterized by small aggregates that condense into larger domains, a physical process called accretion.

Example 9

Statistical Assessment of Heterochromatin Condensation During Neural Differentiation Heterochromatin accretion was further quantified with wavelet analysis to measure the density variations at multiple spatial scales (Lowry et al., 2010; Mangoubi et al., 2008; Mangoubi et al., 2007; Sammak et al., 2008). Nuclei at three stages (FIG. 33a-c) have different chromatin textures (enlargements in FIG. 33d-f). Ten nuclei from each stage were quantitatively compared (FIG. 33g). The color chart shows the statistical separation of all images as determined by the Kullback-Leibler (KL) distance (Do and Vetterli, 2002). Overall, the self-comparison within each group was similar (blue). The cross-comparisons between different developmental stages were dissimilar (red). We note that for normalized Gaussian densities, where the standard deviation is 1, a KL distance of 7 or higher is equivalent to at least 7 standard deviations of separation between the means of 2 density functions, leading to more than 0.99 confidence level. The intermediate, nascent aggregates of chromatin were texturally separated (KL distance of 20) from both pluripotent cell chromatin and differentiated cell heterochromatin. The main point is that, with the KL distance as an statistical image feature, clustering of nuclei into the right class is automatable: pluripotent, differentiated, or early differentiated. Thus, computer vision methods, specifically statistical multiresolution texture analysis (Lowry et al., 2010; Mangoubi et al., 2008; Mangoubi et al., 2007; Sammak et al., 2008) provides a novel, quantitative measurement of chromatin condensation and statistically distinguishes a new intermediate phase of chromatin accretion that occurs during initiation of differentiation.

Example 10

Figure 34:
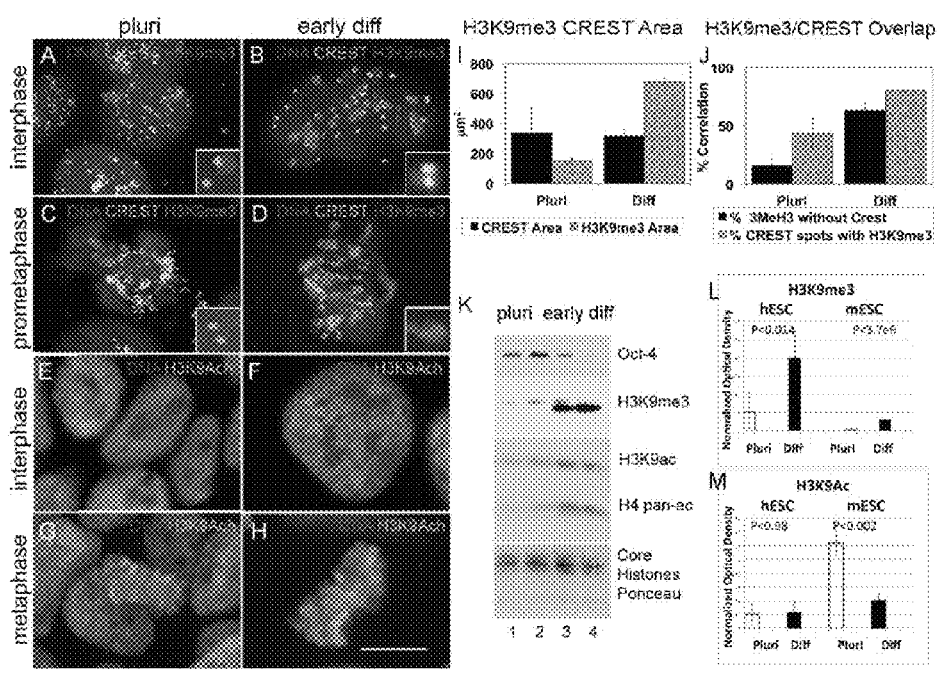
FIG. 34 shows progressive histone H3K9 methylation of centromeres during differentiation without a net change in H3K9 acetylation Confocal sections of HSF-6 in pluripotent colonies (column a) and 5 day differentiated monolayers (column b) were immunostained for histone H3K9me3 (red, a-d), centromeres (CREST serum, green, a-d), H3K9ac (green, e-h) and widefield images of DNA (blue, Hoechst 33342, a-h). Most centromeric spots are surrounded by pericentromeric H3K9me3 in differentiated cells (b, d) but not pluripotent cells (a, c). In prometaphase cells (c, d), centromeres on some chromosomes show undetectable methylation (c) while in early-differentiated cells, the interstitial zone between centromeres is methylated in nearly all chromosomes (inset, c, d). Centromeres are associated with the nuclear periphery in some, but not all differentiated cells (b), but rarely in pluripotent cells (a). H3K9ac levels are more granular after differentiation but total levels are unchanged (e-h). Total nuclear H3K9me3 increased 4 fold after 2 days of differentiation while the area of CREST staining is constant (i). The fraction of centromeres colocalized with H3K9me3 increases from 44% to 80% after 2 days of differentiation (j). Methylation and acetylation of H3 and H4 of human hESC during differentiation (shown by Oct4 levels) were detected by western blot (k). The mean, SD and P value for 4 independent experiments are shown in l, m, demonstrating a significant increase in methylation in mouse and human ESC (l). Acetylation levels measured by western blot (k) are constant by intensity measures in immunostained cells (e-h) and are reduced in mouse but not human ESC (m). Bar in d, 5 p.m.

Pericentromeric Heterochromatin Methylation was Absent from Half of Pluripotent Cell Centromeres In pluripotent cells, pericentromeres were not all the same for H3Kme3 levels (FIG. 34). In HSF6 interphase and prometaphase cells less than half of the centromeres (green, human CREST serum) contained H3K9me3 (red spots), while in early-differentiated cells, most pericentromeres contained H3K9me3 (cf. enlargements in FIG. 34a-d). The area of H3K9me3 increased 4-fold (150±21 µm$^2$ to 676±20 µm$^2$) upon hESC differentiation (FIG. 34i), and as expected the area of CREST spots was constant (n=45±1 centromeres/cell, n=10 pluripotent cells as evaluated from confocal series). H3K9me3 localization at pericentromeres was measured by Mander's correlation coefficients (FIG. 34*j*) which shows that the fraction of pericentromeres that contained H3K9me3 increased from 44±12% in pluripotent cells to 80±1% (n=20 nuclei) in early-differentiated cells. Conversely, most H3K9me3 was pericentromeric in pluripotent hESCs while extra-pericentromeric H3K9me3 increased during differentiation (FIG. 34*c*). Similar results were seen in H7 cells (not shown). H3K9me3 levels in H7 cells measured by immunoblot (FIG. 34*k*) increased 4-fold for human and 10-fold for mouse ESC (0.1±0.1 to 0.4±0.14, P<0.014 for human and 0.006±0.001 to 0.6±0.002, P<3.7×10$^6$ for mouse, FIG. 34*l*). This finding suggests that assembly of pericentric was incomplete in pluripotent cells and that constitutive heterochromatin completed assembly only after hESC differentiation.

Figure 35:
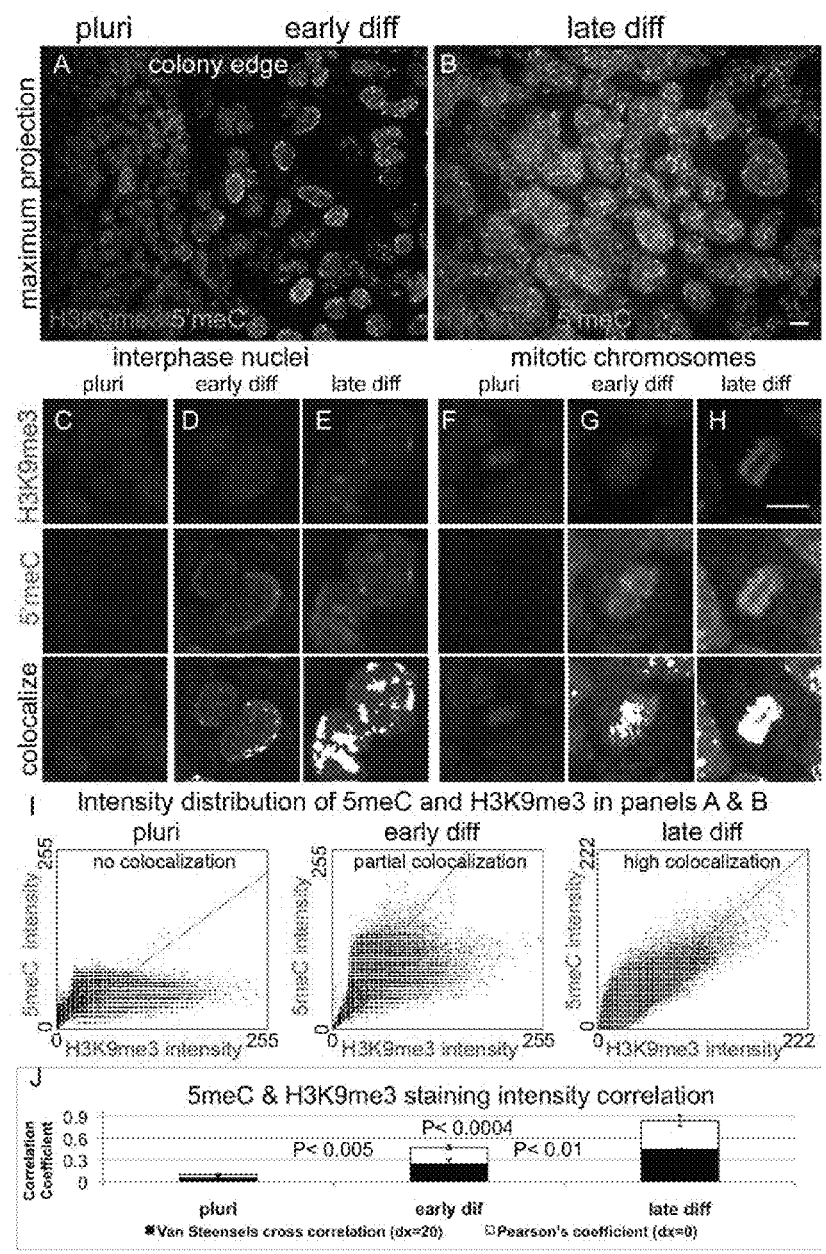
FIG. 35 demonstrates that formation of heterochromatin during hESC differentiation includes methylation of histone H3K9 and DNA at cytosine and increasing condensation Methylated histone and DNA are increasingly colocalized during differentiation. Maximum Projection, contrast stretched images (a, b) and linear confocal sections (c-h) of hESCs line HSF-6 are shown with staining for methylated H3K9me3 (red) and 5meC (green). At the edge of a differentiating colony (a), 5meC (green) becomes detectable only outside the colony and is particularly elevated at the periphery of each nucleus. By 10 days after differentiation, methylated DNA and histone coincide in spots (white, c-h), although DNA methylation particularly in the nuclear periphery is not limited to areas of H3K9me3 staining (b). Interphase (c, d, e) and mitotic (f, g, h) cells are shown with H3K9me3 (red), 5meC (green) and colocalization above threshold (white). In interphase nuclei, pluripotent cells contain H3K9me3 while 5meC appears in cells at the colony edge, first appearing at the nuclear periphery (d) and finally colocalizing with H3K9me3 (e). In mitotic cells, centromeric H3K9me3 appears without significant 5meC (f). At colony edges, 5meC preferentially appears at distal chromosome arms (g), while overlap with H3K9 m3 is restricted to proximal regions of chromosomes. Methylated histone and DNA colocalize along entire chromosome arms in differentiated cells (h). Progressive correlation of methylated histone and DNA in confocal slices of the colonies shown in panel A, B is shown in cytofluorograms (i) that show the pixel-by-pixel distribution of intensity of DNA and histone methylation. The pluri cells show no colocalization (left side, A) with very little DNA methylation (K). The red lines (i) show the median of this distribution. The early differentiated cells (right side, a) show a broad distribution about the median value showing partial colocalization, while the late differentiated cells (b) show a tight distribution about the median showing high correlation with a stoichiometry of 1:1 (i). The Pearson's coefficient (white bar, j) shows increasing correlation during differentiation (mean, SD and P value from T-test are shown). Van Steensel's cross correlation is the Pearson's Coefficient after a 20-pixel shift of one of the images, measures the spatial sharpness of the co-distribution. The Van Steensel's coefficient (black bar, j) increases during differentiation, showing less diffuse, more particulate distribution after differentiation. Bar in b and h, 10 μm.

The nuclear distribution of H3K9ac in pluripotent hESCs was diffuse during interphase, except for nucleoli (FIG. 34*e*). While H3K9ac is more granular upon early-differentiation (FIG. 34*f*), the levels of immunostaining in HSF6 cells were not significantly different (not shown). Measurement of normalized immunoblot band density in H7 cells averaged over 4 independent biological samples confirms that the difference in H3K9ac (FIG. 34*m*) was not significant. However, a decrease in H3K9ac in mouse ESC during differentiation was observed and significant under identical conditions. Thus, in human hESCs we observed progressive histone H3K9me3 on pericentromeres independent of gross changes in global levels of H3K9ac. H3K9ac levels have been reported to decrease upon hESC differentiation (Krejci et al., 2009) and indeed we also see significant H3K9ac decreases with neural differentiation that produce neural and oligodendrocyte precursors (manuscript in preparation). However, in the case of neurectoderm produced by 7-day culture on low-density feeders, developmental markers such as Oct4 and Nestin (FIG. 31), and epigenetic markers such as 5MeC (FIG. 35) and pericentromere-specific H3K9me3 (FIG. 33) occur in the absence of significant changes in H3K9 acetylation.

Example 11

Increasing Amount and Correlation of Methylated DNA and Histone During hESC Differentiation Maximum projection confocal sections of HSF6 hESCs immunostained for methylated histone (H3K9me3, red) and DNA (5meC, green) showed that 5meC increased in early-differentiated cells at colony edges (FIG. 35*a*, right). In late-differentiated cells H3K9me3 coalesced with 5MeC (FIG. 35*b*). Measurement of histone and DNA correlation is shown in FIG. 35*c-j*. Single confocal slices with constant linear contrast are shown in the enlargements of single interphase (c-e) and mitotic (f-h) cells. Colocalized domains above a constant threshold are shown in white. In interphase nuclei, trimethylated H3K9 appeared in small, low intensity spots that coalesce into larger, brighter spots upon late differentiation (FIG. 35*c-e*). In mitotic cells, centromeric H3K9me3 appeared without significant 5meC in pluripotent cells (FIG. 35*f*), while 5meC first appeared at highest levels at distal chromosome arms in early-differentiated hESCs, unlike the mostly pericentromeric distribution of H3K9me3 (FIGS. 34*c*, 35*g*). 5meC immunostaining extended the full chromosome length in late differentiated cells (FIG. 35*h*).

Cytofluorograms (FIG. 35*i*) were prepared from single confocal sections of the colonies (FIG. 35 *a*, *b*) and revealed a progressive increase in the correlation of methylated histone and DNA upon differentiation. In pluripotent cells most 5meC staining was not distinguishable from noise (low values on y-axis). In early-differentiated cells, x and y values of the intensity distribution fall about the median (red line), but the breadth of the distribution was wide, showing partial colocalization. In late-differentiated cells, the x and y intensities tightly followed the median, showing high colocalization and 1:1 stoichiometry. The stoichiometric value depends on antigen density and fluorescence exposure time and so are not absolute. The average Pearson's correlation coefficient for 4 independent colonies shows that the correlation of methylated DNA with methylated histones increases 8.4-fold (p<0.0004, FIG. 33J). The Van Steensel's cross correlation coefficient was calculated similarly except one image is offset by 20 pixels, thus showing the spatial sharpness of methylated domain distributions (Bolte and Cordelieres, 2006; van Steensel et al., 1996). The 8.5-fold increase in the Van Steensel's cross correlation coefficient during differentiation demonstrates that the co-distribution of DNA and histone methylation included foci during differentiation rather than the diffuse distribution observed in pluripotent cells. (P<0.01, FIG. 35*j*).

Example 12

Figure 36:
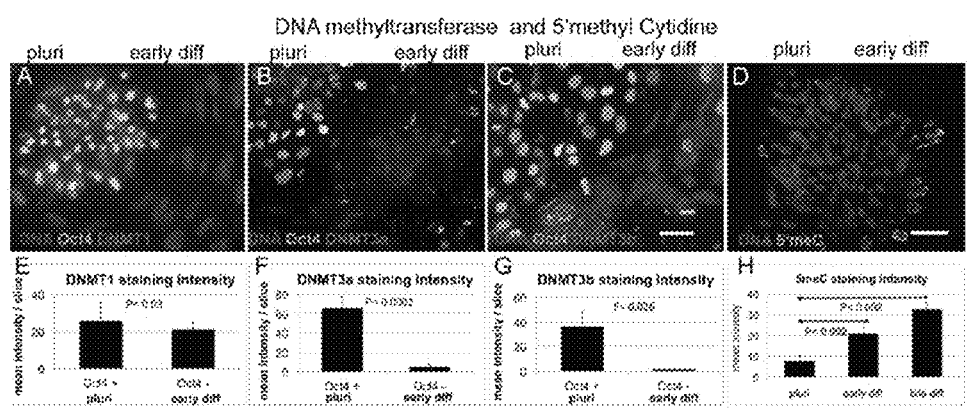
FIG. 36 shows expression of epigenetic enzymes in pluripotent hESCs. In pluripotent hESC, the epigenetic enzymes, DNMT1, 3a &, 3b have elevated protein levels but low activity on DNA and histone substrates until differentiation is initiated In hESC, line H7, DNMTs 1, 3a, 3b (red nuclei, a-c, respectively) are present in pluripotent hESC (left side of each panel) expressing Oct4 (green, a-c), but absent in differentiated hESC (right side of each panel, Hoechst, blue nuclei). Pluripotent nuclei positive in the red, green and blue channel appear mauve. DNMTs 3b and 3a follow Oct 4 intensity among pluripotent cells (constant mauve hue) while DNMT1 appears to vary in pluripotent cells independently of Oct4 (varying hues from green to red). The DNMT levels after differentiation are clearly above background for DNMT1 (a, e) but are nearly undetectable for DNMT3a (b, f) and DNMT3b (c, g). Despite the presence of DNMTs in pluripotent cells, the product of DNMTs (5meC) was present at very low levels and only increased in early-differentiated cells at the periphery of colonies (d). Quantitation of 5meC in HSF6 cells show progressive increases in global DNA methylation from pluri, early to late diff stages, h). Bar in c, 10 μm. Bar in d, 100 μm.

DNMT1, 3a & 3b Decreased to Background Levels Upon Differentiation While Maintenance Methyltransferase DNMT1 was Retained In hESC, line H7, DNMT1, 3a, and 3b (FIGS. 36*a*, 36*e*, 36*b*, 36*f* and, 36*c*, 36*g*, respectively) were present in pluripotent hESCs but were reduced in Oct4 negative early-differentiated hESCs (bottom right of each panel in FIG. 36*a-c*). DNMT3a and 3b, enzymes responsible for de novo DNA methylation, varied proportionally to Oct4 intensity from cell-to-cell, and became undetectable in Oct4 negative cells, decreasing 15-fold and 32-fold, respectively (significant at P<0.002, FIG. 36*f*, 36*g*). DNMT1, necessary for maintenance DNA methylation, varied in pluripotent cells independently of Oct4 levels. After differentiation, DNMT1 levels did not decrease significantly (1.2-fold P<0.27, FIG. 36*e*). The product of DNMT activity, 5MeC, is low in pluripotent cells (FIG. 36*d* (H7 cells), and 6 h (HSF6 cells)), and intensity increased in HSF6 cells by 2.7 fold in early-differentiated cells and by 4.3 fold late-differentiated cells (P<0.002), suggesting that DNMT activity increased specifically during this transition.

Example 13

Figure 10:
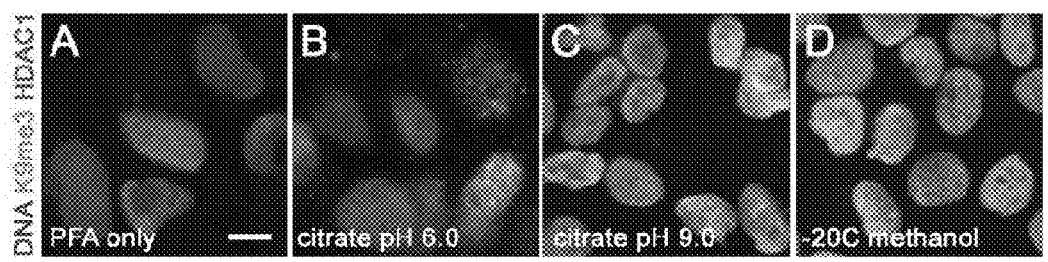
FIG. 10 shows that antigen retrieval for H3K9me3 and HDAC1 improve uniformity of immunodetection. Chromatin reorganization during differentiation was evaluated in hESC colonies by immunofluorescence. Observations in control cells, including HeLa and MEFs, demonstrated inconsistent staining with heterochromatin antibodies using PFA fixation or MeOH fixation. Inconsistent antibody staining is not due to inconsistent penetration of antibody since all cells were detergent extracted and could be stained for other nuclear proteins such as transcription factors (not shown). We evaluated immunostaining of H3K9me3 (green) and HDAC1 (red) staining under different post fix antigen retrieval conditions. Optimal HDAC staining was obtained with 95 C citrate, pH 6.0, for 30 min© but this condition produced poor immunostaining of H3K9me3. Better, though suboptimal, H3K9me3 staining was observed in room temperature citrate, pH 7.4, for 5 min as not all cells stained positively for H3K9me3. Better consistency of both antigen staining was produced by alkaline conditions (C) or post paraformaldehyde treatment with cold methanol (D). Methanol is modestly better than alkaline conditions. These methods produce consistent staining for all antibodies studied to date including H3K9-3Me, H3K9ac, HDAC1, HDAC2, Crest, Oct-4, Nestin, HP1 alpha, HP1 beta, with almost 100% positive antigen staining and low cytoplasmic background staining.
Figure 37:
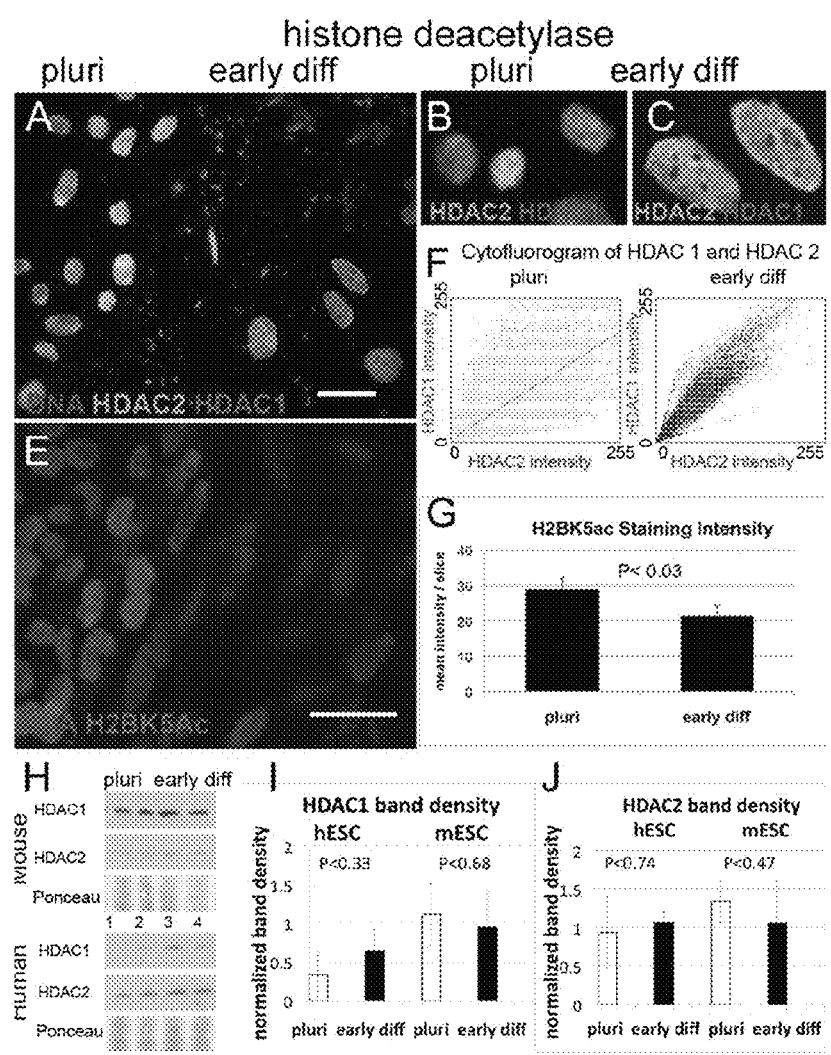
FIG. 37 shows that HDAC 1 and 2 colocalization and deacetylases activity increases but protein levels do not change during neuronal differentiation The ratio of HDAC1, HDAC2 and DNA varies between different nuclear domains as illustrated by polychrome pluripotent cell nuclei (a, b, Oct4 positive, not shown) but is uniform in differentiated cells (a, c). Cytofluorograms show that HDAC 1 and 2 distributions are uncorrelated in pluripotent cells and become more tightly correlated in early-differentiated cells (f). A selective substrate for HDAC1 (H2BK5ac) remains acetylated in pluripotent cells and become deacetylated in differentiated cells (e, g). Western blots (h) were probed for HDAC1 and reprobed for HDAC 2 in mouse and human ESC and Ponceau S staining of pluripotent (lane 1 and 2) and differentiated (lane 3 and 4) ESC. Normalized mean and SD of 3 samples of HDAC1 (i) and 2 (j) are not statistically different between pluripotent and differentiated cells in mouse and human ESC. Bar in a & e, 10 μm.

HDAC 1 and 2 Colocalize and Deacetylase Activity Increases Without an Increase in Protein Levels HDACs were present in both pluripotent and early-differentiated hESCs (FIG. 37*a-c*, and h-j). HDAC levels, measured by western blot (FIG. 37*h*) revealed that HDAC1 (FIG. 37*i*) and 2 (FIG. 37*j*), levels were not statistically different during differentiation in either mouse or human ESCs. The ratio of the staining intensity of HDAC 1 and 2 varied in pluripotent cell nuclei but was spatially constant in early-differentiated hESCs (see enlargements adjusted for equal red and green luminance, FIG. 37*b*, *c*). Cytofluorograms similarly show a broad intensity distribution (low correlation) in pluripotent cells compared to a tighter distribution in early-differentiated cells (FIG. 37*f*). H2BK5, a selective substrate for HDAC1 (Barski et al., 2007), was acetylated in pluripotent cells (FIG. 37*e*), 27% lower in early differentiated cells (p<0.03, FIG. 37*g*), and undetectable in late-differentiated cells (not shown). FIG. 10 shows that antigen retrieval for H3K9me3 and HDAC1 improve uniformity of immunodetection.

Example 14

Figure 38:
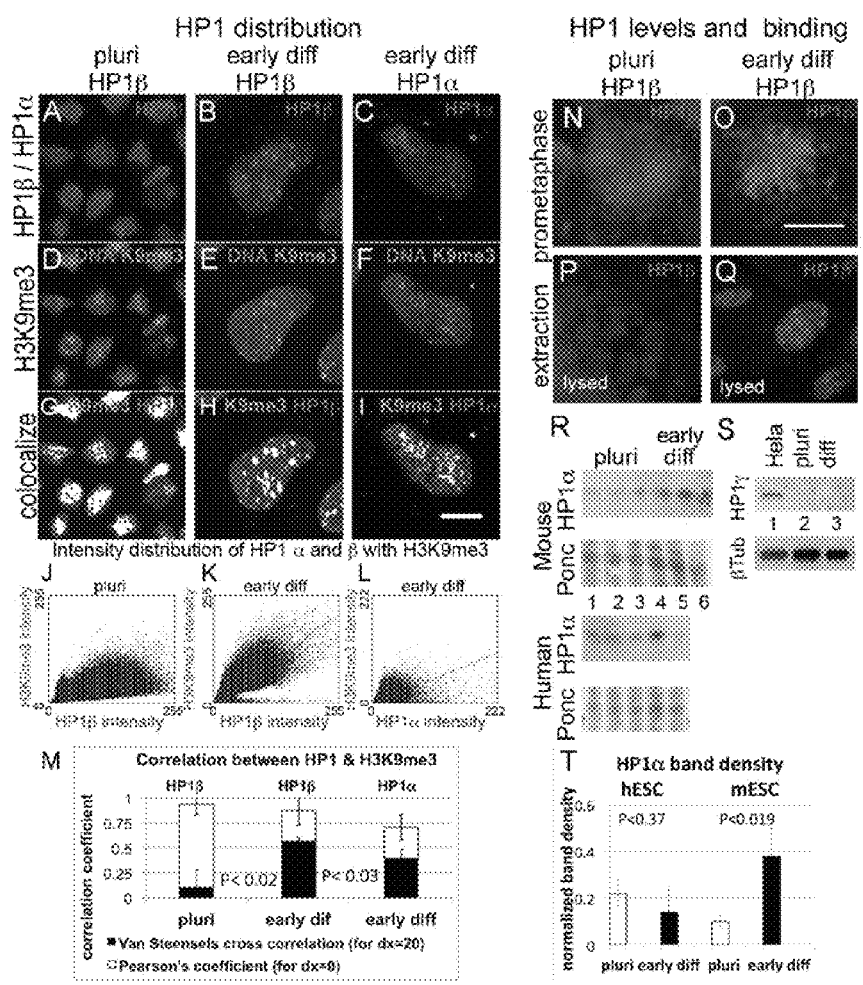
FIG. 38 demonstrates how HP1β increasingly colocalizes with H3K9me3, binds mitotic chromosomes, and is less extractable after lysis of differentiated cells Pluripotent (a, d, c) hESC, line H7, show diffuse HP1β (a, red), while early differentiated cells show increasingly focal distribution of HP1β (b) and HP1α (c, red). H3K9me3 (d-f, green) distribution is both diffuse and focal, and colocalization with HP1β occurs with diffuse H3K9me3 in pluripotent and early differentiated cells (g, h, yellow and white) and with H3K9me3 focal spots only in early differentiated cells (b, white). HP1α is less colocalized than HP1β with H3K9me3 positive chromocenters (c, i, reduced yellow and white). Cytofluorograms of intensity distributions show that HP1β has partial colocalization with H3K9me3 in pluripotent cells with a low stoichiometry (median line, red, j) a partial colocalization with a near 1:1 stoichiometry (median line, red, k), and HP1α has an intensity distribution that is mostly due to noise (low intensity near the origin, l). The Pearson's and Van Steensel's correlation coefficients (m) show that H3K9me3 is selectively colocalized with HP1β and the distribution becomes sharper in early-differentiated cells, and that HP1α has a lower correlation with H3K9me3. In mitotic cells, HP1β has a cytoplasmic distribution and is absent from mitotic chromosomes in pluripotent cells (n) while in early-differentiated cells, HP1β is bound to chromosomes and is absent from the cytoplasm (ob). Pre-fix lysis in 0.5% Tx-100 reveals complete extractability of HP1β from pluripotent hESC (pc) but not early differentiated cells (q). Western Blot levels in hESC line H7 show that levels of HP1α are unchanged in human but not mouse ESC during differentiation (r, t). HP1γ is expressed at low levels in hESC (s). Bar in i (for a-i, p, q) and o (for n, o), 5 μm.

HP1β Increasingly Colocalizes with H3K9me3, Mitotic Chromosomes, and is Less Extractable Upon hESC Differentiation Pluripotent hESCs, line H7, show diffuse HP1β (FIG. 38a), while early-differentiated cells showed an increasingly focal distribution of HP1β and HP1α (FIG. 38b, c, respectively). The same pattern was observed upon mouse ECS differentiation (not shown). Because of their diffuse distribution in pluripotent cells, HP1α and HP1β overlapped nonspecifically with H3K9me3 (FIG. 38g). But in early-differentiated cells HP1β codistributed with H3Kme3 focal spots (FIG. 38h, white) while the small focal spots of HP1α showed less colocalization with H3K9me3 positive chromocenters (FIG. 38i). The co-distribution of HP1 was measured by cytofluorograms (FIG. 38j-l) and by Pearson's and Van Steensel's correlation coefficients (FIG. 38m) that quantified the colocalization of H3K9me3 with HP but not with HP1α in early differentiated cells. Similar changes were seen in mouse ESCs (not shown). Protein levels of HP1β remained unchanged in human ESCs, but increased in mouse ESCs (FIG. 38r, t) emphasizing species-specific heterochromatin assembly mechanisms. HP1β, which is preferentially associated with chromocenters, was not detected (FIG. 38s). In pluripotent mitotic cells, HP1β was excluded from chromosomes and was restricted to the cytoplasm (FIG. 38n). In contrast, in early-differentiated mitotic cells HP1β bound chromosomes and was absent from the cytoplasm (FIG. 38o). HP was extractable by detergent lysis of pluripotent, but not differentiated hESC (FIG. 38p, q). The increased colocalization and binding of HP1β for chromatin further supports the hypothesis of heterochromatin assembly upon early differentiation of hESC.

Examples 15-25

Image Analysis of Stem Cells

Example 15

Applying Algorithms to Images of iPSCs

New heterogeneous texture algorithms are applied to images of nascent colonies obtained from the epigenetic-based processes and statistical information is extracted from the algorithm's output.

Figure 5:
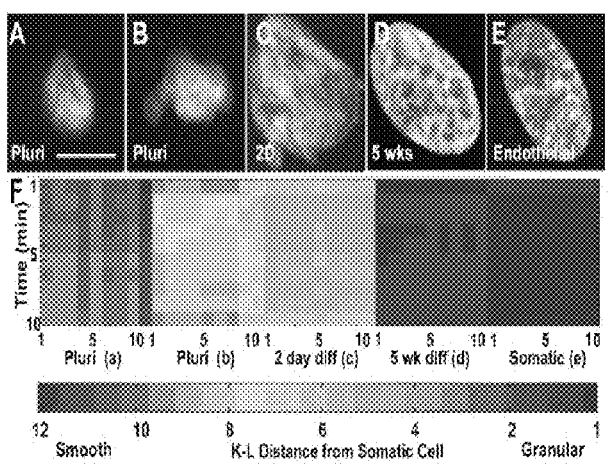
FIG. 5 provides an example of time-lapse analysis. (A-E) GFP-H2B labeled nuclei shown in single confocal slices by color overlays blue (t=0 min), green (t=1 min) and red (t=2 min). Pluripotent nuclei (A, B) show more color when compared to differentiated (C, D) or control somatic endothelial nuclei (E). Quantitative texture analysis (second row, F) is shown for nuclei (color squares), each square containing 10 images over a 10 min interval. Color bar is measure of the Kullback-Leibler (K-L) divergence between textures (M1-M4) (Blue: min. distance, red: max distance). Pluripotent nuclei (A, B) differ from somatic nuclei (E) with a large K-L divergence (red and yellow in (F). Distance from somatic cell E decreases as cells differentiate.

To compare the development of different iPSC procedures, time-lapse analysis of textural transformation is used. FIG. 5 is one example of such analysis applied to chromatin texture transformation during differentiation. Statistically distinguishing between two iPSC generation protocols is possible using robust hypothesis testing, which helps to establish that a method such as the epigenetics-based process produces more colonies of better quality when compared to the conventional protocol. The numerical performance of the algorithm is evaluated (Mangoubi et al., 2008) to algorithms now used specifically to classify stem cell nuclei.

Example 16

Initial Steps in Image Analysis

1. Segmentation

Given that the fluorescent marker concentrates within the nucleus, cell nuclei (comparatively bright, foreground objects) could be isolated from the surrounding growth medium (comparatively dark, background region) using a Chan-Vese style level set algorithm (Chan and Vese, 2001). Region-growing was then used both to label foreground objects and fill any small holes located within these objects. As debris and noise occasionally create small, spurious objects, labeled regions with size below an appropriate threshold were removed. The result is that each nucleus is associated with a binary mask M denoting its area within the image. Thus, if pixel (i, j) is within the nucleus, M (i, j)=1, and M (i, j)=0 otherwise.

2. Normalization

Following segmentation, the images is normalized to account for nuclear orientation in the focal plane by first rotating the image so that its widest span is aligned with the horizontal. Subsequently, the image is rotated or reflected to place its brightest quadrant to the bottom right. This transformation insures that the overall image intensity gradient runs from left to right and top to bottom, which, in turn, insures that any bias in the wavelet coefficients in the wider scale detail subbands will be in the positive direction. This will provide consistency when comparing the textures of nuclei. This process is illustrated in FIG. 9a-9b.

Example 17

Texture Feature Extraction, Modeling, and Classification

The hESC textures were classified according to a three-stage wavelet-based statistical method developed for Content-Based Image Retrieval (CBIR) (Do et al., 2002). See FIG. 11a. Note that this method is suitable for texture analysis (comparing two patches) but lacks features necessary for texture synthesis (artificially generating patches).

In the first stage, wavelet decomposition was applied to the grayscale of a texturally homogeneous image patch. As wavelet analysis decomposes a signal locally according to orientation and scale, it is especially apt for modeling texture, characterized by intensity randomness at multiple scales. More specifically, an n-level decomposition yields three detail subbands per level, one oriented horizontally, one vertically, and one diagonally. The absence of textural information was assumed in the approximation subband.

In the second stage, a dissimilarity measure between textural patches was derived from a statistical model of the empirical probability density function (pdf) of the coefficients in the 3n detail subbands, which are assumed to be statistically independent. In the third stage, the dissimilarity measure is used to classify or cluster texture patches.

These features may also be used as part of an ensemble of features into a nonlinear classifier. Previous examples include border crispness using a support machine (Jeffreys, 2004; Mangoubi et al., 2008; Mangoubi et al., 2007) and color, nuclear shape and orientation, etc. using neural networks (Bhagavatula, et al., 2010). For images of sufficient resolution, the methodology above is simpler and yields satisfactory performance.

Example 18

Analyzing Characteristics of Stem Cells

Figure 15:
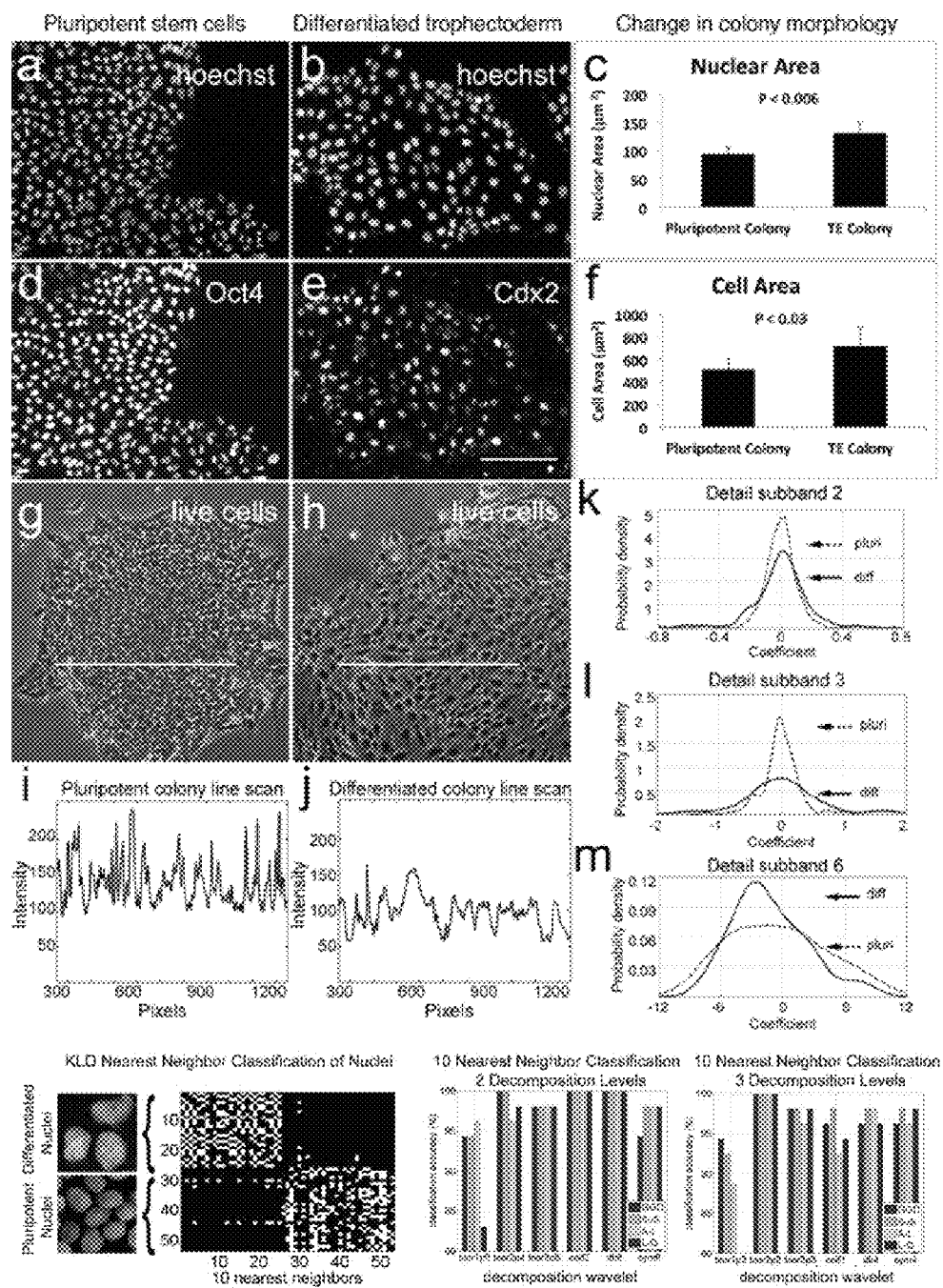
FIG. 15 shows morphological comparison of pluripotent hESC and differentiated trophectoderm colony images. Pluripotent hESC cultures, line WA07 (a, d, g, i) were compared to hESC that were differentiated in vitro for 4 days in culture with 100 ng/ml BMP4 (b, e, h, j). The squamous epithelial monolayer that was formed is trophectoderm, found in the outer shell of blastocysts and destined to form the placenta. Fixed colonies were stained with the DNA dye, Hoechst 33342 (a, b) and with antibodies to the pluripotency marker OCT4 (d) and the trophectoderm marker, CDX2 (e). Morphological differences that are characteristic of the spreading colonies include an increase in cell (c) and nuclear size (f). The Hoechst image of 4 colonies were analyzed for nuclear size and number of nuclei per colony area (average cell area) and differences between pluripotent and trophectoderm colony morphology were significant at $p<0.05$ by Students T test. Colony morphology in live cells (g, h), not fixed and immunostained as was performed in (a-f), is provided by the distribution of spatial frequencies in the image (i, j). The 1D line profile along a 1 mm white line in (g, h) provides an integrated measure of colony morphology that depends on both nuclear and cell size. Spatial frequencies are higher in pluripotent than in TE colonies and can be more completely measured using wavelet analysis, a generalized 2D, multiscalar measure of image texture. Bar in (e) is 100 µm and bars in (g) and (h) are 1,128 µm. Empirical probability density functions (k-l) for three detail subbands of the line scans in (i) and (j) quantify the concept of spatial frequency. In the second (k) and third (l) subbands (scales $2^2$ and $2^3$ pixels, respectively), the thicker distribution and wider tails in the pluripotent density indicate comparatively more edges at finer scales, and hence more and smaller cells in the pluripotent image. The situation is reversed in the sixth (k) detail subband (scale $2^6=64$ pixels), which is about the scale of the average diameter of pluripotent and differentiated stem cells (69±30 pixels and 82±40 pixels, respectively, mean±SD, 400 cells in 5 independent colonies).

Human ESC colonies were maintained in the pluripotent state (FIG. 15a, 15d, 15g) as confirmed by immunostaining for molecular markers of pluripotency (OCT4, FIG. 15d). Differentiated cells (FIG. 15b, 15 e, 15h) were produced by treatment with the growth factor bone morphogenic protein, BMP4 to form trophectoderm as confirmed by immunostaining (CDX2, FIG. 15e). These two validated developmental stages of stem cells were used to develop a textural approach to colony morphology.

Stem cell colonies change morphology during differentiation, primarily due to a 40% increase in nuclear and cells diameter (FIG. 15c, 12f) FIG. 1c, f) but also because of an increase in heterogeneity of cell size since the standard deviation is 80% and 50% larger for differentiated cells and nuclei, respectively (FIG. 15c, 15f). Compare the colonies in FIGS. 15g and 15g and h. Pluripotent colonies (15g) exhibit a fine-grained, homogeneous texture within a crisp, clearly defined border around each cell. The well-defined cells are of uniform size, some with white borders (a phase halo artifact due to a lens effect of domed cells). In contrast, differentiated colonies (15h) exhibit less well-defined borders, dark centers, and irregular, broad pale cell edges (no white lines), described as a "fried egg" appearance of individual cells in a continuous monolayer. While horizontal line scans of image grayscale (FIG. 15i-15j) show that both images exhibit considerable intensity variation over distance, the two may be distinguished according to the scale at which random fluctuation occurs; grayscale intensity in the fine-grained pluripotent colony fluctuates at a comparatively higher spatial frequency. The intensity profile depends not only on cell and nuclear diameter (x and y dimensions), but also on whether cell edges are abrupt or graded (physical profile in the z dimension)

This spatial frequency contains composite information regarding the edges in an image, and is an integrated measure of the size, number, and shape of the cells in the image. Small, compact cells have more sharp edges than large cells with gradually graded cell-cell borders. Stem cell image texture is classified by quantifying scale-dependent statistical variation using multiresolution wavelet analysis, which decomposes a signal locally according to position and scale (FIG. 15k-15m). In FIG. 15k and FIG. 15l, 15k and 15l, the coefficients in the second and third detail subbands (which account for variation at scales of $2^2$ and $2^3$ pixels, respectively) of the pluripotent colony have a probability density function with a noticeably wider center and thicker tails, indicating more numerous edges at small scale and hence more and smaller cells. Likewise, in FIG. 15m, the situation is reversed at the sixth detail subband (scale $2^6$ pixels), indicating that the differentiated image contains more widely spaced edges and hence larger cells. The scale which is most sensitive to stem cell differentiation is similar to the average diameter of pluripotent and differentiated stem cells (69±30 pixels and 82±40 pixels, respectively). To be fully general for a colony image, we generalize to two dimensions.

Example 19

Application to hESC Nuclei

These methods were first applied to the fixed nuclei described in Section 2b.ii, examples of which are shown in FIG. 11f (pluripotent) and FIG. 11c (early differentiated). After determining the initial segmentation mask via Chan-Vese level set methods (Chan et al., 2001) and CellProfiler (Carpenter et al., 2006), adaptive windowing was employed. The statistical, multiresolution texture model was applied, using a variety of wavelet types and each of the four KLD estimation methods.

Figure 16:
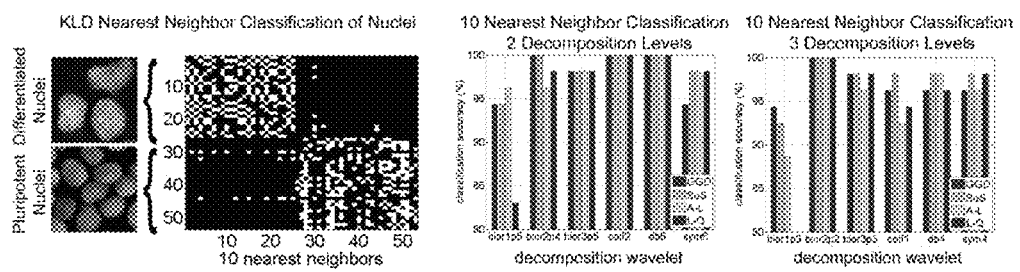
FIG. 16 shows classification of nuclei. (a) KLD nearest neighbor classification. Class 1 (early differentiated nuclei): images 1-25, class 2 (pluripotent nuclei): 26-53. For each nuclear image on the y-axis, the ten nearest neighbors (lowest summed KLD) have been indicated by a white square along the x-axis; (c)-(d) classification accuracy with two and three decomposition levels for varying wavelet and pdf/KLD estimators; classification accuracy is highly robust to the number of decomposition levels and choice of wavelet, and parametric (GGD, SαS) methods exhibit comparable accuracy to non-parametric (A-L, L-Q) ones.

A k-nearest neighbor classifier was applied to the fifty-three cells as illustrated in FIG. 16a, where a white square has been placed along the x-axis to indicate the ten least dissimilar nuclei to a given cell. Thus, blocks along the diagonal indicate correct cell classification while off-diagonal marks indicate low dissimilarity between a given cell and another class. With only two exceptions, the majority of each cells' neighbors are from the correct class. The clustering is therefore nearly perfect. These results are consistent with other results and methods on different data sets (Mangoubi et al., 2008), (Desai et al., 2009), (Lowry et al., 2010), indicating that texture analysis can play the role of a non-destructive biomarker that can complement other biomarkers.

Results in FIG. 16c-16d for error rates due to varying wavelets and decomposition levels indicate that, for these images, accuracy is highly robust to both the choice of wavelet and the number of decomposition levels. In cases in which cells images exhibit noticeable fine-scale variation, however, it might be critical to extract as many decomposition levels (and thus variation in scale) as possible. As for pdf modeling, the GGD density function for modeling the coefficients of the decomposition proved preferable. Save for a few exceptions with L-Q, the accuracy of the four methods is comparable and the GOD is easiest to compute. Notably, the method presented automates the cell analysis and classification since segmentation preceded nuclei texture analysis.

Example 20

Application to hESC Colonies and iPSCs

Since colony images might contain a mixture of pluripotent cells, differentiated cells, extracellular matrix proteins, and feeders, image segmentation must be combined with texture characterization. The hierarchical classification approach described herein fuses texture-based classification methods with window-based decision making to segment and classify inhomogeneous colony images. The ability to quantify partially differentiated colonies or mixed cultures is a significant advance that enables us to measure the dynamic process of stem cell development.

The classification method was also used to classify iPSCs. The segmentation mask was derived using the tiling method. Coefficients were selected using the adaptive windowing method, and the statistic texture model was GGD, db4 wavelet, 5 decomposition levels, swt. Adaptive windowing was used here, and, in addition to dealing with small colonies, it has the advantage of assembling features from the entire colony into one feature vector. Traditional method requires tiling, which is not possible with small colonies.

Figure 39:
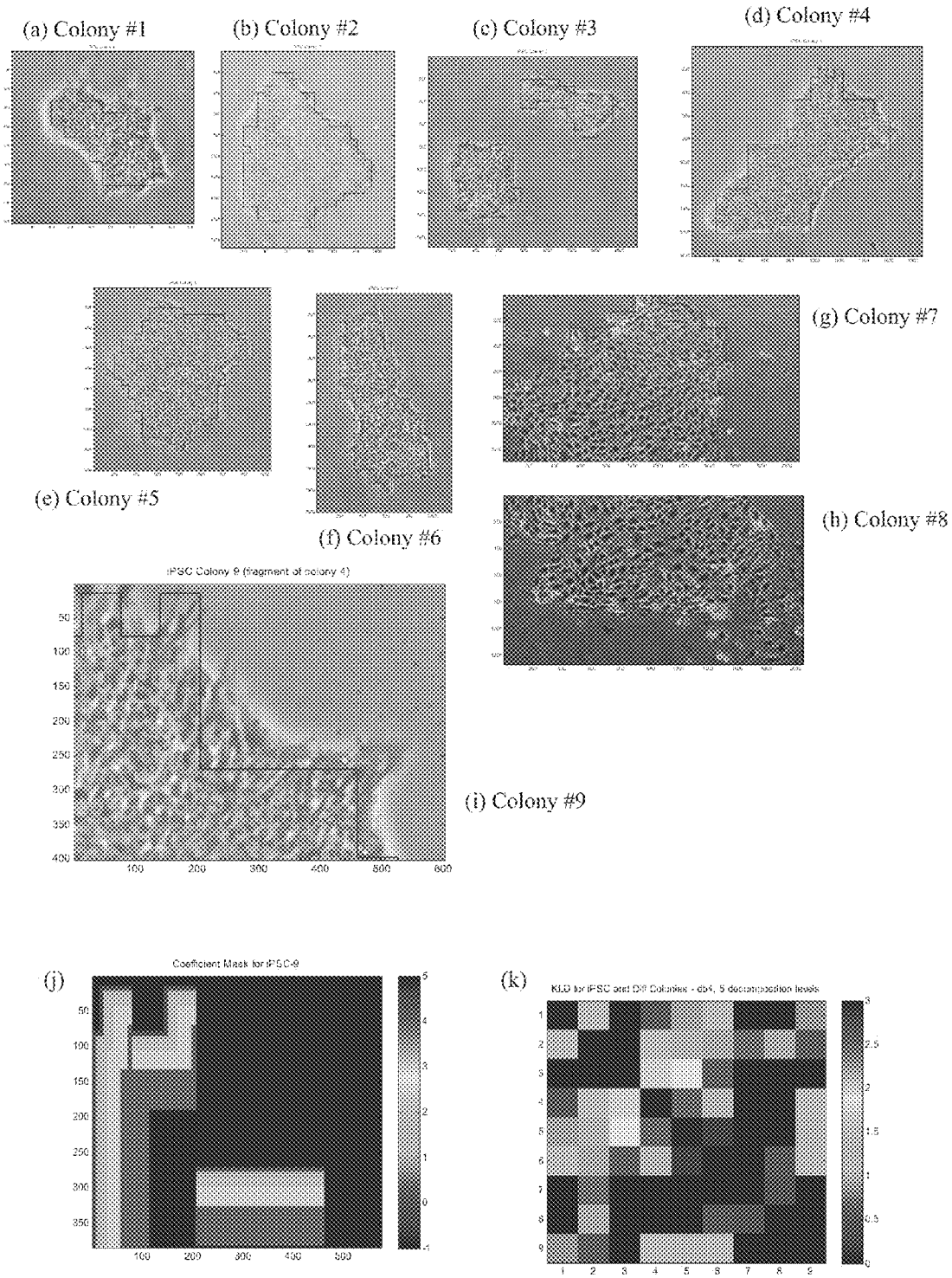
FIG. 39 shows results obtained from adaptive windowing of iPSC images. Each square in the table compares two colonies from the sample of six colonies. (a)-(f) corresponds to colonies #1-6, which are iPSC colonies; (g)-(h) corresponds to colonies #7-8, which is a differentiated colony (top and bottom halves); (i) #9=small fragment of iPSC colony #4). (j) shows a coefficient mask for iPSC colony #9. (k) illustrates the KLD for iPSC and differentiated colonies. The more similar the colony pair, the smaller the divergence. Comparing colony #9 with any of colonies #1 thru #6 shows that colony #9 is closer to them, than it is to colonies #7 and #8.

In FIG. 39, iPSCs (colonies #1-6 in (a)-(f) can be distinguished from differentiated colonies (#7-8, shown in (g) and (h)). Colony #3 (b) appears to be an outlier—possibly because it comes in two disconnected sections, but this cell is still clearly an iPSC and not a differentiated cell. Colony #9 (i) is a small fragment of iPSC colony #4 (d). Adaptive windowing helps to maximize the coefficients which can be used to derive the texture model. Here, colony #9 (i) is clearly an iPSC rather than a differentiated cell.

The comparison is based on a non-Gaussian multiresolution wavelet texture analysis using adaptive windowing. Specifically, a wavelet decomposition is taken of each colony, and the wavelet coefficients for each subband are used to estimate a non-Gaussian probability density function. The joint probability density function across all subbands characterizes the colony or colony class. For a pair of colonies, we compare the two probability density functions of the pair using the Kullback Leibler KL divergence, or the likelihood ratio, or any other comparisons. The results shown are for the KL divergence (k). The matrices show a comparison of pairs of colonies, each based on two different wavelet decompositions. The KL divergence value for a pair of colonies is indicated by its color. The closer to dark blue the color of a square is, the more similar the two colonies are. Thus, diagonal elements, where each colony is compared to itself, are dark blue, because the KL divergence is zero. We see that squares comparing any pair in colonies #1 to #6 are bluish, meaning the colonies are texturally similar. Likewise colonies #5 and #6 have small KL divergneces. By contrast, a comparison of any of the colonies #1 to #6 (ipscs) to colonies #7 and #8 (differentiated) shows larger divergence, as indicated by the reddish color of the corresponding square. Panel (j) shows a coefficient level mask for colony #9. Here, the number −1 corresponds to outside the colony, while 0 corresponds to inside the colony, and not included in any subband estimation. Numbers 1-5 are coefficients used to estimated the subband.

Example 21

Building a Colony Texture Library

The challenge in colony image classification is to distinguish the fine-grained pluripotent regions from the differentiated "swampland" and both from the exterior. This was accomplished by subdividing images into non-overlapping windows of constant size, each of which is classified independently using the GGD density function to model the statistical variation of the wavelet coefficients. As intra-class textural heterogeneity means that not all differentiated, pluripotent, or exterior windows exactly resemble one another, windows were classified not by reference models but by comparison against expert-classified samples in a model library compiled from four images (three pluripotent, one differentiated), illustrated in FIG. 17*a*. The intra-library KLD shows the grouping of library textures into classes, one differentiated, three exterior, and two pluripotent (from top left to bottom right), shown as bluish blocks clustered along the diagonal of the matrix of KLD between pairs of colonies in the library. Note the resemblance between the first (differentiated) and last (pluripotent) classes, shown in the greenish bar off-diagonal, and the textural heterogeneity of the differentiated class, with its lighter shade of blue.

Window class assignment uses a k-nearest neighbor classifier. After computing the dissimilarity between the unknown window to each library model, the k models with the smallest dissimilarity (i.e. nearest neighbors) "vote," and the class with the most "votes" wins. To reject ambiguous cases, models are only allowed to "vote" if their dissimilarity is below some ceiling value, and the end result is only accepted if at least $k_n \leq k$ "votes" concur. In practice, classification is shown to be robust to the choice of k, $k_n$, and the dissimilarity ceiling.

Example 22

Hierarchical Image Windowing

For ease and speed of computation, windows are chosen to be fairly large (256×256 pixels), and thus several windows contain heterogeneous mixtures of textural classes, e.g. pluripotent and exterior. Such windows represent the superposition of two (or more) pdfs. To address this issue, we refine classification via hierarchical image windowing. After the classifier identifies these windows using spatial reasoning rules, we quarter them and re-classify in the same manner as above. This process may be re-iterated until characteristic features (e.g. differentiated cellular clumps, pluripotent white lines, etc.) are on the order of the window size. Minimum scale in our application is thus 64×64 pixels.

Two spatial reasoning rules identify textural border windows for refined classification. First, select windows failing the k-nearest neighbor test. Second, select any differentiated window that borders upon a window of another class; since differentiated hESC regions are characterized by a type of textural inhomogeneity, border windows are prone to being misidentified as differentiated.

Figure 17:
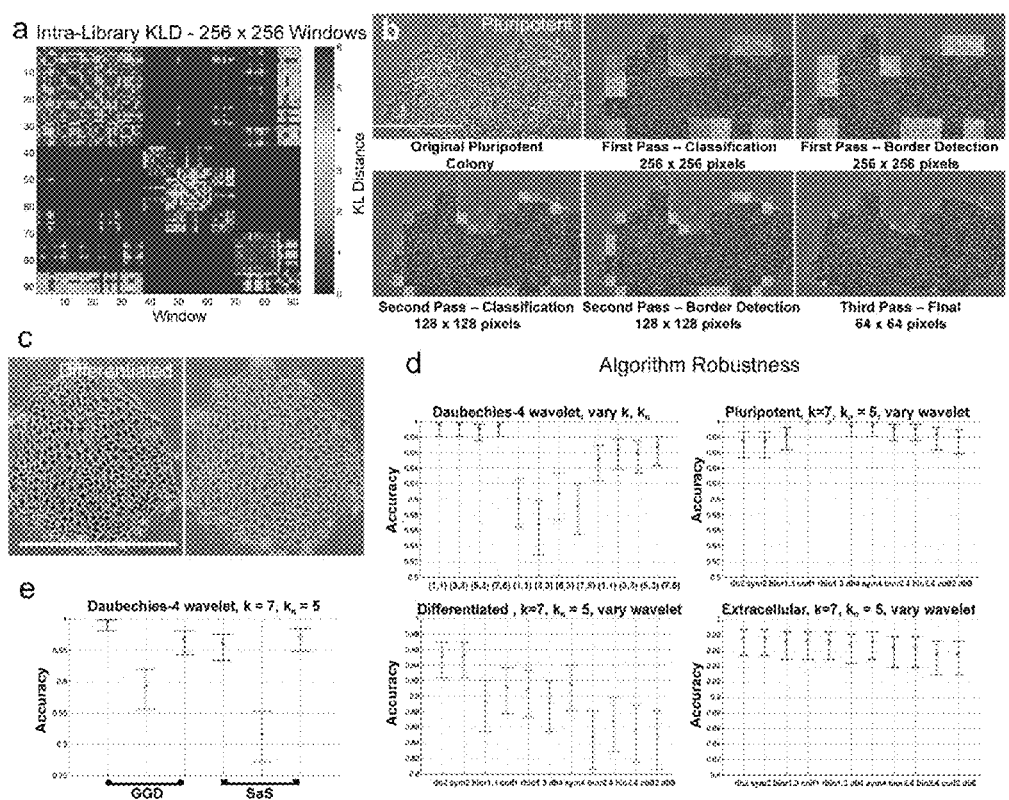
FIG. 17 illustrates hESC colony classification. (a) the statistical dissimilarity measure (KLD) between two windows is visualized via color in each entry of the matrix, from blue (similar) to red (very dissimilar); thus, the diagonal elements are each dark blue as each window is texturally identical to itself, and classes containing similar models appear as bluish blocks along the diagonal; (b) window by window classification of a pluripotent hESC colony; three passes are used to classify the original image, with intermediate results shown after the classification and border detection phases; blue is pluripotent, green is differentiated, red is exterior, and gold is unknown; (c) differentiated colony, clearly distinguished from pluripotent; (d) algorithm robustness to changes in classifier parameters; (d-i) is constant wavelet (Daubechies-4), classifier parameters ($k, k_n$) vary; blue is pluripotent, green is differentiated, red is exterior; bar indicates extent of 90% confidence interval, diamond is maximum a posteriori (MAP) estimate of accuracy; (d-ii) is pluripotent, (d-iii) is differentiated, and (d-iii) is exterior, these with constant classifier parameters ($k, k_n$)=(7, 5) and varying wavelet; (e) comparison between GGD and SαS models, Daubechies-4 wavelet, (k, (7, 5); performance is robust to choice of wavelet, classifier parameters; GGD performance equals or exceeds SαS performance.

FIG. 17*b* illustrates algorithm progress and the textural segmentation of a pluripotent colony image to a maximum precision of 64×64 pixels. The input and results of a segmentation of a differentiated colony are shown in FIG. 17*c*. Blue windows are classified as pluripotent, green as differentiated, and red as exterior. Gold windows are unknown or could not be classified. These are very few in numbers.

Example 23

Performance Results

Classification of inhomogeneous hESC colony images is quite successful. Typically, identification of pluripotent windows is near perfect (99%, 90% confidence interval (CI) [0.9812, 0.9986]). All but one window among the very small percentage of misclassified pluripotent windows are assigned to the colony surrounding, so pluripotent windows are essentially never classified as differentiated. This is significant for tissue engineering application, where all cells must be differentiated before making use of the tissue.

Differentiated and exterior accuracy is 89% (90% CI [0.8547, 0.9196]) and 96% (90% CI [0.9432, 0.9812]), respectively. Usually, hESC colonies diffuse as they differentiate, and thus approximately 70% of misclassified differentiated windows are assigned to the exterior with the remainder being unclassifiable. Thus no differentiated cell was misclassified as pluripotent. This is significant for large-scale hESC cultivation, where pluripotent colonies must not be uncontaminated.

Results in FIG. 17*d* give accuracy results for a variety of classification (k, $k_n$) and modeling (wavelet basis) parameters. Note that pluripotent accuracy is highly robust to changes in these values. Differentiated accuracy varies but is acceptable with wavelets of eight taps or less (Sym4 and left). Blue indicates pluripotent, green differentiated, and red exterior. The bar indicates the 90% CI and the diamond the mean of the distribution.

As noted, these results used GGD densities to model wavelet coefficients. By way of comparison, results with SαS models are shown in FIG. 17*e* for the "typical" set of model parameters. While pluripotent accuracy is relatively unchanged, differentiated accuracy decreases noticeably (82%, down from 89%), validating the use of GGD density models in this application.

Figure 14:
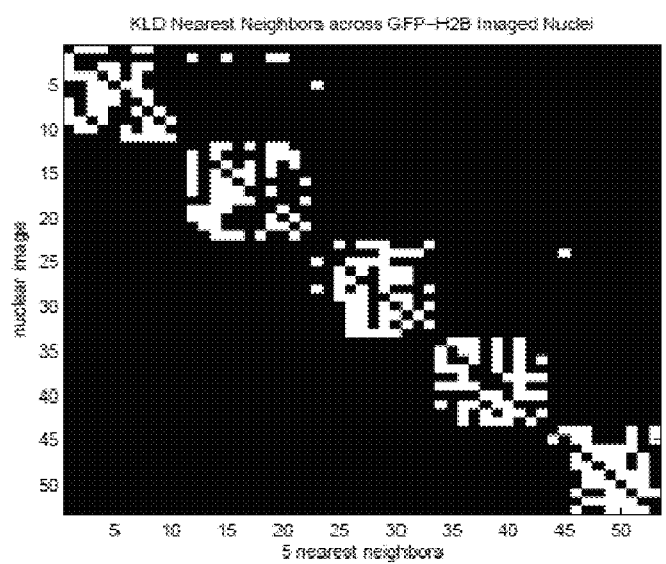
FIG. 14 presents nuclei classification and KLD nearest neighbor classification. Class 1 (deforming pluripotent nuclei): images 1-11, class 2 (translocating pluripotent nuclei): 12-22, class 3 (streaming two day differentiated nuclei): 23-33, class 4 (gel-like five week differentiated nuclei): 34-43, class 5 (stationary endothelial cell): 44-53. For each nuclear image on the y-axis, the five nearest neighbors (lowest summed KLD) have been indicated by a white square along the x-axis.
Figure 18:
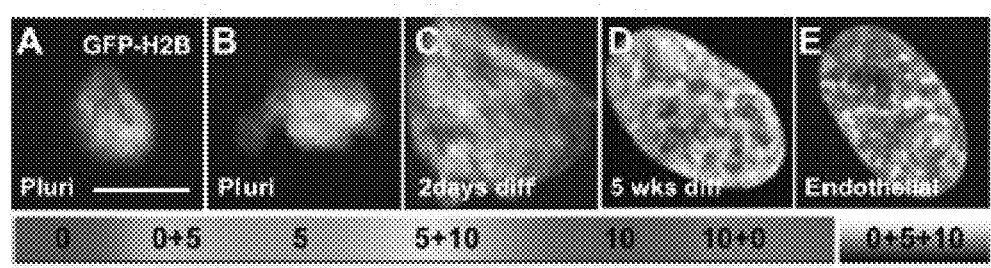
FIG. 18 shows confocal images of GFP-H2B labeled nuclei from pluripotent hESC (A, B), two-day differentiated (C), and five-week (D) differentiated hESC, and a control fully differentiated endothelial cell (E); chromatin granularity increases during differentiation, approaching the control cell. Each color image is the overlay of images at time 0 min. (blue), 5 min. (green), and 10 min. (red). Color bar visually presents whether nuclear change over time (brighter color in pluripotent cells) or are unchanging over time (gray in differentiated cells). Bar in A is 10 μm.

In addition, FIG. 18 shows the nuclei of five cells imaged using the marker FGP-H2B in a time-lapse series of ten or eleven images over a ten minute period. Using a k-nearest neighbor classifier, the summed KLD classification results for the images in the five classes are given in FIG. 14. For each nucleus on the y-axis, a white square has been placed to indicate the five least dissimilar nuclei (i.e. smallest summed KLD) along the x-axis. Blocks along the diagonal indicate correct image classification, while off-diagonal entries indicate low dissimilarity from a given nucleus to another class. With only a single exception, the majority of the nearest neighbors are from the correct class. Note also that the model coefficient selection method enabled the classification of pluripotent class two; the shape of this cell is so irregular as to preclude selection of a rectangular region sufficient for statistical texture analysis.

Figure 19:
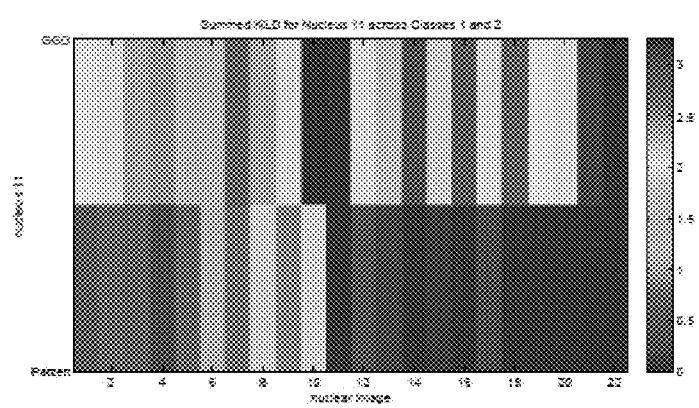
FIG. 19 presents a parametric vs. non-parametric approach. Summed KLD showing dissimilarity between cell 11 (part of class 1) and classes 1 and 2. Class 1: images 1-11, class 2: 12-22. GGD statistical model is top; Parzen is bottom. Note the Parzen's improved class separation.

Note also that the non-parametric statistical model increases class separation between the nuclei. Consider FIG. 19, which shows the actual dissimilarity measure between nucleus eleven and the nuclei in classes one and two. The bottom strip illustrates the KLD from the Parzen model; in only one case (nucleus four) is a class one nucleus further from nucleus eleven than any class two nucleus. This is a clear advantage over the GGD model, shown on the top strip, which exhibits very poor class separation for this nucleus.

Example 24

Further Validation of Imaging Methods

Figure 20:
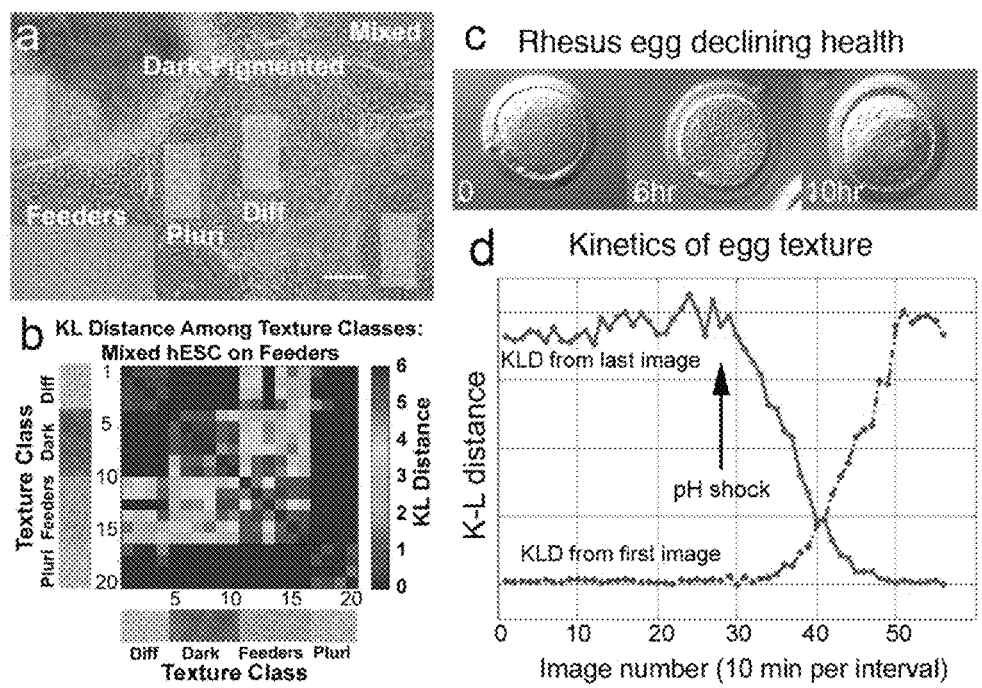
FIG. 20 shows further applications. (a, b) proof of concept on mixed, spontaneously differentiated stem cell colonies (line UC06) (a) showing differentiated epithelial cells (cyan, library windows 1-4), dark pigmented differentiated cells (purple, library windows 5-8), exterior feeder cells (orange, library windows 9-16), and pluripotent cells (light blue, library windows 17-20), bar is 100 μm; pluripotent cells may be distinguished from other textures with a KLD of 6 as shown in (b), the KLD plot for the corresponding colored regions in the mixed image (a). In (c, d), a discarded metaphase II egg from a Rhesus macaque was imaged at 40× with a Hoffman Modulation Contrast objective and observed for 10 hrs in an environmental chamber (c). Reducing $CO_2$ from 5% to atmospheric concentrations produced a shift in pH before frame 30. The egg became atretic and cytoplasm granularity changed from fine-grained to coarse-grained as it died. The KLD is computed between each frame and the first (blue curve, live egg) and last (red curve, dead egg) frames. Initially the blue curve is low while the red is high, indicating textural similarity to the healthy cell and dissimilarity to the dead one, respectively; this changes starting at frame 30, when the egg is damaged.

Biological validation of the algorithm was performed by testing large numbers of pluripotent hESC and trophectoderm colonies to show reproducible, significant differences between stem cell classes, and evaluating subtle differences over time during differentiation (Erb, manuscript submitted). The approach has also been used to evaluate subtle differences in the rate of differentiation after application of the drug, trichostatin A (Erb, manuscript submitted). To illustrate the versatility of our algorithm on other samples is illustrated in FIG. 20.

In FIGS. 20a and 20b, a proof-of-concept demonstration is shown for a spontaneously differentiated hESC colony (line UC06). In 20a, differentiated epithelial, dark pigmented, exterior feeder, and pluripotent cells were distinguished via statistical multiresolution texture methods.

Textural analysis has also been applied to measure dynamic changes in the cytoplasm of an individual egg cell (Mangoubi et al., 2007). Consider the snapshots from a 60 frame time-lapse image series of a Rhesus macaque egg in FIG. 20c. The healthy egg at 0 hours undergoes visible textural changes at a later frame as it is damaged by a shift in pH of the media (FIG. 20c, 6 and 10 hrs). By frame 30, the egg becomes more granular and, by frame 60, the atretic egg has undergone lysis and contraction. The GGD textural model was used to compare the first and last images used in the sequence to intermediate sequence frames during egg cell death and demonstrate with fidelity the change in texture status during pH shock-induced egg death.

Materials and Methods
Data Collection

Human embryonic stem cells (hESC, line UC06 from the NIH-approved registry) were grown under standard conditions on mouse feeder cells. Pluripotency of hESC was routinely confirmed by immunostaining for the pluripotency marker, Oct-4. hESCs were induced to differentiate for up to 5 weeks by plating on feeder cells at half the normal density, which induced differentiation to early neuronal lineages as determined by the neural markers, nestin, sox2, and pax6 (Ozolek et al., 2007). We visualized chromatin in living cells by transfecting cells with DNA for the histone H2B linked to the fluorescent protein GFP (Kanda et al., 1998). 4-D movies were acquired with a spinning disk microscope (Perkin Elmer Ultraview) using a 40×1.3 NA Nikon objective with a resolution of 0.2 µm. Single confocal slices are presented in FIG. 18 at three times: one minute (blue channel), five minute (green channel), and ten min (red channel). Static images have blue-green-red at all pixels and thus are gray, while nuclei that move during the ten minute interval retain color.

Nuclei in pluripotent cells had smooth textured chromatin that changed over time by internal movement (FIG. 18A) or by whole nuclei movement (FIG. 18b). During differentiation, chromatin became more granular and movement was reduced (FIGS. 18c and 18d). By five weeks (FIG. 18d), differentiated stem cell nuclei were nearly as granular as an adult human vascular endothelial cell nuclei (FIG. 18e). Pluripotent nuclei are physically very plastic and become less compliant during differentiation due in part to increasing chromatin condensation into heterochromatin (Pajerowski et al., 2007). Since heterochromatin generally contains silenced genes, texture analysis provides a direct measure of the degree of global gene silencing by chromatin remodeling.

Stem Cell Culture and Differentiation

Pluripotent hESCs, line WA07, were grown feeder-free on Geltrex-coated plates (Invitrogen) and maintained in StemPro (Invitrogen) a defined pluripotency media. Media was changed every other day and colonies were passaged weekly with Collagenase Type IV. Specific and selective differentiation to an epithelial cell type was achieved by culturing for 4 days in StemPro without bFGF but with the addition of BMP-4 (100 ng/mL) to the media (Erb, et al, manuscript submitted). Alternately, pluripotent hESCs, lines WA07 and UC06, were grown on mitomycin-treated mouse embryonic fibroblasts and maintained in Knockout DMEM supplemented with 20% Knockout serum replacement, 2 mM L-glutamine, Non-Essential Amino Acids, 100 U/ml Penicillin, 100 µg/ml Streptomycin, 4 ng/ml bFGF (all from Invitrogen). Media was changed every other day and colonies were passaged weekly with either a Pasteur pipette or by enzymatic digestion using Collagenase Type IV as recommended by the provider (WiCell, or UCSF, respectively). Mixed colony differentiation on feeders was obtained spontaneously by culture for 2 weeks without passaging to new plates.

hESCs, line HSF-6 and H7, approved by the University of Pittsburgh ESCRO committee were maintained in ES-DMEM high glucose with 20% KSR, 1% MEM NEAA, Pen/Strep (10,000 U/10,000 ug), 1% L-Glutamine (2 mM), and 8 ng/mL bFGF (Invitrogen Life Technologies) and cultured on mitomycin-treated MEFs (15,000 cells per cm$^2$) (Globalstem or Chemicon). Neuronally differentiated hESC cultures were prepared on low-density CF-1 MEFs (5000 cells per cm$^2$) for 1-3 weeks (Ozolek et al., 2009; Ozolek et al., 2007). Mouse ESCs, line R1/E L129 (ATCC line SCRC-1036) were cultured on MEFs grown in ES-DMEM (Invitrogen Life Technologies) supplemented with 2.0 mM L-Glutamine, 0.1 mM NEAA, 0.1 mM B-mercaptoethanol, 1000 U/ml mouse LIF and 15% FBS. Hela Cells (ATCC) were grown in DMEM, with 10% FBS, 1% Pen/Strep, 1% MEM NEAA, and 1% L-Glutamine.

Immunocytochemistry and Image Analysis hESC colonies were fixed with 2% paraformaldehyde in PBS buffer, permeabilized with 1% Triton X-100 (Sigma, St. Louis Mo.), and non-specific antibody binding blocked with 10% goat serum. Primary antibodies were diluted in 1% goat serum, spun briefly, and incubated overnight at 0° C. After a wash in PBS-Tween 0.05% a species-specific fluorescent secondary antibody was added for 60 min at 37° C. and then incubated in DNA dye Hoechst 33342 (1:10,000). Colonies were immunostained with anti OCT4 (R&D systems) or CDX2 (Biogenex) and imaged using a Zeiss 20× objective and Axiocam MR5 camera. The Hoechst image of 4 independent colonies were segmented by a watershed segmentation, thresholding and size exclusion using the McMaster Biophotonics Facility Image J plug-ins for Nuclear Counting (Particle Analysis). Cell area in a cropped confluent monolayer was determined by dividing image area by the nuclear count. All images were imported into Adobe Photoshop for final image composition and contrast adjustment. Comparable images were adjusted using constant contrast to allow comparison of channel intensity.

Colonies were imaged via phase-contrast microscopy using a 4× Nikon 0.13 NA objective on a TMS cell culture microscope with a 10M Pixel Nikon D40x SLR camera. RGB images were reduced to grayscale by selecting the green channel to reduce chromatic aberration and avoid color registration errors. Intensity line profiles of live cells were measured with Image J.

Stem Cell Nuclear Staining

Confocal nuclear images were collected from hESCs grown in plastic-bottom multiwell microslides (Ibidi, Integrated BioDiagnostics), fixed and labeled with the DNA dye Yoyo-1. Samples were imaged with Perkin Elmer Ultraview LCI, employing a Nikon TE2000E inverted microscope, 40× planapo 1.4 NA objectives, Yokogawa real-time-spinning disk confocal head, Coherent Krypton-Argon ion laser and Photometrics HQ CCD camera. Image stacks were acquired with 0.23 µm thickness.

Statistical Characterization of Wavelet Coefficients.

In somatic cells heterochromatin and euchromatin have distinctly different densities and sharp boundaries (measured by fluorescent intensity) and can be quantified deterministically by area measurements. Heterochromatin condensation in stem cells cannot be measured by area measurements alone because the shape, density and scale of heterochromatin domains vary continuously during differentiation. A biological feature we have successfully used to quantify chromatin condensation is multiscalar texture, or the variation pattern in chromatin intensity. Texture is sensitive to intensity variations that exhibit at least two characteristics: They are 1) random in nature, and 2) the variations occur at various spatial scales.

Wavelet analysis (Do and Vetterli, 2002) was used within Matlab environment to decompose the nucleus texture. Wavelet analysis is a generalization of Fourier analysis that quantifies the degree at which pixel intensity varies at multiple scales or electronic magnifications. A statistical comparison of these variations classifies the texture into measurably distinct degrees of chromatin condensation. We evaluated three statistical methods for comparing the wavelet coefficients: 1) A parametric density function, specifically generalized Gaussian (Mangoubi et al., 2008), 2) a non-parametric classifier method, specifically Support Vector Machines (SVM) [Jeffreys et al. 2007], and 3) a non-parametric Kolmogorov Smirnov test [Lowry et al, 2010]. We applied the parametric approach for the current analysis.

It has been verified that a generalized Gaussian (GG) distribution is appropriate for describing the statistical random behavior of the coefficients of the texture's wavelet decomposition at each subband. Specifically, $$p(x_b \mid \alpha_b, \beta_b) = \frac{\beta_b}{2\alpha_b} \Gamma\left(\frac{1}{\beta_b}\right) \exp\left(-\left|\frac{x_b}{\alpha_b}\right|^\beta\right) \quad (18)$$

where $x_b$ is a wavelet coefficient for subband b of a texture decomposition, $\alpha_b$ is a width parameter proportional to the standard deviation, and $\beta_b$ is a thickness shape parameter. A third parameter, the location parameter or mean, is assumed zero and is not shown. The generalized Gaussian model embraces a rich family of probabilistic behavior (distribution curve shapes), where the density is always unimodal (single peak, in our case at zero) and symmetric.

By decomposing a nucleus image texture into B subbands, we therefore have a statistical feature representation of that texture consisting of parameters $\alpha_b, \beta_b, b=1, \ldots, B$. We verify that for pluripotent nuclei, the values of these parameters are similar to each other, and distinct from the same parameter values of differentiated cell nuclei. Consequently, each nucleus, depending on the degree of differentiation, can be mapped into a particular generalized Gaussian joint density through wavelet based texture analysis. For a nucleus of developmental class i (pluripotent, early differentiated, late differentiated), this joint density is given by $$p_i \equiv p(x_i \mid \alpha_{i1}, \beta_{i1}, \ldots, \alpha_{iB}, \beta_{iB}) = \prod_{b=1}^{B} \frac{\beta_{ib}}{2\alpha_{ib}} \Gamma\left(\frac{1}{\beta_{ib}}\right) \exp\left(-\left|\frac{x_{ib}}{\alpha_{ib}}\right|^\beta\right) \quad (19)$$

where $x_i = [x_{i1}, \ldots, x_{ib}]$. Said another way, each nucleus class i can be mapped to a particular density function $p_i$. The stage of chromatin formation can then be statistically compared between each developmental class. To statistically distinguish classes by their density functions, we employed the Kullback-Leibler (K-L) distance (Do and Vetterli, 2002). For any two density function f(x) and g(x), this distance from f to g is given by $$D(f, g) = \int f(x) \ln \frac{f(x)}{g(x)} dx \quad (20)$$

The larger the distance is, the more distinguishable are the two classes. Note that this distance measure is directional and may be either positive or negative and is in general is not symmetric, meaning $D(f,g) \neq D(g,f)$. In practice, we employ a symmetric positive measure by replacing D(f,g) by the sum of the absolute values of D(f,g) and D(g,f), or |D(f,g)+D(g,f)|.

To get a feeling for the K-L distance, we refer to the more familiar Gaussian density. Consider two Gaussian densities with means $m_1$ and $m_2$, and the same standard deviation of one. Then, the above distance reduces to $m_1-m_2$ or $m_2-m_1$, meaning the difference between the two means. For our generalized Gaussian model, where the mean is zero, but where the scale and width parameters, $\alpha$ and $\beta$ are different, the K-L distance between two densities $f_1$ and $f_2$ given by (19) reduces to:

$$D(f_1, f_2) = \quad (21)$$
$$\sum_{b=1}^{B} \left( \log \frac{\beta_{1b} \alpha_{2b} \Gamma(1/\beta_{2b})}{\beta_{2b} \alpha_{1b} \Gamma(1/\beta_{1b})} + \left(\frac{\alpha_{1b}}{\alpha_{2b}}\right)^{\beta_2} \frac{\Gamma((\beta_{2b}+1)/\beta_{2b})}{\Gamma(1/\beta_{2b})} - \frac{1}{\beta_{1b}} \right)$$

where we estimate the parameters $\alpha_{ib}, \beta_{ib}, i=1, \ldots, B$ for each nuclear pair using the coefficients of the wavelet decomposition.

The distance (21) between pairs of nuclei is then be used to cluster nuclei and classify them based on the degree to which heterochromatin is present or being formed, without prior assumptions about the shape and density of heterochromatin loci, as we show in the results section for three different classes of neuronal development.

Western Blotting hESC and mESC colonies on MEF feeders were collected by dissecting colonies with a pulled glass pipette. Colonies were aspirated from plates, mixed with 2× reducing sample buffer and heated at 95° C. for 10 min. Cellular extracts were resolved by electrophoresis in sodium dodecylsulfate (SDS), 12.5% or 15%, polyacrylamide gels as described previously (Rodriguez-Collazo et al., 2009). Western transfer of proteins onto 0.1 mm pore size nitrocellulose membrane (Whatman, Protran, BA79, Superior Nitrocellulose Membrane) and proteins were visualized by staining of membranes with Ponceau S (Sigma). The membranes were incubated with primary and then peroxidase-conjugated anti-rabbit secondary antibodies (Jackson Immunoresearch) and detected by chemiluminescence (Pierce). Membranes were stripped in a solution containing 8-9-M urea/10-20% acetic acid, at 60° C. for 1 h or at RT overnight, re-blocked with 4% skim milk and re-probed. Band density calculations were replicated from each of three to four bands from 4 independent, replicate biological samples, normalized by Ponceau S band density of the same protein from scanned films using Image J.

Negative Stain Electron Microscopy

Pellets of pluripotent HSF-6 cells were fixed in 2.5% glutaraldehyde overnight, washed 3× in PBS, followed by incubation in 1% $OsO_4$ with potassium ferricyanide for 1 h at 4° C. Samples were washed 3× in PBS, followed by a series of washes in 30%, 50%, 70%, 90% and finally 3×100% EtOH for 15 min to dehydrate. Samples were washed 2× in propylene oxide (10 min), followed by a 1 h incubation in 1:1 Epon/p. oxide mixture, and were incubated overnight at 4° C. in 100% Epon, followed by three separate, 1 h incubations in 100% Epon. The pellets were then embedded and cured at 37° C. for 24 h, followed by 48 h incubation at 60° C. Samples were sectioned at 65 nm, mounted on 200 mesh copper grids and then counter stained with uranyl acetate and lead citrate.

REFERENCES

Agustin, M., et al., 1999 Robust failure detection for reentry vehicle control systems, Journal of Guidance, Control, and Dynamics Vol. 22, No. 6.

Ahmad I and Pi-Erh L., 1976. A nonparametric estimation of the entropy for absolutely continuous distributions (Corresp.). Information Theory, IEEE Transactions on 22(3): 372-375.

Al-Kofahi Y, et al., 2010. Improved Automatic Detection and Segmentation of Cell Nuclei in Histopathology Images. Biomedical Engineering, IEEE Transactions on 57(4):841-852.

Allis, D. C. et al., 2007. Overview and Concepts. In Epigenetics. D. C. Allis, T. Jenuwein, and D. Reinberg, editors. Cold Spring Harbor Press, Cold Spring Harbor, N.Y. 23-61.

Ambartsumyan, G. and A. T. Clark. 2008. Aneuploidy and early human embryo development. Hum Mol Genet. 17:R10-5.

Ambrosio, L. and V. Torterreli, 1990, "Approximation of functional depending upon elliptic functional via Gamma convergence", Commun. Pure Appl. Math., 43(8):999-1036.

Annunziato, A. T., et al., 1981. Dual nature of newly replicated chromatin. Evidence for nucleosomal and non-nucleosomal DNA at the site of native replication forks. J Biol Chem. 256:11880-6.

Azuara, V., et al., 2006. Chromatin signatures of pluripotent cell lines. Nat Cell Biol. 8:532-538.

Bacallao, R., et al., 1989. The subcellular organization of Madin-Darby canine kidney cells during the formation of a polarized epithelium. J Cell Biol. 109:2817-32.

Bachman, K. E., et al., 2001. Dnmt3a and Dnmt3b Are Transcriptional Repressors That Exhibit Unique Localization Properties to Heterochromatin. J. Biol. Chem. 276:32282-32287.

Barski, A., 2007. High-resolution profiling of histone methylations in the human genome. Cell. 129:823-37.

Bartova, E., et al., 2008 a. Epigenome and chromatin structure in human embryonic stem cells undergoing differentiation. Dev Dyn. 237:3690-702.

Bartova, E., et al., 2008 b. Differentiation of human embryonic stem cells induces condensation of chromosome territories and formation of heterochromatin protein 1 foci. Differentiation. 76:24-32.

Bernstein, B. E., et al., 2006. A bivalent chromatin structure marks key developmental genes in embryonic stem cells. Cell. 125:315-26.

Bhagavatula R, et al., 2010. Automatic Identification and Delineation of Germ Layer Components in H&E Stained Images of Teratomas Derived from Human and Nonhuman Primate Embryonic Stem Cells. Proc IEEE Int Symp Biomed Imaging; 1041-1044.

Bird, A., 2002. DNA methylation patterns and epigenetic memory. Genes Dev, 16: p. 6-21.

Bolte, S., and F. P. Cordelieres. 2006. A guided tour into subcellular colocalization analysis in light microscopy. J. Microsc. 224:213-32.

Boltz S., et al., 2007. High-dimensional statistical distance for region-of-interest tracking: Application to combining a soft geometric constraint with radiometry. p 1-8.

Bushway P J, et al., 2006. High [hyphen (true graphic)] Throughput Screening for Modulators of Stem Cell Differentiation. Methods in Enzymology. Volume Volume 414: Academic Press; p 300-316.

Cai, S., et al., 2003, Tissue-specific nuclear architecture and gene expression regulated by SATB1. Nat Genet, 34(1): p. 42-51.

Carpenter A E, et al., 2006. CellProfiler: image analysis software for identifying and quantifying cell phenotypes. Genome Biol 7(10):R100.

Cezar G G et al., 2007. Can human embryonic stem cells contribute to the discovery of safer and more effective drugs? Current Opinion in Chemical Biology; 11(4):405-409.

Chambers, S. M., et al., 2009. Highly efficient neural conversion of human ES and iPS cells by dual inhibition of SMAD signaling. Nat Biotechnol, 27(3): p. 275-80.

Chan E M, et al., 2009. Live cell imaging distinguishes bona fide human iPS cells from partially reprogrammed cells. Nat Biotechnol; 27(11):1033-7.

Chan, T. F. and Vese, L. A., 2001. "Active contours without edges," IEEE Trans. Im. Proc., vol. 10., no. 2, pp. 266-277.

Chang K H, and Zandstra P W, 2004. Quantitative screening of embryonic stem cell differentiation: endoderm formation as a model. Biotechnol Bioeng; 88(3):287-98.

Chebira A, et al., 2007 multiresolution approach to automated classification of protein subcellular location images. BMC Bioinformatics; 8:210.

Cheutin, T., et al., 2003. Maintenance of stable heterochromatin domains by dynamic HP1 binding. Science. 299: 721-5.

Cimini, D., et al., 2002. Merotelic kinetochore orientation versus chromosome mono-orientation in the origin of lagging chromosomes in human primary cells. J Cell Sci. 115:507-15.

Copeland, A., et al., 2009. "Enhancing the Surgeon's Reality: "Smart Visualization of Bolus Time of Arrival and Blood Flow Anomalies from Time Lapse Series for Safety and Speed of Cerebrovascular Surgery, "Proc. IEEE Applied Imagery Pattern Recognition Workshop, Washington, D.C., to appear.

de Wit, E., and B. van Steensel. 2009. Chromatin domains in higher eukaryotes: insights from genome-wide mapping studies. Chromosoma. 118:25-36.

Deckert, J., et al., 1977. "F-8 DFBW Sensor Failure Identification Using Analytical Redundancy," IEEE Trans. Auto. Control.

Desai, M., and R. Mangoubi, 2007. "Robust Subspace Learning and Detection in Laplacian Noise and Interference", IEEE Transactions on Signal Processing, Vol. 5, No. 7, pp. 3585-3595.

Desai, M., et al., 2006, "Model-based variational smoothing and segmentation for diffusion tensor imaging in the brain," Neuroinformatics, vol. 4, no. 3, pp. 217-233.

Desai, M., et al., 2009. "Noise adaptive matrix edge field analysis of small sized heterogeneous onion layered textures for characterizing human embryonic stem cell nuclei," Proc. IEEE Intl Symp. Biomedical Imaging (ISBI), p 1386-1389, Boston.

Desai, M. and R Mangoubi, 2003. "Robust Gaussian and Non-Gaussian Matched Subspace Detection", IEEE Trans. On Signal Processing, Vol 51, No. 12.

Desai, M., et al., 2006. Robust Constrained nonGaussian fMRI detection", Proc. International Symposium on Biomedical Imaging (ISBI), Washington, D.C., pp 1076-79.

Desai, M., et al., 2005, "Functional MRI Activity Characterization: An Estimation and Decision Theoretic Approach", Chapter 8 in Leondes, C., Medical Imaging Systems Technology, World Scientific.

Desai, M., et al., 2009 "Retinal Venous Caliber Abnormality: Detection and Analysis Using Matrix Edge Fields based Simultaneous Smoothing and Segmentation," "Proc. IEEE Applied Imagery Pattern Recognition Workshop, Washington, D.C., to appear.

Desai, M., et al., 2002, "Functional MRI activity characterization using response time shift estimates from curve evolution," IEEE Trans. on Medical Imaging, vol. 21, no. 11, pp. 1402-1412.

Ding, F. and J. R. Chaillet, 2002. In vivo stabilization of the Dnmt1 (cytosine-5)-methyltransferase protein. Proc Natl Acad Sci USA. 99:14861-6.

Do, M. N. and Vetterli, M., 2002. Wavelet-based texture retrieval using generalized Gaussian density and Kullback-Leibler distance, IEEE Trans. Im. Proc., vol. 11, no. 2, pp. 146-158.

Egger, G., et al., 2004. Epigenetics in human disease and prospects for epigenetic therapy. Nature, 429(6990): p. 457-463.

Ellis, J., et al., 2009. Alternative Induced Pluripotent Stem Cell Characterization Criteria for In Vitro Applications. Cell Stem Cell 4(3): p. 198-199.

Eot-Houllier, G., et al., 2009. Histone deacetylase inhibitors and genomic instability. Cancer Lett. 274:169-76.

Fazzio T G, et al., 2008. An RNAi screen of chromatin proteins identifies Tip60-p400 as a regulator of embryonic stem cell identity. Cell 134(1):162-74.

Feng, B., et al., 2009. Molecules that Promote or Enhance Reprogramming of Somatic Cells to Induced Pluripotent Stem Cells. 4(4): p. 301-312.

Feuerbach, F., et al., 2002. Nuclear architecture and spatial positioning help establish transcriptional states of telomeres in yeast. Nat Cell Biol, 4(3): p. 214-21.

Gareth J S, et al., 2009. Generation of functional human hepatic endoderm from human iPS cells. Hepatology 9999 (999A): NA.

Gaspar-Maia, A., et al., 2009. Chd1 regulates open chromatin and pluripotency of embryonic stem cells. Nature, advance online publication.

Geiman, T. M., et al., 2004. DNMT3B interacts with hSNF2H chromatin remodeling enzyme, HDACs 1 and 2, and components of the histone methylation system. Biochem Biophys Res Commun, 318(2): p. 544-55.

Gilbert, N., et al., 2007. DNA methylation affects nuclear organization, histone modifications, and linker histone binding but not chromatin compaction. J Cell Biol. 177: 401-11.

Golebiewska, A., et al., 2009. Epigenetic Landscaping During hESC Differentiation to Neural Cells. Stem Cells. 27:1298-1308.

Gopalakrishnan, S., et al., 2009. DNMT3B interacts with constitutive centromere protein CENP-C to modulate DNA methylation and the histone code at centromeric regions. Hum Mol Genet. 18:3178-93.

Gorisch, S. M., et al., 2005. Histone acetylation increases chromatin accessibility. J Cell Sci. 118:5825-34.

Goyal, R., et al., 2006. Accuracy of DNA methylation pattern preservation by the Dnmt1 methyltransferase. Nucl. Acids Res. 34:1182-1188.

Grewal, S. I. S. and D. Moazed, 2003. Heterochromatin and Epigenetic Control of Gene Expression. Science, 301(5634): p. 798-802.

Grigoryev, S. A., et al., 2004. Dynamic relocation of epigenetic chromatin markers reveals an active role of constitutive heterochromatin in the transition from proliferation to quiescence. J Cell Sci. 117:6153-6162.

Grigoryev, S. A., et al., 2006. The end adjusts the means: heterochromatin remodelling during terminal cell differentiation. Chromosome Res. 14:53-69.

Harnicarova Horakova, et al., 2007. Chromocentre integrity and epigenetic marks. Journal of Structural Biology. 169: 124-133.

Hasegawa, K., et al., 2007. Efficient Multicistronic Expression of a Transgene in Human Embryonic Stem Cells. Stem Cells, 25(7): p. 1707-1712.

Hattori, N., et al., 2004. Epigenetic control of mouse Oct-4 gene expression in embryonic stem cells and trophoblast stem cells. J Biol Chem. 279:17063-9.

Henikoff, S., et al., 2000. Heterochromatic deposition of centromeric histone H3-like proteins. Proc Natl Acad Sci USA. 97:716-21.

Huang A H, et al., 2008. High-throughput screening for modulators of mesenchymal stem cell chondrogenesis. Ann Biomed Eng 36(11):1909-21.

Huangfu D, et al., 2008 Induction of pluripotent stem cells by defined factors is greatly improved by small-molecule compounds. Nat Biotechnol; 26(7):795-7.

Ichida J K, et al., 2009. A Small-Molecule Inhibitor of Tgf-beta Signaling Replaces Sox2 in Reprogramming by Inducing Nanog. Cell Stem Cell.

Jeffreys C G., 2004. Support vector machine and parametric wavelet-based texture classification of stem cell images [Thesis (S.M.)]. Cambridge, Mass.: Massachusetts Institute of Technology; 121 p.

Jones, P. L., et al., 1998. Methylated DNA and MeCP2 recruit histone deacetylase to repress transcription. Nat. Genet, 19: p. 187-191

Jorgensen, H. F., et al., 2006. Stem cells primed for action: polycomb repressive complexes restrain the expression of lineage-specific regulators in embryonic stem cells. Cell Cycle. 5:1411-4.

Kaji, K., et al., 2009. Virus-free induction of pluripotency and subsequent excision of reprogramming factors. Nature, 458(7239): p. 771-775.

Kanda, T. et al., 1998. "Histone-GFP fusion protein enables sensitive analysis of chromosome dynamics in living mammalian cells," Curr. Biology, vol. 8, no. 7, pp. 377-385.

Kantor, B., K. et al., 2003. Expression and localization of components of the histone deacetylases multiprotein repressory complexes in the mouse preimplantation embryo. Gene Expr Patterns. 3:697-702.

Karpf, A. R., and S. Matsui, 2005. Genetic disruption of cytosine DNA methyltransferase enzymes induces chromosomal instability in human cancer cells. Cancer Res. 65:8635-9.

Karymov, M. A., et al., 2001. DNA methylation-dependent chromatin fiber compaction in vivo and in vitro: requirement for linker histone. FASEB J. 15:2631-2641.

Kimura, H., and P. R. Cook. 2001. Kinetics of core histones in living human cells: little exchange of H3 and H4 and some rapid exchange of H2B. J Cell Biol. 153:1341-53.

Kondo, Y., et al., 2008. Downregulation of histone H3 lysine 9 methyltransferase G9a induces centrosome disruption and chromosome instability in cancer cells. PLoS ONE. 3:e2037.

Kouzarides, T., 2002. Histone methylation in transcriptional control Curr Opin Genet Dev. 12:198-209.

Krejci, J., et al., 2009. Genome-wide reduction in H3K9 acetylation during human embryonic stem cell differentiation. Journal of Cellular Physiology. 219:677-687.

Ku, M., et al., 2008. Genomewide analysis of PRC1 and PRC2 occupancy identifies two classes of bivalent domains. PLoS Genet. 4:e1000242.

Lam, A. L., et al., 2006. Human centromeric chromatin is a dynamic chromosomal domain that can spread over non-centromeric DNA. Proc Natl Acad Sci USA. 103:4186-91.

Lee, T. I., et al., 2006. Control of developmental regulators by Polycomb in human embryonic stem cells. Cell. 125:301-13.

Lehnertz, B., et al., 2003. Suv39h-mediated histone H3 lysine 9 methylation directs DNA methylation to major satellite repeats at pericentric heterochromatin. Curr Biol, 13(14): p. 1192-200.

Lehnertz, B., et al., 2003. Suv39h-mediated histone H3 lysine 9 methylation directs DNA methylation to major satellite repeats at pericentric heterochromatin. Curr Biol. 13:1192-200.

Li, E., 2002. Chromatin modification and epigenetic reprogramming in mammalian development. Nat Rev Genet. 3:662-673.

Lippman, Z., et al., 2003. Distinct Mechanisms Determine Transposon Inheritance and Methylation via Small Interfering RNA and Histone Modification. PLoS Biology. 1:e67.

Loftsgaarden D O and Quesenberry C P, 1965. A Nonparametric Estimate of a Multivariate Density Function. The Annals of Mathematical Statistics; 36(3):1049-1051.

Lowry N, et al., 2010. Nonparametric segmentation and classification of small size irregularly shaped stem cell nuclei using adjustable windowing. p 141-144.

Lunyak, V. V., 2002. Corepressor-dependent silencing of chromosomal regions encoding neuronal genes. Science. 298:1747-52.

Luo, L., et al., 2009. The nuclear periphery of embryonic stem cells is a transcriptionally permissive and repressive compartment. J Cell Sci. 122:3729-3737.

Maison, C., et al., 2002. Higher-order structure in pericentric heterochromatin involves a distinct pattern of histone modification and an RNA component. Nat Genet. 30:329-34.

Mallat S G., 1989. A theory for multiresolution signal decomposition: the wavelet representation. Pattern Analysis and Machine Intelligence, IEEE Transactions on 11(7):674-693.

Mallat, S. G., 1989 "A theory for multiresolution signal decomposition: the wavelet representation," IEEE Trans. PAMI, vol. 11, no. 7, pp. 674-693.

Mangoubi R, et al., 2007. Non-invasive image based support vector machine classification of human embryonic stem cells. Proc. IEEE Int'l Symp. on Biomed, Imaging, Washington, D.C., p 284-287.

Mangoubi, R., et al., 2008 Performance evaluation of multiresolution texture analysis of stem cell chromatin, Proc. IEEE Int'l Symp. on Biomed. Imaging, Paris, France, p 380-383.

Mangoubi, R., 2008. "Non-Gaussian Methods in Biological Imaging," Proc. IEEE Applied Imagery Pattern Recognition Workshop, Washington, D.C.

Mangoubi, R., et al., 2008. "Performance Evaluation Of Multiresolution Texture Analysis Of Stem Cell Chromatin", in Fifth IEEE International Symposium of Biomedical Imaging. Washington, D.C.

Mangoubi, R., 1998. Robust Estimation and Failure Detection, Springer Verla.

Mantel, C., et al., 2007. Checkpoint-apoptosis uncoupling in human and mouse embryonic stem cells: a source of karyotpic instability. Blood. 109:4518-27.

Marson, A., et al., 2008. Wnt Signaling Promotes Reprogramming of Somatic Cells to Pluripotency. Cell Stem Cell, 3(2): p. 132-135.

Mateos-Langerak, J., et al., 2007. Pericentromeric heterochromatin domains are maintained without accumulation of HP1. Mol Biol Cell. 18:1464-71.

McCullough D P, et al., 2008. Segmentation of Whole Cells and Cell Nuclei From 3-D Optical Microscope Images Using Dynamic Programming. Medical Imaging, IEEE Transactions on 27(5):723-734.

Meshorer, E., et al., 2006. Hyperdynamic plasticity of chromatin proteins in pluripotent embryonic stem cells. Dev Cell. 10:105-16.

Mikkelsen, T. S., et al., 2008. Dissecting direct reprogramming through integrative genomic analysis. Nature, 454 (7200): p. 49-55.

Misteli, T. 2005. Concepts in nuclear architecture. Bioessays. 27:477-87.

Mizuguchi, G., et al., 2004. ATP-driven exchange of histone H2AZ variant catalyzed by SWR1 chromatin remodeling complex. Science, 303(5656): p. 343-8.

Mumford, D. and J. Shah. Boundary, 1985 detection by minimizing functionals. in Proc. IEEE Conf. on Computer Vision and Pattern Recognition.

Nakagawa, M., et al., 2008. Generation of induced pluripotent stem cells without Myc from mouse and human fibroblasts. Nat Biotechnol, 26(1): p. 101-6.

Nan, X., et al., 1998. Transcriptional repression by the methyl-CpG-binding protein MeCP2 involves a histone deacetylase complex. Nature, 393: p. 386-389

Natarajan, A. T., and W. Schmid. 1971. Differential response of constitutive and facultative heterochromatin in the manifestation of mitomycin induced chromosome aberrations in Chinese hamster cells in vitro. Chromosoma. 33:48-62.

Nolan J P. 1997. Numerical calculation of stable densities and distribution functions. Communications in Statistics— Stochastic Models; 13(4):759-774.

O'Brien, T. P., et al., 2003. Genome Function and Nuclear Architecture: From Gene Expression to Nanoscience. Genome Res. 13:1029-1041.

Okita, K., et al., 2008. Generation of Mouse Induced Pluripotent Stem Cells Without Viral Vectors. Science, 322(5903): p. 949-953.

Ozolek, J. A., et al., 2009. In Vitro Neural Differentiation of Human Embryonic Stem Cells Using a Low-Density Mouse Embryonic Fibroblast Feeder Protocol. In Human Embryonic Stem Cells: Methods and Protocols. Vol. In press. K. Turksen, editor. Humana/Springer, Totowa, N.J.

Ozolek, J. A., et al., 2007. Human embryonic stem cells (HSF-6) show greater proliferation and apoptoses when grown on glioblastoma cells than mouse embryonic fibroblasts at day 19 in culture: comparison of proliferation, survival, and neural differentiation on two different feeder cell types. Stem Cells Dev. 16:403-12.

Page, R. L., et al., 2009. Induction of stem cell gene expression in adult human fibroblasts without transgenes. Cloning Stem Cells 11(3): p. 417-26.

Pajerowski, J. D. and Dahl, K. N. et al 2007. "From the Cover: Physical plasticity of the nucleus in stem cell differentiation." Proc. Natl. Acad. Sci. USA, Vol 104, No. 40, pp. 15619-24.

Pal-Bhadra, M., et al., 2004 Heterochromatic Silencing and HP1 Localization in Drosophila Are Dependent on the RNAi Machinery. Science, 303(5658): p. 669-672.

Pan, G., et al., 2007. Whole-Genome Analysis of Histone H3 Lysine 4 and Lysine 27 Methylation in Human Embryonic Stem Cells. Cell Stem Cell. 1:299-312.

Park, I. H. and G. Q. Daley 2009, Human iPS cell derivation/reprogramming. Curr Protoc Stem Cell Biol, Chapter 4: p. Unit 4A 1.

Park, I. H., et al., 2008. Reprogramming of human somatic cells to pluripotency with defined factors. Nature, 451(7175): p. 141-6.

Pelton, T. A., et al., 2002. Transient pluripotent cell populations during primitive ectoderm formation: correlation of in vivo and in vitro pluripotent cell development. J Cell Sci, 115(Pt 2): p. 329-39.

Pesquet, J.-C., et al., 1996. "Time-invariant orthonormal wavelet representations," IEEE Trans, on Sig. Proc., vol. 44, no. 8, pp. 1964-1970.

Peters, A. H., et al., 2001. Loss of the Suv39h histone methyltransferases impairs mammalian heterochromatin and genome stability. Cell, 107(3): p. 323-37.

Peters, A. H., et al., 2002. Histone H3 lysine 9 methylation is an epigenetic imprint of facultative heterochromatin. Nat Genet. 30:77-80.

Pien, H., et al., 1997, Segmentation of MR images using curve evolution and prior information, Int'l J. Pattern Recognition and Artificial Intelligence, p. 1233-1246.

Popova, E. Y., et al., 2009. Chromatin condensation in terminally differentiating mouse erythroblasts does not involve special architectural proteins but depends on histone deacetylation. Chromosome Res.

Puschendorf, M., et al., 2008. PRC1 and Suv39h specify parental asymmetry at constitutive heterochromatin in early mouse embryos. Nat Genet. 40:411-20.

Qureshi H, et al., 2008. Adaptive discriminant wavelet packet transform and local binary patterns for meningioma subtype classification. Med Image Comput Comput Assist Interv; 11 (Pt 2):196-204.

Rathjen, J., et al., 1999. Formation of a primitive ectoderm like cell population, EPL cells, from ES cells in response to biologically derived factors. J Cell Sci, 112 (Pt 5): p. 601-12.

Rea, S., et al., 2000 Regulation of chromatin structure by site-specific histone H3 methyltransferases. Nature, 406 (6796): p. 593-9.

Ripley, B. D., 1988. Statistical Inference for Spatial Processes, Cambridge University Press Rodriguez-Collazo, et al., 2009. Robust methods for purification of histones from cultured mammalian cells with the preservation of their native modifications. Nucleic Acids Res. 37:e81.

Rohde G K, et al., 2008. Deformation-based nuclear morphometry: Capturing nuclear shape variation in HeLa cells. Cytometry Part A 73A(4):341-350.

Sammak, P. J., et al., 2008, "High Content Analysis of Human Embryonic Stem Cell Growth and Differentiation", in High Content Screening: Science, Techniques, and Applications, S. A. Hanney, Editor. John Wiley: Hoboken, N.J.

Sammak, P. J., et al., 1987. Microtubule dynamics in vivo: a test of mechanisms of turnover. J Cell Biol. 104:395-405.

Schrattenholz A, and Klemm M., 2007 Neuronal cell culture from human embryonic stem cells as in vitro model for neuroprotection. Altex; 24(1):9-15.

Seiler A, et al., 2004. Improvement of an in vitro stem cell assay for developmental toxicity: the use of molecular endpoints in the embryonic stem cell test. Reprod Toxicol; 18(2):231-40.

Serrano, A., et al., 2009. Heterochromatin protein 1 (HP1) proteins do not drive pericentromeric cohesin enrichment in human cells. PLoS One. 4:e5118.

Sharkawy, R., et al., 2008, "Particle identification in terms of acoustic measurements . . . ", IEEE. Trans. Dielect. and Elect. Insul.

Shi, Y., et al., 2008 Induction of Pluripotent Stem Cells from Mouse Embryonic Fibroblasts by Oct4 and Klf4 with Small-Molecule Compounds. 3(5): p. 568-574.

Silverstein, R. A, and K. Ekwall, 2005 Sin 3: a flexible regulator of global gene expression and genome stability. Curr Genet, 47(1): p. 1-17.

Sinha G. 2005 Cell biology. Human embryonic stem cells may be toxicology's new best friends. Science 308(5728): 1538.

Smal, I., 2009 Particle Filtering Methods for Subcellular Motion Analysis, Doctoral thesis, Erasmus University, Roterdam Strasak, L., et al., 2009a. H3K9 acetylation and radial chromatin positioning. Journal of Cellular Physiology. 220:91-101.

Takahashi, K. and S. Yamanaka, 2006. Induction of pluripotent stem cells from mouse embryonic and adult fibroblast cultures by defined factors. Cell, 126(4): p. 663-76.

Teixeira, M. T., et al., 2002, Genome-wide nuclear morphology screen identifies novel genes involved in nuclear architecture and gene-silencing in Saccharomyces cerevisiae. J Mol Biol, 321(4): p. 551-61.

Tesar, P. J., et al., 2007 New cell lines from mouse epiblast share defining features with human embryonic stem cells. Nature, 448(7150): p. 196-9.

Thompson J. R. and Tapia R. A., 1990 Nonparametric Function Estimation, Modeling, and Simulation. Philadelphia: SIAM.

Tzagkarakis G. and Tsakalides P., 2004. A Statistical Approach to Texture Image Retrieval via Alpha-Stable Modeling of Wavelet Decompositions; Instituto Superior Técnico, Lisboa, Portugal.

Ungrin M D, et al., 2008. Reproducible, ultra high-throughput formation of multicellular organization from single cell suspension-derived human embryonic stem cell aggregates. PLoS One; 3(2):e1565.

Van de Wouwer G, et al., 1999. Statistical texture characterization from discrete wavelet representations. Image Processing, IEEE Transactions on 8(4):592-598.

van Driel, et al., 2003. The eukaryotic genome: a system regulated at different hierarchical levels. J Cell Sci, 116 (20): p. 4067-4075.

van Steensel, et al., 1996. Partial colocalization of glucocorticoid and mineralocorticoid receptors in discrete compartments in nuclei of rat hippocampus neurons. J Cell Sci. 109:787-792.

Veillete M., 2009 Alpha-Stable distributions in MATLAB.

Vogt A, et al., 2009. Automated image-based phenotypic analysis in zebrafish embryos. Dev Dyn 238(3):656-63.

Ware, C. B., et al., 2009. Histone deacetylase inhibition elicits an evolutionarily conserved self-renewal program in embryonic stem cells. Cell Stem Cell, 4(4): p. 359-69.

Werbowetski-Ogilvie, T. E., et al., 2009. Characterization of human embryonic stem cells with features of neoplastic progression. Nat Biotech. 27:91-97.

Weyn B, et al., 1998. Automated breast tumor diagnosis and grading based on wavelet chromatin texture description. Cytometry; 33(1):32-40.

Wiblin, et al., 2005. Distinctive nuclear organisation of centromeres and regions involved in pluripotency in human embryonic stem cells. J Cell Sci. 118:3861-3868.

Woltjen, K., et al., 2009 piggyBac transposition reprograms fibroblasts to induced pluripotent stem cells. Nature, 458 (7239): p. 766-70.

Wu, Q., et al., 2009. CARM1 Is Required in Embryonic Stem Cells to Maintain Pluripotency and Resist Differentiation. Stem Cells. 27:2637-2645.

Wu, R., et al., 2005. Differential subnuclear localization and replication timing of histone H3 lysine 9 methylation states. Mol Biol Cell. 16:2872-81.

Yu, J. and J. A. Thomson, 2008 Pluripotent stem cell lines. Genes Dev., 22(15): p. 1987-1997.

Yu, J., et al., 2007. Induced pluripotent stem cell lines derived from human somatic cells. Science, 318(5858): p. 1917-20.

Zeng, J., et al., 2009 High-efficiency Transient Transduction of Human Embryonic Stem Cell-derived Neurons With Baculoviral Vectors. Mol Ther.

Zhou, H., et al., 2009 Generation of Induced Pluripotent Stem Cells Using Recombinant Proteins.

Zong-Yun T, et al., 2010. Identification of microRNAs regulated by activin A in human embryonic stem cells. Journal of Cellular Biochemistry; 109(1):93-102.

INCORPORATION BY REFERENCE

All publications and patents mentioned herein are hereby incorporated by reference in their entirety as if each individual publication or patent was specifically and individually indicated to be incorporated by reference.

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method for identifying induced pluripotent stem cells, comprising:
    (a) obtaining an image of one or more cells including a mix of at least feeder cells and induced pluripotent stem cells;
    (b) representing the image as a multiplicity of pixels;
    (c) using a processor to extract one or more image features from said multiplicity of pixels;
    (d) comparing the one or more image features with image features derived from one or more pluripotent stem cells, wherein the processor applies one or more statistical comparison methods to compare the image features; whereby induced pluripotent stem cells are identified within the mix of cells.

2. The method of claim 1, wherein the one or more cells is a colony of cells.

3. The method of claim 1, wherein the image contains the nucleus of one cell.

4. The method of claim 1, wherein the image feature is texture.

5. The method of claim 4, wherein the texture corresponds to a morphological structure of the cell.

6. The method of claim 4, wherein the texture is heterogeneous.

7. The method of claim 1, further comprising:
    (e) performing simultaneous smoothing and segmentation of said image;
    (f) determining one or more boundaries of said cell;
    (g) identifying a region or subregion near to said one or more boundaries;
    (h) deriving one or more attributes of region or subregion;
    (i) analyzing variation in said one or more attributes; wherein said one or more image features comprise components of said one or more attributes.

8. The method of claim 1, wherein the one or more image features are extracted using a wavelet decomposition algorithm.

9. The method of claim 8, wherein the wavelet algorithm is an n-level decomposition that yields three detail subbands per level.

10. The method of claim 9, wherein one of each of the three detail subbands per level are orientated horizontally, vertically, and diagonally.

11. The method of claim 1, wherein the one or more statistical methods is a comparison of probability density functions.

12. The method of claim 11, wherein one or more areas of the one or more images are classified using a clustering algorithm.

13. The method of claim 12, wherein dissimilarity between the one or more image features is calculated using a pdf estimator and quantified using information divergence.

14. The method of claim 13, wherein dissimilarity is calculated using a Kullback-Leibler divergence (KLD).

15. The method of claim 13, wherein the method used to estimate the pdf and KLD is selected from: a generalized Gaussian density model (GGD); a symmetric alpha-stable (S.alpha.S) Density Model; an Ahmad-Lin (A-L) KLD Estimation; and a Loftsgaarden-Quesenberry (L-Q) KLD Estimation.

16. The method of claim 13, wherein the one or more windows are classified, subdivided, and re-classified.

17. The method of claim 11, wherein the clustering algorithm is selected from the k-Nearest Neighbor (kNN) algorithm and the Support Vector Machine (SVM).

18. The method of claim 17, further comprising subdividing the image of one or more cells into one or more windows.

19. The method of claim 1, wherein the induced pluripotent stem cells are contained in a heterogeneous mixture of cells.

* * * * *